United States Patent [19]
Emmons et al.

[11] Patent Number: 6,080,802
[45] Date of Patent: Jun. 27, 2000

[54] PROCESS FOR PREPARING AN AQUEOUS DISPERSION OF COMPOSITE PARTICLES INCLUDING POLYMERIC LATEX ADSORBED TO TITANIUM DIOXIDE

[75] Inventors: William David Emmons, Huntingdon Valley; Martin Vogel, Jenkintown; Edward C. Kostansek, Buckingham; Jack C. Thibeault; Peter R. Sperry, both of Doylestown, all of Pa.

[73] Assignee: Rohm and Haas Company, Philadelphia, Pa.

[21] Appl. No.: 07/801,992

[22] Filed: Dec. 3, 1991

[51] Int. Cl.$^7$ ............................. C08L 33/08; C08L 33/00
[52] U.S. Cl. ......................... 523/205; 523/220; 524/497; 524/547; 528/490
[58] Field of Search ............................. 523/205; 524/497, 524/547; 528/490

[56] References Cited

U.S. PATENT DOCUMENTS

| | | |
|---|---|---|
| Re. 31,936 | 7/1985 | Sperry et al. . |
| 2,930,775 | 3/1960 | Fordyce . |
| 3,425,855 | 2/1969 | Barksdale et al. ...................... 524/497 |
| 3,714,102 | 1/1973 | Reiss ...................................... 523/205 |
| 3,736,286 | 5/1973 | Scott . |
| 3,884,864 | 5/1975 | Matsuda et al. . |
| 3,935,340 | 1/1976 | Yamaguchi et al. . |
| 3,953,657 | 4/1976 | Yamaguchi et al. . |
| 3,967,006 | 6/1976 | Yamaguchi et al. . |
| 4,025,483 | 5/1977 | Ramig, Jr. . |
| 4,051,093 | 9/1977 | Wendel et al. . |
| 4,062,692 | 12/1977 | Hemmerich et al. . |
| 4,101,490 | 7/1978 | Pons et al. . |
| 4,102,843 | 7/1978 | Sperry et al. . |
| 4,110,285 | 8/1978 | Pons et al. . |
| 4,315,959 | 2/1982 | Brandts Buys et al. . |
| 4,341,213 | 7/1982 | Cohen .................................... 524/425 |
| 4,421,660 | 12/1983 | Hajna . |
| 4,435,540 | 3/1984 | Kishida et al. . |
| 4,477,623 | 10/1984 | Pons et al. . |
| 4,487,859 | 12/1984 | Martino . |
| 4,487,860 | 12/1984 | Winner et al. . |
| 4,487,861 | 12/1984 | Winner et al. . |
| 4,506,507 | 3/1985 | Greene et al. . |
| 4,514,342 | 4/1985 | Billington et al. . |
| 4,608,401 | 8/1986 | Martin . |
| 4,658,003 | 4/1987 | Schmidt et al. . |
| 4,680,200 | 7/1987 | Solc . |
| 4,733,005 | 3/1988 | Schmidt et al. ........................ 562/222 |
| 4,771,086 | 9/1988 | Martin .................................... 524/497 |
| 4,798,854 | 1/1989 | Visca et al. ............................. 524/334 |
| 4,800,103 | 1/1989 | Jeffs . |
| 4,859,246 | 8/1989 | Sennett . |
| 4,892,902 | 1/1990 | Shioji et al. ............................. 524/547 |
| 4,916,172 | 4/1990 | Hayashi et al. . |
| 4,918,211 | 4/1990 | Yokota et al. . |
| 4,939,189 | 7/1990 | Tobinaga et al. . |
| 4,981,882 | 1/1991 | Smith et al. . |
| 5,049,594 | 9/1991 | Jeffs ....................................... 523/205 |
| 5,064,718 | 11/1991 | Buscall et al. ......................... 523/205 |

FOREIGN PATENT DOCUMENTS

| | | |
|---|---|---|
| 0221498 | 5/1987 | European Pat. Off. . |
| 0255079 | 2/1988 | European Pat. Off. . |
| 0327199 | 8/1989 | European Pat. Off. . |
| 0337672 | 10/1989 | European Pat. Off. . |
| 398457 | 4/1990 | European Pat. Off. . |
| 0392065 | 10/1990 | European Pat. Off. . |
| 1134836 | 8/1962 | Germany . |
| 58-195133 | of 1983 | Japan . |
| 61-143411 | 7/1986 | Japan . |
| 1302269 | 12/1989 | Japan . |
| 958856 | 6/1962 | United Kingdom . |
| 2220666 | 1/1990 | United Kingdom . |

OTHER PUBLICATIONS

Balfour, J.G. et al. *J. Oil Col Chem Assoc* 58, 331–344 (1975).
Bleier, A. et al. *J. Colloid Interface Sci.* 55, 510–524 (1976).
Bleier, A. et al. *J. Chem Soc.* 74, 1346–1359 (1978).
Braun, J.H., *J. Coatings Technology* 60, 67–71 (1988).
Brisson, A. et al. *J. Coatings Technology* 63, 59–65 (1991).
Chemical Abstracts 100: 140128 f (1984).
Craft, R. *Modern Paint and Coatings*, 38–43 (1991).
Cutrone, L. *J. Coatings Technology* 58, 83–88 (1986).
Dunn, E. A., Jr. et al. *J. Paint Technology* 40, 112–122 (1968).
Fadatt, G. et al. *Nordic Pulp and Paper Research Journal 4*, 30–36 (1986).
Fadatt, G. et al. *Nordic Pulp and Paper Research Journal 4*, 37–43 (1986).
Fitzwater, S. et al. *J. Coatings Technology* 57, 39–47 (1985).
Furusawa. K. et al. *Colloid & Polymer Sci.* 265, 882–888 (1987).

(List continued on next page.)

*Primary Examiner*—Andrew E. C. Merriam
*Attorney, Agent, or Firm*—Stephen T. Falk

[57] ABSTRACT

Titanium dioxide particles are dispersed in an aqueous medium with a polymeric latex which adsorbs to the surface of the titanium dioxide to give a low-viscosity slurry or pigment grind of composite titanium dioxide-polymeric latex particles. A high glass transition polymeric latex can be used as the dispersant, and a low glass transition temperature binder latex can be added. The zeta potential of the polymeric latex can be at least about 30 millivolts more negative than the zeta potential of the titanium dioxide. The adsorbed polymeric latex provides more optimal spacing of the titanium dioxide particles in films formed from coating compositions formulated using the composite particles, and consequently greater film opacity and hiding at a given pigment volume concentration. Coatings formulated using the composite particles can be prepared to give the same hiding as coatings including titanium dioxide dispersed with conventional polyelectrolyte pigment dispersants, but with lower levels of costly titanium dioxide. Alternatively, a single selected polymeric latex can be used to both strongly adsorb to the pigment particles and to serve as binder, or a mixture of a selected, strongly adsorbing polymeric latex having a low effective glass transition temperature and a conventional binder latex can be employed.

59 Claims, 8 Drawing Sheets

OTHER PUBLICATIONS

Furusawa, K. et al. *Kobunshi Ronbunshu* 44, 483–489 (1987).

Furusawa, K. et al., *Kobunshi Ronbunshu* 46, (1), 21–27 (1987).

Goodwin, J.W. et al. *Faraday Discuss Chem Soc. 65*, 338–339 (1978).

Hasan, M.S. *Journal of Polymer Science: Polymer Chemistry Edition*, 20 2969–2978 (1982).

Hansen, F.K. et al. *J.C.S. Faraday I 76*, 1240–1262 (1980).

Hasegawa, M. et al. *J. Appl. Polym. Sci. 33*, 411–418 (1987).

Hasegawa, M. et al. *Journal of Polymer Science: Part A: Polymer Chemistry*, 25 3117–3125 (1987).

Hook, J.W., *J. Coatings Technology 58*, (742), 81–82 (1986).

Hoy, K.L., Journal of Coatings Technology 51, 651, 27–41 (1979).

Ishii, K. et al. "Colloidal Behaviour of Microgels" Nippon Paint Co., Ltd.

Kato, K. et al. *Progr. Organic Coatings 16*, 51–75 (1988).

Kato, K. et al. *Colloids and Surfaces 23*, 159–170 (1987).

Luckham, P. et al. *Colloids and Surfaces 1*, 281–293 (1980).

Matijevic, E. et al *Croatica Chemica Acta 50*, 93–105 (1977).

Matijevic, E. et al. *Colloid & Polymer Sci. 261*, 527–534 (1983).

Meguro, K. et al. *Bull. Chem. Soc. Jpn. 59*, 3019–3021 (1986).

Peacock, J., *11th PATIPEC Congress*, (1972).

*Pigment and Resin Technology*, Sep. 7, 11 (1986).

Spalding, B.J. *Chemical Week*, Sep. 3, 1986.

Templeton–Knight, R. *Chemistry & Industry*, 512–515 (1990).

Van den Hul, H. J. et al. *Electro. Chem. and Interface. Electrochem. 37*, 161–182 (1972).

Vincent, B. et al. *Faraday Disc. Chem Soc. 65*, 296–305 (1978).

Vincent, B. et al. *J.C.S. Faraday I 76*, 665–673 (1980).

Yamaguchi, T. et al. *Die Angewandte Makromolekulare Chemie 53*, 65–72 785 (1976).

Craft, Modern Paint and Coatings Mar. 1991.-

PROCESS FOR PREPARING AN AQUEOUS DISPERSION OF COMPOSITE PARTICLES INCLUDING POLYMERIC LATEX ADSORBED TO TITANIUM DIOXIDE

BACKGROUND OF THE INVENTION

1. Field of the Invention

This invention relates generally to a process for preparing aqueous compositions including titanium dioxide pigment, and more particularly to the dispersion and distribution of titanium dioxide particles in products formed by the loss of water from such aqueous compositions, including aqueous coating compositions.

2. Background of the Invention

Titanium dioxide has been for many years the pigment of choice for conferring opacity to plastic sheets and films, and particularly to coatings formed from coating compositions and paints. In paints titanium dioxide is typically the most expensive component of the formulation on a volume basis. It has been an ongoing objective of the coatings industry to achieve the desired degree of opacity in a coating while at the same time using as little titanium dioxide pigment as possible. One way in which this is done is by employing titanium dioxide which has an optimal average particle size and particle size distribution for scattering light. Another way of making efficient use of the titanium dioxide employed is by dispersing this pigment as well as possible.

Agglomerated or aggregated titanium dioxide pigment particles make less than their full potential contribution to the performance of the coatings, such as, for example, with regard to coating opacity and colorant potential. Such aggregates can also impair certain other properties of the coating or film such as, for example, strength and resistance properties. Titanium dioxide is often sold as a dry powder. As a practical matter, this powder must to be milled in a liquid medium to break up agglomerates and to obtain a colloidally stable dispersion.

In order to stabilize the coating formulation against settling or flocculation, a variety of surface active dispersing additives have been used. Coatings manufacturers have often used titanium dioxide as a dry powder, which is used directly in preparing coating compositions. In this case, a dispersing additive is usually added directly to the pigment and a small amount of water in a preliminary pigment "grind" step in which loose agglomerates of the pigment particles are broken up by mechanical shear forces. The dispersing additive typically remains in the mix through the subsequent steps in the coating preparation process and typically will be found in the fully formulated coating composition.

There has been an increasing tendency for titanium dioxide to be commercially supplied in concentrated slurry form, such as, for example, in water. However, since the titanium dioxide particles in the slurries are prone to aggregation upon storage, the slurries often need to be redispersed for maximum effectiveness before use in formulating a coating composition. Either the manufacturer of the titanium dioxide slurry or the end user of the slurry, and sometimes both, may perform the redispersion step. This step is another source of dispersing agent in the fully formulated coating.

The opacifying capability or hiding power of a paint or coating is a function of the spacing of the titanium pigment particles in the dried coating. The light scattering characteristics of titanium dioxide particles are well known. The average size and size distribution of titanium dioxide particles used for opacifying purposes has been highly optimized by the titanium dioxide manufacturers for maximum scattering. Maximum light scattering occurs when the titanium dioxide pigment particles have a diameter of from about 200 to about 250 nanometers and are spaced far apart from each other, on the order of a few particle diameters, so that there is minimal interference between the light scattering of neighboring particles.

In practice, however, for example in the formulation of paints, it is widely recognized that when enough titanium dioxide particles have been dispersed into the polymeric coating vehicle to yield films of acceptable opacity, the level of opacity which is achieved is significantly less than would be theoretically predicted from the light scattering potential of a single titanium dioxide particle multiplied by the total number of particles in the path of light passing through the film.

A number of factors have been identified which partially account for the diminution of opacity from the theoretical predictions. If two or more titanium dioxide particles are in actual contact with each other, or even if they are closer together than the optimum spacing distance, the particles will behave like a single aggregated larger particle and result in reduced light scattering. This occurs if the titanium dioxide particles are not adequately deaggregated during the dispersion process. However, even if the titanium dioxide particles are fully deaggregated in the dispersion process, a random distribution of particles will not provide the maximum scattering achievable in theory if the particles were optimally distributed.

In a related phenomenon, referred to as "crowding", titanium dioxide pigment particles are forced to be nearer to each other than the desired optimum merely by the lack of available space. This lack of available space may be caused by the space taken up by the other coating fillers and extenders which are of a comparable size to, or which are larger than, the pigment particles. In the case of polymeric binders, which are particulate in nature prior to film formation, such as, for example, latex or emulsion polymers, and in the case of nonaqueous dispersion polymers, the binder polymer particles themselves can crowd pigment particles, especially if they are of comparable or larger in size than the titanium dioxide particles.

The traditional guiding rule or goal in the formulation of practical, dispersed titanium dioxide-containing coatings, such as, for example, pigmented latex paints, is to make the titanium dioxide dispersion and the polymeric latex binder dispersions as colloidally stable and compatible with each other as possible, in the sense that they can be mixed without formation of coagulum or like aggregate or excessive increase in viscosity. It has heretofore been found that titanium dioxide particles cannot be effectively dispersed into aqueous latex compositions, by simply blending or directly mixing them into the aqueous polymeric latex composition. When such direct blending of titanium dioxide particles has been attempted, agglomeration of the titanium dioxide particles has resulted in the formation of grit or coagulum in the coating composition. Coatings containing grit or coagulum do not possess the desired degree of hiding or opacity. These coatings may also suffer the loss of other properties such as gloss, mechanical strength and impermeability. Even in the case of nonaqueous (solvent-borne) or 100% solids polymer compositions, high energy grinding or milling input has been found to be necessary to deagglomerate and wet out the titanium dioxide particles. Even with the use of such operations, inferior dispersions containing aggregates of titanium dioxide particles results unless significant quantities of dispersing, wetting or "coupling" agents are employed. However, even when such agents are used, the distribution of the titanium dioxide particles in the polymer system at best approaches that of a random distribution. As a result there exist a substantial number of titanium dioxide particles in close proximity to each other, and possibly in direct physical contact with each other.

In the case of latex paints and coatings, it is conventional practice to first form a stable aqueous dispersion of titanium dioxide pigment with other fillers or extenders. This dispersion, also known as a "mill base" or "grind," may contain water-miscible solvents, such as for example glycols and glycol ethers, and relatively low molecular weight water soluble polyelectrolytes as titanium dioxide pigment grinding aids or dispersants. Generally, these pigment dispersants are anionic polyelectrolytes. Many different types of such dispersants are known. For example, U.S. Pat. No. 2,930,775 discloses the water soluble salts of diisobutylene maleic anhydride copolymers having molecular weights between about 750 and 5,000 as dispersants when employed at concentrations of from about 0.05 to 4% on pigment weight. U.S. Pat. No. 4,102,843 and U.S. Reissue Pat. No. 31,936 disclose the use of water soluble salts of copolymers of hydroxyalkyl-(meth)acrylates and (meth)acrylic acid of molecular weights of from 500 to 15,000 at concentrations of from about 0.01 to 5% on pigment to produce glossy emulsion paints. U.S. Pat. No. 4,243,430 discloses a water-soluble dispersant comprising an addition copolymer comprising greater than 30% alpha, beta-unsaturated monovinylidene carboxylic acid, the copolymer having an apparent $pK_a$ between 6.0 and 7.5 and molecular weight between about 500 and 15,000, and forming a water soluble salt with zinc ammonia complex ion. Low molecular weight polyphosphate salts, such as potassium tripolyphosphate, are also used because they are relatively inexpensive, but they tend to have marginal hydrolytic stability.

The use of these and other polyelectrolyte dispersants is described in T. C. Patton, *Paint Flow and Pigment Dispersion* (Wiley Interscience, 2nd edition) 290–295 (1979). Also described therein (pages 468–497) are a number of milling devices used in the preparation of pigment dispersions. One such device which is commonly used in the manufacture of latex paints is the high speed disk disperser designed to develop high shearing forces in the pigment grinding step. Common practice is to use the device with dispersant to form a stable dispersion of titanium dioxide pigment, and then to add to the dispersion the aqueous latex polymer binder along with the other ingredients, such as for example thickeners and rheology modifiers, antifoaming agents, colorants, coalescing agents or temporary plasticizers for the latex polymer particles, and surfactants for substrate wetting and colorant compatability. The pigment dispersion process and the relation to flocculation and optical properties are discussed further in *Treatise on Coatings,* Vol. III, Part 1 (Marcel Decker) (1975); *Pigment Handbook,* Vol. I (2nd edition, Wiley Interscience) (1988), and *Pigment Handbook,* Vol. III (Wiley Interscience) (1973).

While these polymeric dispersants and procedures enable the formulation of practical aqueous formulations, they have certain undesirable characteristics. Because of their ionic nature, polyelectrolyte dispersants tend to impart water sensitivity to films, which can result in reduced resistance of the films to scrubbing, and increased swelling with a tendency towards delamination and blistering. Moreover, such polyelectrolyte stabilized dispersions of titanium dioxide particles are prone to flocculation and reaggregation by other ionic species in the aqueous formulation, such as, for example, from initiator residues and from soluble inorganic pigments, especially those which contribute multivalent ions such as zinc oxide and calcium carbonate. Furthermore, since films dry by water evaporation, the concentration of such ionic species in the coating or film increases upon drying, and an otherwise suitable dispersion may become aggregated during the drying process itself. The stability and instability of titanium dioxide dispersions in the presence of polyelectrolytes and multivalent metal ions has been described by Burlamacchi, et al., *Colloids and Surfaces* 7, 165 (1982).

Even in the unlikely case that a polyelectrolyte dispersant were to confer effective dispersion of titanium dioxide pigment particles to provide a dispersion of singlet particles, the range of distance of the repulsive forces between particles is very small, typically on the order of less than about 100 Angstroms (10 nanometers), in relation to titanium particle size (on the order of 250 nanometers). Consequently, the repulsive forces between particles in such dispersions would be incapable of maintaining any significant degree of spacing between the titanium dioxide particles to improve the scattering or hiding power of the dispersed titanium dioxide pigment, or to have a significant impact on the mechanical properties of the dried film.

A number of techniques have been proposed to disperse inorganic particles such as titanium dioxide particles in aqueous polymer containing coating compositions.

For example, U.S. Pat. No. 4,608,401 discloses a method for encapsulating solid particles by admixing the particles in an aqueous reaction medium with a water-insoluble polymerizable monomer in the presence of nonionic surface active stabilizing agent (such as a polyethoxylated alkylphenol containing at least about 8 carbon atoms in the alkyl group and preferably at least 40–50 ethylene oxide groups per molecule) to form a water-insoluble polymer free of ionic charge. A redox polymerization is employed which is free of ionic groups and does not release ionic groups in the reaction medium. The starting particles must be free of significant levels of ionic charge, either anionic or cationic, existing either from their structure or generated during their preparation and handling through electrolyte additions. The '401 patent states that "[p]articles which are charged have been found not to participate in the present encapsulation mechanism but, in fact, to severely inhibit the same, resulting in virtually immediate flocculation of the entire solids" (column 7, line 62—column 8, line 4).

Naturally agglomerated particulate materials are taught as being effectively dispersed in situ during the polymerization, eliminating the necessity for preliminary grinding and/or dispersion treatments. The '401 patent teaches that agglomerates of the inorganic pigment particles, which are present before and during the initiation of the polymerization reaction, are broken down or "exploded" apart during the polymerization. The behavior of the system has not been fully explained.

Latex paints prepared using pigment dispersed according to the procedure of the '401 patent are claimed to exhibit improved gloss, opacity, and scrub resistance relative to paints prepared by conventional means, although details for the preparation of the latter including the method of pigment dispersion and the characteristics of the latex polymer to be used, are not provided. The entire amount of polymer which appears in the final paints of the '401 patent is introduced in the polymerization process in the presence of the pigment. The process for achieving pigment encapsulation requires the handling of reactive monomers and other ancillary chemicals and the conducting of chemical reactions in the presence of pigment as an integral part of the process.

U.S. Pat. No. 4,025,483 is directed towards stabilizing aqueous titanium dioxide pigment slurries by blending plastic pigment with the slurry. At least about 10% of nonfilm-forming polymer latexes of 1,000–10,000 Angstroms in size, and having a glass transition temperature greater than 30° C., are blended with about 10–50% water. The '483 patent discloses stabilizing such slurries against gravitational separation and sedimentation upon storage of the slurry. In the illustrative examples, Tamol® 731 surfactant is used at a concentration of 0.35% on pigment. The 1483 patent does not disclose or teach adsorption of the latex on the titanium dioxide particles. While the slurry containing latex in patent Example 1 has a total volume solids of about 41% compared to the control dispersion of Example 3 which has a total volume solids of about 31%, it is possible that increased volume solids alone might be expected to retard the rate of settling. While the systems which are compared are of approximately the same initial viscosity, the control system contains much more methyl cellulose thickener.

U.S. Pat. No. 4,315,959 relates to a process for coating microscopic substrates, such as pigment particles, dispersed in an aqueous medium containing a complex of a polyhydroxylated polymer, preferably polyvinyl alcohol ("PVA"), and a transition metal, most preferably copper II. The complex forms a layer on the particles which initiates polymerization of monomers such as acrylates and methacrylates. Example 1 discloses polymethyl methacrylate coated on titanium dioxide on a first layer of the PVA/Cu II complex. Tests such as electron microscopy and Hegman fineness show that the size of the treated particles was very nearly identical to the size of the untreated particles. Example 6 is directed to kaolin and talc coated with polymethyl methacrylate and show a higher modulus of elasticity relative to untreated materials in polymethylmethacrylate or using a known anchoring agent. As in the '401 patent, the process of achieving layering of a polymer on pigment involves conducting chemical reactions in the presence of the pigment. See also P. Goddard et al., *Double Liaison,* No. 387–388, p. II (1988).

U.S. Pat. No. 4,800,103 describes a process which involves treating a particulate inorganic material with the latex by mixing the latex with an aqueous suspension containing from 5–50% by weight of the inorganic material, adding a water-soluble salt having a multivalent cation, and adjusting the pH of the suspension to more than 4.0 in order to coagulate the latex-treated material to form an open three-dimensional network of larger flocs. The flocculated material is then dewatered and the resultant cake is dried and then pulverized. Alternatively, the latex may be added to a suspension of the inorganic material with a suitable dispersing agent for the inorganic material. The resultant mixture is then spray dried. An object of this invention is to prepare anhydrous compositions that may be easily incorporated in resins for castings, such as, for example, polyurethanes, unsaturated polyesters, acrylics, nylon and polypropylene.

U.S. Pat. No. 4,421,660 discloses the steps of emulsifying a hydrophobic, emulsion polymerizable monomer in an aqueous colloidal dispersion of discrete particles of an inorganic solid, and subjecting the resulting emulsion to emulsion polymerization conditions to form a stable, fluid, aqueous colloidal dispersion of the inorganic solid particles dispersed in a matrix of water-insoluble polymer of the hydrophobic monomer. An aqueous dispersion of the inorganic material is first made using surfactants such as fatty acid salts, polysoaps such as sodium polyacrylate, and especially polysoaps such as potassium salts of functionalized oligomers, such as for example the Uniroyal Chemical Polywet™ varieties. In Example 6 titanium dioxide of 200–400 nanometers in diameter is polymerized with a styrene/butyl acrylate composition to yield a bimodal dispersion of mean diameters of 650 nanometers and 110 nanometers. A coating, the composition of which is not described, prepared from the latex is reported as having excellent opacity. As in the prior references, the coating of the inorganic particles is achieved by an emulsion polymerization chemical reaction in the presence of the particles.

The attractive and repulsive forces which control the ability of particles of one type and size to adhere onto the surface of other particles have been the subject of extensive theoretical work and investigation with model systems, as evidenced by numerous publications. These publications typically refer to the phenomenon of particle-particle adhesion as "heterocoagulation", and discuss maximizing the freedom of dissimilar particles from undesirable heterocoagulation in very dilute systems. The theory of so called "heterocoagulation" processes has been described by an extension of the well-known colloidal stability theory of Derjaguin, Landau, verwey and Overbeek ("DLVO theory"). This extension is given by the Hogg, Healy and Furstenau equation who extended the DVLO theory to include the interaction between spherical colloidal particles of different radii, unequal surface potentials and differing London-van der Waals (i.e. Hamaker) constants, and is described in R. Buscall, et al., *Polymer Colloids* (Elsevier Applied Science Publications 1985) pages 89–90 and 165–167.

DLVO theory mathematically expresses a balance between attractive forces attributed to van der Waals forces and repulsive forces attributed to like electrical charges on the surfaces of interacting particles. Other types of interaction forces, for example steric repulsion and attraction due to dissolved polymer, can be incorporated into the basic theory at least semi-quantitatively. Investigators have shown the applicability of the theory in very dilute systems. Their conclusions are typically expressed in terms of particle collisions and minimum repulsive energy barriers between particles sufficient to overcome the attractive forces. Below this energy barrier there are too many collisions of particles with energies exceeding this minimum repulsive energy barrier to prevent coagulation. The relationship between this energy barrier and coagulation is taught as depending on several particle and medium variables which include medium dielectric constant, medium ionic strength, particle size, particle surface charge which may be expressed in terms of zeta potential, and the material attraction or Hamaker constant for colloidal materials immersed in the particular medium. No single parameter is, therefore, by itself a predictor of coagulation or stability.

If colloidal dispersions of particles differing in sign of charge are mixed, the usual result is a gross flocculation or coagulation. This result may be a desirable consequence in some circumstances, such as, for example, in instances where it is desired to purify water containing suspended matter or to isolate a bulk solid material from its colloidal suspension. If, however, the dispersions of particles having different sign of charge are mixed together under conditions of low particle concentration, and where one of the particle types is smaller than the other and present in greater number, then gross coagulation may be avoided and the smaller particles may form a monolayer on the larger ones.

However, the particle concentrations required to cleanly effect such a process, without forming significant quantities of coagulum or grit, are so low as to render such a process commercially impractical, since large volumes of liquid dispersions would have to be handled.

The DLVO theory and extensions thereof have been useful as a guide for interpreting and correlating aspects relating to the stability of small particles and dilute colloidal dispersions. These theories has been useful despite their quantitative limitations, and the fact that all of the necessary parameters for implementation, such as, for example, the material attraction or Hamaker constants, are not always known, or are not known with sufficient accuracy for all the materials of possible interest. The primary deficiency of the DLVO theory is that it is limited to the interactions of two isolated particles of the same type with each other in very dilute dispersions.

Despite extensive research relating to the theory of particle interaction and extensive work with model systems at low particle concentrations, as reflected by numerous publications in the field of colloidal stability and heterocoagulation, the utility of the DVLO and other theories as relating to the preparation of commercial dispersions containing high concentrations of inorganic particles has not been established.

There is a continuing need to improve the effective utilization of titanium dioxide in aqueous coating compositions and thereby to improve the opacity and other performance properties of coating compositions. In addition, there is a need for a method of minimizing the viscosity of titanium dioxide slurries, and to quickly prepare such slurries. Further, there is a need for a process to disperse titanium dioxide particles at high concentrations in coating compositions with a minimal amount of dispersing surfactant and with the substantial absence of grit. In particular, there is a need for a process for preparing stable, high solids, dispersions of microcomposite particles having polymer particles adsorbed onto a titanium dioxide particle.

SUMMARY OF THE INVENTION

The present invention provides a process for preparing an aqueous dispersion of composite particles, the composite particles each including a plurality of polymeric latex particles adsorbed onto a titanium dioxide particle. The resulting composite particles can be used in preparing formulated aqueous compositions, such as coating compositions and paints, which in turn give coatings in which the titanium dioxide is more efficaciously dispersed than in prior art coatings. The improved dispersion of the titanium dioxide particles provided by the process of the present invention advantageously reduces the amount of titanium dioxide required to provide desired coating properties, such as opacity or hiding, tint strength, mechanical properties, "ICI" or "cone-and-plate" (high shear rate) viscosity, gloss, and scub resistance. The process also provides coating compositions giving coatings with improved opacity for a given pigment level.

The process of the present invention employs controlled adsorption of polymeric latex particles onto titanium dioxide particles to provide composite particles. Adsorption conditions are selected to provide composite particles including adsorbed polymer latex particles, preferably at a saturation level on the titanium dioxide particles, while formation of composite particles including more than a single titanium dioxide particles, and higher levels of titanium dioxide particle aggregation, is substantially avoided. Thus, conditions are chosen such that a mixture of the titanium dioxide particles and the polymeric latex particles is just slightly unstable with respect to formation of composite particles, the values of parameters characterizing the stability of the system lying in a relatively narrow range between those characteristic of stability and those characteristic of instability with respect to aggregation. By operating in this narrow range of slight instability a slow, controlled heterocoagulation to well-dispersed composites is effected and the rapid heterocoagulation leading to substantial aggregates of titanium dioxide particles is avoided. The stability of the mixture with respect to adsorption can be adjusted in a number of ways. For example, the relative surface potential of the titanium dioxide particles and the polymeric latex particles can be varied. The stability of the mixture can also be varied by adsorbing a carefully established level of a polyelectrolyte such as a pigment dispersant onto the surface of the titanium dioxide particles. The titanium dioxide particles themselves are most frequently stabilized by surface charge, but can be stabilized by steric forces, or by a combination of surface charge and steric forces.

Preferably, in one embodiment the polymeric latex particles are polymerized from monomer which provides polymer which is hard or rigid at the temperature at which the composite particles are to be used, such as monomer which provides a polymeric material with a glass transition temperature of at least about 50° C. in the case of a composition including composite particles and applied at ambient or room temperature (that is, at about 20–23° C.). The rigidity of the adsorbed polymeric latex particles is believed to aid in spacing adjacent titanium dioxide particles.

In a presently preferred embodiment, the process of the present invention comprises:

a) suspending an inorganic material including the titanium dioxide particles in an aqueous medium;

b) suspending the polymeric latex particles in the aqueous medium, the sign of the surface charge of the polymeric latex particles being the same as the sign of the surface charge of the titanium dioxide particles, the surface potential of one of either of the polymeric latex particles or the titanium dioxide particles in the aqueous medium being greater in absolute value than the surface potential of the other of the polymeric latex particles and the titanium dioxide particles; and c) mixing the aqueous medium containing the titanium dioxide particles and the polymeric latex particles, the polymeric latex particles adsorbing onto the titanium dioxide particles to provide the composite particles.

The titanium dioxide particles and the polymeric latex particles can be mixed in any order, and in the same or different aqueous medium. When titanium dioxide particles are suspended in an aqueous medium which already includes the polymeric latex particles, as when titanium dioxide pigment is ground in an aqueous medium including polymeric latex particles as a pigment dispersant, greater volume solids can be achieved than otherwise.

In another embodiment, the process of the present invention employs polymeric latex particles which are sterically stabilized, in this case the process comprises:

a) suspending titanium dioxide particles in an aqueous medium, b) suspending the polymeric latex particles in the aqueous medium, the polymeric latex particles being stabilized against homocoagulation by polymeric steric stabilization, the surface potential of one of either of the polymeric latex particles or the titanium dioxide particles in the aqueous medium being greater in absolute value than the surface potential of the other of the polymeric latex particles and the titanium dioxide particles; and c) mixing the aqueous medium containing the titanium dioxide particles and the polymeric latex particles, the polymeric latex particles adsorbing onto the titanium dioxide particles to provide the composite particles.

Both the case of surface charge stabilization and the case of steric stabilization, as well as the case of mixed surface charge and steric stabilization, are encompassed by expressing the process of this invention in terms of energy criteria. In those terms, the process of the present invention comprises:

a) suspending titanium dioxide particles in an aqueous medium;

b) suspending the polymeric latex particles in the aqueous medium, the polymeric latex particles being stable with respect to homocoagulation; and c) mixing the aqueous medium containing the titanium dioxide particles and the polymeric latex particles, the mixture including the titanium dioxide particles and the polymeric latex particles being unstable with respect to heterocoagulation, the energy barrier with respect to heterocoagulation of the polymeric latex particles and the titanium dioxide being sufficiently great so that rapid heterocoagulation forming a substantial proportion by weight of aggregates including multiple titanium dioxide particles is avoided, the polymeric latex particles adsorbing onto the titanium dioxide particles to provide the composite particles.

It is preferred that the energy barrier with respect to heterocoagulation be less than about 10 kT, and more preferably the energy barrier with respect to heterocoagulation is at least about 3 kT. Under these conditions, the titanium dioxide particles may be slightly unstable with respect to homocoagulation, and such homocoagulation may to some extent compete with the heterocoagulation of the process of the present invention. However, the polymeric latex particles are preferably present in greater relative number concentration than the titanium dioxide particles. This greater relative concentration and the shear forces provided by the mixing of the aqueous medium containing both the titanium dioxide particles and the polymeric latex particles are believed to favor the ultimate formation of the composite particles over the formation of aggregates of the titanium dioxide particles.

The composite particles formed by the process of the present invention are themselves stable with respect to homocoagulation.

The titanium dioxide particles have a characteristic maximum level for adsorption of the polymeric latex particles. This adsorption saturation level can be determined empirically, and is believed to depend on a number of factors including geometric factors relating to the relative sizes and shapes of the titanium dioxide and polymeric latex particles. Preferably, the proportion of polymeric latex particles in the aqueous medium employed in the present process is at least great enough to provide composite particles having polymeric latex particles at this saturation level. This advantageously enhances the stability of the composite particles formed.

In practicing the first presently preferred embodiment of the process of the present invention, the aqueous medium containing the titanium dioxide particles and the polymeric latex particles is generally preferred to be substantially free of polyelectrolyte dispersants. These polyelectrolyte dispersants, such as potassium tripolyphosphate, polyacrylic acid, polymethacrylic acid, and the like, which are used as dispersion aids in preparing a pigment grind for a coating composition, are believed to adsorb to the surface of the inorganic materials in the grind, including the titanium dioxide particles, and thus increase the surface charge density or surface potential of the pigment particles. The effect of this if too much is used can be to excessively increase electrical repulsive forces between titanium dioxide particles and polymeric latex particles, thus reducing or even precluding the adsorption of the polymeric latex particles onto the titanium dioxide particles.

In one aspect of the present invention, irreversibly adsorbing polymeric latex particles are prepared and used in the presence of such polyelectrolyte dispersants. Alternatively, the level of polyelectrolyte dispersant in the grind is reduced permitting a wide variety of polymeric latex particles to be used in the process of this invention, including many commercially available latexes. In this latter case, preferably, the aqueous medium containing the titanium dioxide particles and the polymeric latex particles includes no more than a low level, such as about 0.2 percent by weight, of the polyelectrolyte dispersant based on the weight of the inorganic material. In some cases, including low levels of polyelectrolyte dispersant is preferred to reduce grit formation, the low levels of polyelectrolyte dispersant being believed to provide additional surface charge density or surface potential on the titanium dioxide particles, and reducing the rate of undesirable aggregation and grit formation.

The process of the present invention advantageously permits dispersion of titanium dioxide particles using polymeric latex particles at high titanium dioxide concentrations. In particular, the process can be carried out so that the undispersed titanium dioxide particles comprise at least about five percent by volume of the components of the mixture or pigment grind. However, the process of the present invention can be employed in compositions typically including even lower levels of titanium dioxide, such as mastic and caulk compositions in which the titanium dioxide has a PVC of about two to three percent.

The process of the present invention further contemplates preparing fully formulated aqueous compositions, including aqueous coating compositions, using the composite particles formed by adsorption of the polymeric latex particles onto the titanium dioxide particles, and the subsequent use of the fully formulated aqueous compositions to form products, including coatings, and coated articles. While the aqueous medium containing the composite particles can be used directly in some cases to form products, in many instances it is desirable to employ the aqueous medium including the composite particles as an intermediate in the production of an aqueous composition, such as a coating composition, including one or more additional components (a "fully formulated" composition).

The present process provides for the controlled adsorption of the polymeric latex on the surface of the titanium dioxide to yield concentrated, stable dispersions. The composite particles resulting from this controlled adsorption process are particularly useful for improving the performance properties and permeability of coatings and paints formed therefrom. Alternatively, the availability of the controlled adsorption process of the invention offers the ability to formulate coatings and films of substantially equal performance properties as conventional systems but with lower concentrations of expensive titanium dioxide particle concentrations and accordingly at lower cost. Further, the present process advantageously provides a means of quickly preparing low viscosity slurries of highly concentrated titanium dioxide as an intermediate for use in a variety of applications.

BRIEF DESCRIPTION OF THE DRAWINGS

FIG. 10b is a graph of 60° gloss as a function of grind PVC for the paints of FIG. 8a.

FIG. 10c is a graph of grit as a function of grind PVC for the paints of FIG. 8a.

DETAILED DESCRIPTION

Figure 1:
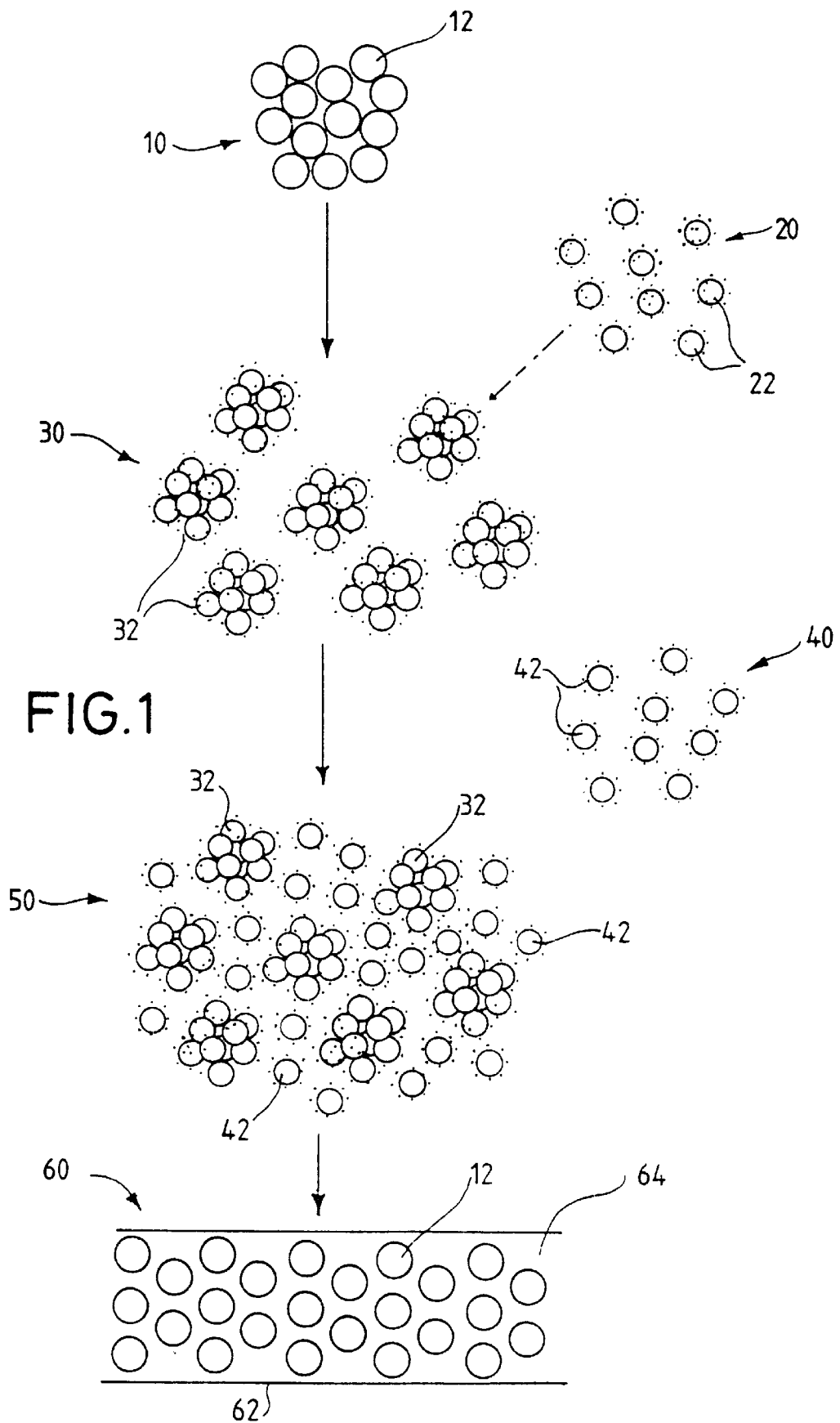
FIG. 1 is a schematic illustration of a preferred embodiment of the process of the present invention.

The process of the present invention employs the selection of properties of polymeric latexes for use in controlled adsorption onto titanium dioxide particles. In addition, the process optionally provides for the adjustment of the properties of the titanium dioxide particles themselves. The process provides a solution to the problem of how to practically utilize polymeric latex particles and titanium dioxide particles to improve the distribution and stability of the titanium dioxide particles in aqueous-based coatings containing high concentrations of titanium dioxide particles.

Polymeric latex particles of selected composition, size and surface charge can be effectively used in the process of the present invention to disperse titanium dioxide particles in concentrated dispersions. The selected polymeric latex particles function in the process by adsorbing onto the surface of the titanium dioxide particles in a controlled manner. The terminology "controlled" is used herein to distinguish heterocoagulation involving stepwise accretion of polymeric latex particles on titanium dioxide particles from gross heterocoagulation of the entire system, such as often occurs when positively and negatively charged particles are mixed. By "controlled" is meant not only that does the selected polymeric latex or polymer latexes adsorb onto the surface of the titanium dioxide particles but also that the dispersion formed therefrom is stable, and that the adsorption is accomplished in such a manner as to provide a monolayer; in the dried film this monolayer of polymeric latex efficiently spaces apart the titanium dioxide particles so as to permit them to provide improved performance properties in the final coating or film.

As distinguished from prior art processes in which polymerization takes place in the presence of and/or on the surface of inorganic particles, the process of present invention utilizes selected, separately formed, polymeric latex particles to improve the dispersion and distribution of concentrated titanium dioxide particles in polymer compositions, including dried films formed from aqueous coating compositions. More particularly, the process provides means for improving the dispersion and distribution of titanium dioxide pigment particles, such as those present at concentrations of at least about ten percent by volume of the components of an aqueous composition, by adsorption of at least one selected, separately polymerized, polymeric latex onto the titanium dioxide particles, thereby forming a stable dispersion of microcomposite particles, rather than aggregates or flocculates as would be expected employing prior art processes.

The present process provides for the controlled adsorption of the polymeric latex on the surface of the titanium dioxide in concentrated, stable dispersions. The composite particles resulting from this controlled adsorption process are particularly useful for improving the opacity, gloss, color development, permeability, high shear viscosity, scrub resistance, and mechanical properties of coatings and films formed therefrom. Alternatively, the controlled adsorption process of the invention offers the ability to formulate coatings and films of substantially equal performance properties as conventional systems but with lower titanium dioxide particle concentrations and accordingly at lower cost. Further, the present process advantageously provides a means of quickly preparing low viscosity slurries of highly concentrated titanium dioxide as an intermediate for use in a variety of applications.

A number of factors relate to and can affect the adsorption of polymeric latex particles to titanium dioxide particles. These factors include the characteristics of the polymeric latex particles, of the titanium dioxide particles, and of the aqueous medium used in the process of the invention. For example, with respect to the polymeric latex particles, these factors include the monomer composition, the particle size, and particle size distribution, and surface potential or surface charge density, as well as the nature and proportion of functional groups, such as acid groups including, for example, carboxylate and phosphate groups at the particle surface; with respect to the titanium dioxide particles, the factors include the particle size, particle size distribution, surface potential or surface charge density of the particles, whether there is an inorganic material surface coating such as alumina, silica or a mixture of alumina and silica, and whether there are other species adsorbed on the surface, such as polyelectrolyte dispersants and/or polymeric steric stabilization agents; with respect to the medium, the pH, the ionic content of the medium, and the dielectric constant can all be significant, as can the concentration and nature of other surface active substances present in the medium, such as pigment dispersants and surfactants.

In some cases a commercially available polymeric latex has suitable properties and can be selected for use in the process of this invention. In other cases, it may be desirable to modify an existing polymeric latex so that it possesses these properties. In still other cases, a special polymeric latex can be prepared for use in the process of this invention.

Similarly, some commercial grades of titanium dioxide can be dispersed in the process of this invention without prior treatment or modification. However, there may be some situations in which it is desirable to treat or modify the titanium dioxide particles before dispersion is attempted. For example, it may be desirable to adsorb a small molecular species such as an anionic surfactant to modify the surface charge density of the titanium dioxide before the dispersion is carried out. Similarly, a cationic material could be adsorbed to make the surface charge density of the titanium dioxide less negative. In other cases it may be desirable to select a commercially available grade of titanium dioxide with an appropriate inorganic material surface treatment (such as surface silica or alumina) to give a desired surface potential. In some cases, it may be desirable to adsorb a polyelectrolyte dispersant or a polymeric steric stablization agent onto the surface of the titanium dioxide particles.

In addition, it may be desirable to modify the aqueous medium used, such as by adjusting the pH to provide the desired zeta potentials on the particles, by addition of salts to increase the ionic strength of the medium, or the like. Further, modification of the aqueous medium before dispersion of the titanium dioxide, or subsequent to that dispersion, can be accomplished by addition of surface active agents such as conventional polyelectrolyte pigment dispersants or anionic surfactants, or the like, with the understanding that such surface active agents may adsorb to the titanium dioxide particles and change their effective surface potential. Modification of the medium may also occur as an incident to steps taken to modify the surface properties of the polymeric latex or the titanium dioxide particles.

In a first presently preferred embodiment of the process of this invention the polymeric latex particles which are adsorbed have a surface charge with the same sign as the surface charge of the titanium dioxide particles. Usually, both the polymeric latex particles and the titanium dioxide particles will have a negative surface charge. One of either the polymeric latex particles or the titanium dioxide particles can have a surface potential which is greater in absolute value than the other of the polymeric latex particles and the titanium dioxide particles. For example, the polymeric latex particles can have a surface potential in the aqueous medium which is greater in absolute value than the surface potential of the titanium dioxide particles. In prior art processes in which the polymeric latex particles and the inorganic particles have surface charges with opposite signs uncontrollable aggregation typically occurs, especially at high particle concentrations.

Depending on other factors, such as the presence and nature of polyelectroyte dispersant and/or polymeric steric stabilization agent adsorbed on the surface of the titanium dioxide particles, the absolute value of the difference in surface potential between the titanium dioxide particles and the polymeric latex particles, the signs of the surface charges on the titanium dioxide particles and the polymeric latex particles can differ. For example, under some conditions the surface potential of the titanium dioxide particles can be slightly positive, while the surface potential of the polymeric latex particles is sufficiently negative so that the resulting composite particles have a stabilizing negative surface potential.

One embodiment of the process of the present invention is illustrated schematically in FIG. 1. A powder of titanium dioxide pigment 10 including titanium dioxide particles 12, partially aggregated or agglomerated (by van der Waals, or contact forces, or by moisture, or the like), is mixed with an aqueous dispersion 20 of polymeric latex particles 22, each polymeric latex particle 22 having a greater negative surface potential than the titanium dioxide particles 12. If desired, a small amount of an aqueous medium (not shown) can be added to reduce the concentration of the particles, while typically the aqueous dispersion 20 of polymeric latex particles 22 will supply a satisfactory amount of aqueous medium for the dispersion of the titanium dioxide pigment 10. The mixture of titanium dioxide pigment 10 and the aqueous dispersion 20 is subjected to shear forces in a disperser (not shown), and the polymeric latex particles 22 spontaneously adsorb to the surface of titanium dioxide particles 12 to form a slurry or pigment grind 30 of composite particles 32 dispersed in the aqueous medium. Depending on conditions, the spontaneous adsorption can occur over the course of a few seconds, or may require up to several days. Without the addition of the polymeric latex particle and the application of shear forces by mixing, the titanium dioxide particles may form homo-aggregates, as conditions are preferable selected so that the titanium dioxide particles are slightly unstable with respect to homo-coagulation.

FIG. 1 further illustrates the addition of a second aqueous dispersion 40 of another variety of polymeric latex particles 42 to the slurry 30 of composite particles 32 to form a formulated coating composition 50 including a mixture of composite particles 32 and second polymeric latex particles 42. In addition, other components such as low molecular weight cosolvents, plasticizers, thickeners, anti-fungal and anti-bacterial agents, stabilizers and the like can be added (not shown) to provide a fully formulated coating composition. The fully formulated coating composition is then applied by conventional means to a surface 62 and permitted to dry and cure, thus forming a coating film 60 in which the titanium dioxide pigment particles 12 are imbedded in a continuous polymeric film 64 formed from the first variety of polymeric latex particles 22 and the second variety of polymeric latex particles 42. The spacing of the titanium dioxide particles 12 in the film 60 is not random, but instead is improved in comparison with prior art coatings films, so as to provide enhanced opacity.

Figure 2:
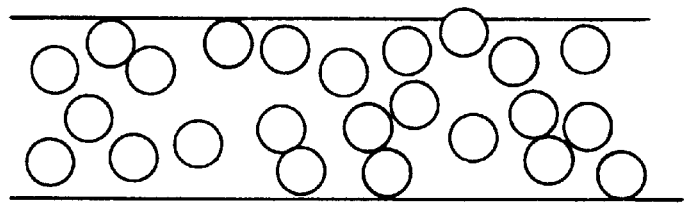
FIG. 2 is a schematic illustration of the distribution of titanium dioxide particles in a coating film formed from an aqueous composition prepared using a conventional prior art process.
Figure 3:
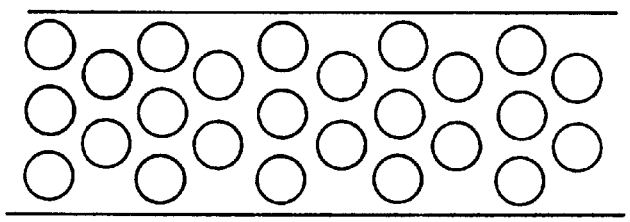
FIG. 3 is a schematic illustration of the distribution of titanium dioxide particles in a coating film formed from an aqueous coating composition prepared using the process of the present invention.

FIG. 2 schematically illustrates the distribution of titanium dioxide particles in a coating film formed from an aqueous composition prepared using a conventional prior art process. After thorough mixing of coating compositions, particles tend to be distributed in a random manner through the film, with many particles not contributing as much to the total light scattering of the film because they are closer to other particles than optimal. In contrast, FIG. 3 schematically represents the distribution of titanium dioxide particles in a coating film formed from an aqueous coating composition using the process of the present invention. In this case, the particles are more regularly distributed in the film, resulting in greater effective light scatter per particle. Alternatively, fewer particles will provide a desired degree of opacification, and the coating PVC can be lower than if a prior art titanium dioxide dispersion method were used.

It is believed that the controlled adsorption effected by the process of the present invention, at least in the case in which repulsive forces are provided by surface charge, can be understood by reference to the heteroparticle interaction theory of Hogg, Healy and Fuerstenau, which provides that the potential energy $V_R$ resulting from the repulsion of like charges on particles of two different radii, $a_1$ and $a_2$, and having differing surface potentials, $P_1$ and $P_2$, in a aqueous medium with dielectric constant c, is given by Equation I:

$$V_R = [ca_1a_2(P_1^2+P_2^2)/4(a_1+a_2)][2P_1P_2/(P_1^2+P_2^2)*ln[(1+e^{-Kd})]+ ln(1-e^{-2Kd})] \quad (I)$$

In Equation I K is a constant, the reciprocal of the so-called Debye length, inversely proportional to the square root of the ionic strength of the medium and d is the distance between the centers of the particles. In addition, for small particle separations, the van der Waals attractive potential $V_A$ is approximated by Equation II:

$$V_A = -Aa_1a_2/6(a_1+a_2)d \quad (II)$$

Figure 4:
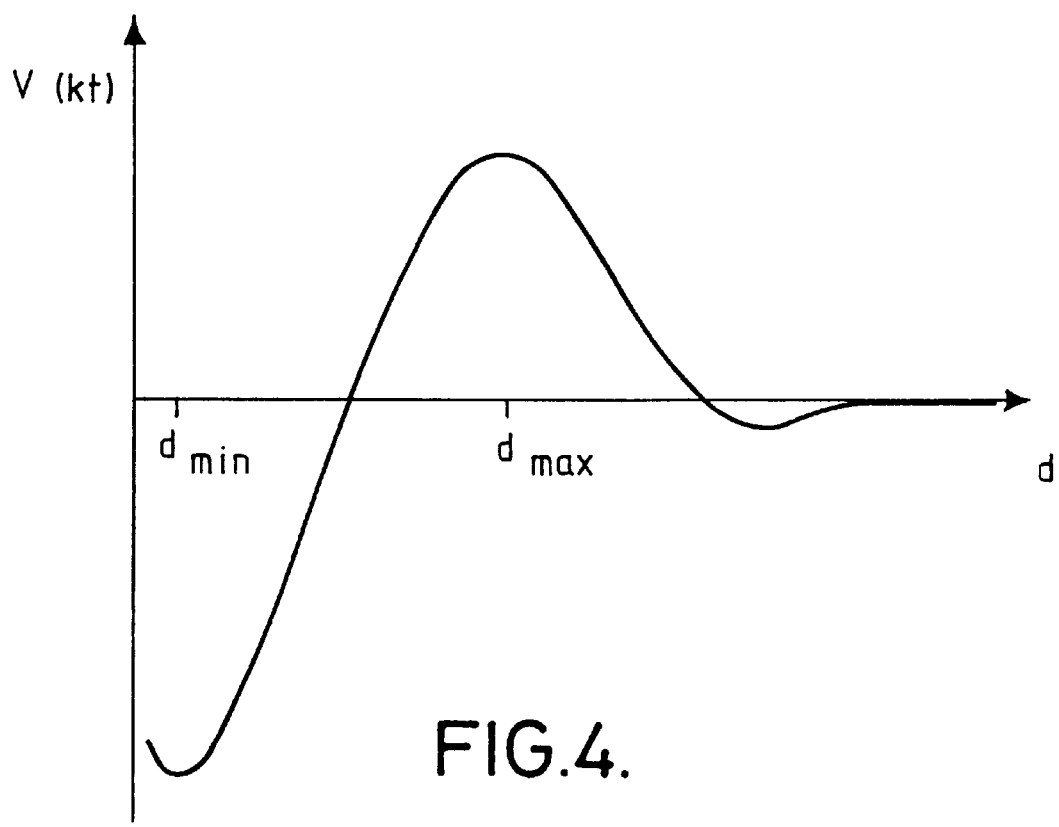
FIG. 4 is a schematic representation of a titanium dioxide particle and a polymeric latex particle for illustration of the attractive and repulsive forces relating to heteroparticle adsorption.

In Equation II, A is the Hamaker constant for the heteroparticle system. A qualitative plot of the net potential energy, $V_T = V_R + V_A$, as a function of the particle separation distance d for a pair of particles with differing surface charges is given in FIG. 4. The plot shows an energy barrier to coagulation at $d_{max}$. If the energy barrier is less than about 10 kT, a mixture of the hetero particles is relatively unstable to coagulation, so that formation of composite particles can occur. However, too low an energy barrier to heterocoagulation, such as on the order of about 2 or 3 kT, will lead to too rapid a heterocoagulation process, and to the formation of agglomerates including more than a single inorganic material particle, rather than the desired composite particle including no more than a monolayer of adsorbed polymeric latex particles. Similarly, the height of the energy barrier is believed to be related to the rapidity with which composite particles are formed. The height of the energy barrier is seen to be determined by a number of parameters which may be adjustable to provide a mixture stable with respect to gross heterocoagulation, but which provides composite particle formation at a desired rate. For example, the height of the barrier increases with increasing particle size and surface potential, but decreases with increasing ionic strength and increasing Hamaker constants. By adjusting these parameters it is often possible to avoid gross heterocoagulation, while obtaining composite particle formation on a time scale that can be varied from on the order of the time of mixing to on the order of several days or more. The plot also shows a local minimum at $d_{min}$, corresponding to an adsorbed particle pair.

Thus, it can be seen that the present invention provides a process for preparing an aqueous composition including dispersed composite particles in which titanium dioxide particles are suspended in an aqueous medium, the titanium dioxide particles being slightly unstable with respect to homocoagulation, while also suspending the polymeric latex particles in the aqueous medium, the polymeric latex particles being stable with respect to homocoagulation. However, the mixture including the titanium dioxide particles and the polymeric latex particles is unstable with respect to heterocoagulation and the resultant formation of composite particles having polymeric latex particles adsorbed unto titanium dioxide particles. Mixing the aqueous media including both the titanium dioxide particles and the polymeric latex particle is believed to favor heterocoagulation forming composite particles over formation of homo-aggregates of titanium dioxide particles. Yet, the energy barrier with respect to heterocoagulation of the polymeric latex particles and titanium dioxide particles is sufficiently great so that rapid heterocoagulation forming a substantial proportion by weight (such as about one percent by weight of total solids) of aggregates including multiple titanium dioxide particles is substantially avoided.

The weight of aggregated material including multiple titanium dioxide particles ("grit") which is acceptable depends greatly on the properties required in the fully aqueous compositions. For example, when the dispersed composite particles prepared by the controlled adsorption effected by the process of the present invention are formulated into high gloss aqueous coating compositions, even very low levels of macroscopic aggregation leading to grit can significantly detract from the appearance of the coated article. This effect can be gauged readily by visual observation, either directly or with the aid of a low powered optical microscope, of a dried film prepared by drawing down a smooth layer of the high gloss aqueous coating over an impervious substrate. In cases of severe grit, the dried coating will display a very rough surface texture with an almost sand paper-like appearance. In mild cases, however, the surface will have normal smoothness with only an occasional grit particle protruding. Since gloss is not measurably reduced by such low levels of grit it becomes a subjective decision as to just how much grit is tolerable without unduly compromising appearance. Lower gloss coatings show similar behavior except that the grit is less apparent to the observer and therefore slightly higher levels may be allowable. For applications where appearance is not of major concern, other criteria will determine the acceptable grit level, for example, viscosity or mechanical strength. In such cases much higher levels of grit are usually permissible and other methods of assessing grit may be more useful.

In the present invention there is a net repulsive potential barrier height between the latex particles such that they themselves have a high degree of mutual stability, yet the repulsive potential barrier height between latex particles and titanium dioxide particles is sufficiently low such that there is a practically useful rate of accretion of latex particles on the titanium dioxide particles. The repulsive potential barrier between titanium dioxide particles themselves needs to be maintained only to a degree adequate such that they can be at least temporarily deagglomerated under the shearing forces during the mixing of the latex and titanium dioxide particles. In general, for particles stabilized by surface charges, the ordering of relative colloidal stability of the various particle pairs in the absence of shearing forces will be as follows: (latex-latex) is greater than (latex-titanium dioxide), which in turn is greater than (titanium dioxide-titanium dioxide). In general, the repulsive potentials between particles, unlike as well as like, will depend on surface potential or charge—varying to a first approximation as the product of the surface potentials on the two particles, the particle diameters, dielectric constant and ionic strength of the medium, and on the attractive force constant between the particles, e.g., the Hamaker constants.

In the first presently preferred embodiment of the process of the present invention the polymeric latex particles in the aqueous medium have a surface charge density or surface potential which is greater in absolute value than the surface charge density or surface potential of the titanium dioxide particles in the aqueous medium.

It is understood that both the absolute values of the surface potentials and the the magnitude of the difference in surface potentials are related to the force driving the adsorption, and in particular the magnitude of the electrical repulsion forces opposing adsorption.

An alternative way to stabilize colloidal particles against uncontrolled aggregation is to provide a surface layer or sheath of water-soluble polymer around the colloidal particle, the chains of which polymer extend into the aqueous phase. This provides a steric barrier between the particles and between such a particle and other surfaces. A variety of water soluble polymers are suitable, e.g., polyacrylamide, polyvinyl alcohol, polyethylene oxide, water soluble polymers derived from cellulose. The water soluble polymers may be suitably attached to the particle surfaces by several means, among them by chemical grafting, such as through polymerizable unsaturated groups linked to the water soluble polymer, as well as by physical adsorption, often enhanced by the presence of a hydrophobic group attached to the water soluble polymer. The hydrophobic group may be simply a hydrocarbon chain or a water insoluble block polymer attached to the water soluble portion of the polymer. Steric stabilization has been thoroughly described by a number of authors, e.g., D. H. Napper, *Polymeric Stabilization of Colloidal Dispersions*, Academic Press, 1983; E. D. Goddard and B. Vincent, *Polymer Adsorption and Dispersion Stability*, ACS Symposium Series 240, 1984. Partial to thorough aggregation of sterically stabilized particles may be accomplished by reducing the solvency of the medium for the attached polymer chains, e.g., by variations in temperature, pressure, or composition of the liquid medium as described by Napper, 1983, chapter 5. For instance, a dispersion sterically stabilized with polyethylene oxide chains can be destabilized by the addition of salt or a water miscible non-solvent for the polymer.

Thus, as in the case of charge-stabilized particles, relative interparticle repulsive forces may be adjusted to permit controlled adsorption of, for example, sterically stabilized polymeric latex particles onto a titanium dioxide particle surface. Hence, the present invention provides a process for preparing an aqueous dispersion of composite particles, the process comprising suspending titanium dioxide particles in an aqueous medium. In this aspect, the process further includes suspending the polymeric latex particles in the aqueous medium, the polymeric latex particles being stablized against homocoagulation by polymeric steric stabilization, and the surface potential of one of either of the polymeric latex particles or the titanium dioxide particles in the aqueous medium being greater in absolute value than the surface potential of the other of the polymeric latex particles and the titanium dioxide particles. Also included is mixing the aqueous medium containing the titanium dioxide particles and the polymeric latex particles, the polymeric latex particles adsorbing onto the titanium dioxide particles to provide the composite particles.

In the case of particles stablized by surface charge, an approximate measure of, and often useful guide to, the surface potential of particles in an aqueous medium is the particles' zeta potential. However, it should be noted that there may be a significant difference between the measured zeta potential and the potential at the true titanium dioxide particle surface when dispersants, surfactants, or other materials, such as cellulosic thickeners or protective colloids, are adsorbed onto the surface of the titanium dioxide particles.

The measurement of zeta potentials is discussed in detail in R. J. Hunter, *Zeta Potential in Colloid Science* (Academic Press 1981). Although a variety of techniques have been used for determining zeta potentials, the most common method for colloidal suspensions of either polymeric latex particles or dispersed titanium dioxide particles is electrophoresis, in which the movement of individual particles under the influence of an external electric field is observed, either directly, by a light microscope, or indirectly. The particle velocities or mobilities measured are then used to calculate the zeta potential. As measurements must be made at low concentrations (for example, at 0.1% w/w or less), samples often must be substantially diluted with an appropriate diluent, such as a standard reference solution, or an aliquot of the sample's own continuous phase ("serum") obtained by filtration, centrifugation, or another method.

In the first preferred embodiment of the present process it is preferred that the zeta potential of the polymeric latex particles in the aqueous medium be greater in absolute value (that is, more negative) than the zeta potential of the titanium dioxide particles in the aqueous medium. Preferably, the absolute value of the zeta potential of the polymeric latex particles is at least about 20 mv and more preferably at least about 40 mv, while the absolute value of the zeta potential of the titanium dioxide particles is at least about 5 mv and more preferably at least about 20 mv.

It is preferable that the surface potential of the polymeric latex be more negative than about −20 mv (measured as zeta potential) otherwise the polymeric latex particles themselves will tend to lack adequate stability despite the fact that they may nonetheless be attracted to and adsorb on a titanium dioxide particle. It is even more preferable in this regard that the surface potential be more negative than about −40 mV. On the other hand, it is preferred that the surface potential of the polymeric latex be not more negative than about −150 mV, otherwise the forces of electrostatic repulsion between the polymeric latex particle and a negatively charged titanium dioxide particle may be so strong as to preclude adsorption. Thus it is more preferred that the potential of the polymeric latex particles in a given practical circumstance be within these general ranges as determined by the rational empirical experimental procedure described above in the determination of surface saturation adsorption.

It is preferable that the surface potential of the titanium dioxide particle be more negative than about −5 mv, and even more preferable that it be more negative than about −20 mV. In any event it should not be more negative than about −70 mV, otherwise the repulsive forces between the titanium dioxide particle and the emulsion polymer particle will be so great as to preclude adsorption for all practical purposes. Again, the optimum surface potentials are best established by the empirical procedure for the desired combination of titanium dioxide and polymeric latex particles.

The surface potential and the zeta potential of a particle suspended in an aqueous medium can often be adjusted by changing the characteristics of the aqueous medium. For example, many inorganic particles, including titanium dioxide particles, have acidic and/or basic functional groups at their surfaces, or can be treated to provide such groups at the particles' surfaces, such as by adsorpsion of anionic pigment dispersants and/or anionic surfactants, and the surface potential of these particles can be adjusted by varying the pH of the aqueous medium. Similarly, polymeric latex particles can be synthesized with acidic and/or basic functional groups at their surfaces, and the surface charge density of these particles can also be adjusted by varying the pH of the aqeuous medium. In case of synthetic polymeric latex particles, the absolute value of the surface charge density can also be controlled by adjusting the density of surface acid and/or base groups through selection of polymer composition and polymerization process variables. An emulsion polymerization process which provides a preferential distribution of acid functionality for the particles, such as proximate the surface of the particles, can be used to prepare the polymeric latex particles.

The zeta potential of commercial grades of rutile titanium dioxide typically varies inversely with pH, from about 50 mv at a pH of about 3.5 to about −30 mv at a pH of about 11, the zeta potential generally being negative in a basic aqueous medium. Preferably, the zeta potential of the titanium dioxide used in the process of the present invention is negative, with a zeta potential from about −5 mv to −70 mv being preferred, a zeta potential from about −10 mv to −65 mv being more preferred, and a zeta potential from about −20 mv to −60 mv being especially preferred.

The zeta potential of the polymeric latex particles used in the first presently preferred embodiment of the process of this invention is more negative than the zeta potential of the titanium dioxide particles, and preferably is from about −20 mv to −120 mv, more preferably from about −40 mv to −110 mv.

The strength with which the polymeric latex particles are adsorbed onto the titanium dioxide particles reflects a balance between the material attraction forces, an approximate measure of which is the product of the respective Hamaker constants for the two types of particles, and electrical repulsive forces, an approximate measure of which is the product of the zeta potentials for the two types of particles. The geometric mean of the Hamaker constants for titanium dioxide and many types of synthetic polymer latexes in commercial use is estimated to be about 1 to $3 \times 10^{-13}$ erg, and to be only slightly dependent on the grade of titanium dioxide and polymer composition. On the other hand, the product of the zeta potentials depends directly on the zeta potential of the polymeric latex particles (and the titanium dioxide particles), which can be adjusted by varying pH, polymer composition, polymerization process variables, and the like. In the first embodiment of the present process of the invention, the product of the zeta potentials preferably is from about 100 $mv^2$ to 8400 $mv^2$.

Serum pH can have large effects on the surface potential of colloidal particles and accordingly can be used for purposes of adjustment as long as pH requirements are not fixed by other performance requirements of the coating or other aqueous formulation. For instance, metal container corrosion and rusting of ferrous substrates can occur if a coating formulation pH is too low, for example, less than about 7–8, and thus one could not access lower pH for the purpose of preparation of the colloidal microcomposites of the invention although, of course, pH can often be readjusted upward following their preparation at lower pH. It is well known that lower pH will tend to make the surface potential of particles more positive, and vice versa. The entire accessible pH scale is useful in the practice of this invention although it is preferred for reasons of excessive particle solubility, corrosion both to substrates and to the skin, and the like to restrict the range to approximately 2 to 12 and more preferably in the range of from about 4 to about 10. Numerous examples of the effect of pH on zeta potential both for inorganic and organic particles are found in texts on colloid chemistry such as R. J. Hunter, *Zeta Potential in Colloid Science,* Academic Press, 1981.

Another variable in controlling the adsorption process can be whether the titanium dioxide particles have been subjected to prior surface treatment processes. For example, titanium dioxide is available with various types of prior surface treatments which provide surface coatings of alumina or silica or mixtures of both, the treated inorganic material particles each exhibiting differing adsorption characteristics, as discussed in A. Brisson et al., *J. Coatings Tech.* 63 59–65 (1991).

The ionic content of the serum can affect the particle adsorption process in several ways. Increased serum ionic content, for example, as expressed in terms of ionic strength, reduces the repulsive force between the charged particles thereby promoting the adsorption. Also, for a given organic or inorganic colloidal particle, there may be a specific adsorption of certain ions, and the surface potential of the particle will be raised or lowered according to the sign of charge of the ion. In general, however, one usually desires to minimize the electrolyte content of aqueous polymeric latex formulations because of deleterious effects on water resistance of the dried films or coatings, and it is more advantageous to adjust surface potentials of the emulsion and inorganic particles by more selective additives such as the dispersants such as those of the polyelectrolyte type and surface active agents heretofore noted. However, in the case of an ion which may specifically and efficiently adsorb on a particle its use may be advantageous. For example, multivalent cations such as $Al^{+3}$ are useful at low levels, for example, less than about one percent based on the weight of the inorganic particle, in reducing the surface charge of titanium dioxide without resorting to pH reduction alone. Additional examples of the effect of ionic content on surface potential are described in standard texts such as Hunter's *Zeta Potential in Colloid Science.*

The adsorption process of the present invention is dependent on the particle sizes of the polymeric latex particles and the titanium dioxide particles to be dispersed therewith, as well as the amount of the polymeric latex and titanium dioxide particles in the aqueous adsorption medium. An important variable in the process is whether the amount of the selected polymeric latex used to disperse the titanium dioxide particles is present at a concentration which is sufficient to adsorb onto and saturate the entire surface of the titanium dioxide particle surface. It is believed that the empirical saturation level observed depends primarily on particle size, and that other factors such as surface charge, polymeric latex glass transition temperature, and the like, have little effect.

Applying geometric principles, the saturation concentration of one spherical particle on the surface of another spherical particle can be calculated from the relative particle sizes of the polymeric latex particle and the titanium dioxide particle, provided that certain assumptions are made, such as, for example, that the polymeric latex particles are spherical, that they do not deform upon adsorption, and that they are able to totally encapsulate the entire surface of the titanium dioxide particle. The minimum amount or number of a specific type of spherical polymeric latex particles which can saturate the surface of a specific type of spherical titanium oxide particle is determined empirically and is referred to herein as the "saturation level" of the polymeric latex particle on that titanium dioxide particle. The empirically determined saturation level has been found to be about one-third to one-half the calculated saturation level possible, the difference being believed attributable to geometric and other factors. The saturation level is useful as a guide for evaluating the progress or extent of the controlled adsorption process of the invention. It is preferred that the process of the present invention be carried out at or above the saturation level, in order to obtain optimum performance properties in fully formulated products prepared using the process.

In practice, commercially available particles, especially inorganic material particles such as titanium dioxide particles, are rarely uniform in size and spherical in shape, and in fact vary widely in size and shape, even within a given grade. The surfaces of the particles may also vary from point to point in colloidal characteristics such as in local surface charge and potential. Furthermore, a polymeric latex particle once adsorbed may not have adequate lateral mobility that permits rearrangement in the presence of other adsorbed particles to achieve close packing of the polymeric latex particles on the surface of the titanium dioxide particle. In addition, since the adsorbed latex particles generally will bear significant repulsive surface potential, there will be tendency for lateral repulsive forces between them which may also be sufficient to hinder close packing.

Thus, in the practice of this invention the determination and establishment of the surface saturation condition is conducted in an empirical but rational manner through experimental measurements of adsorption, increasing the concentration and/or total amount of polymeric latex offered to the titanium dioxide particles until the amount of polymeric latex adsorbed per unit of titanium dioxide particle approaches a plateau value. This plateau level of adsorption is referred to as the saturation level of adsorption. The saturation level is a guide for utility of the adsorption conditions for practice of the invention inasmuch as adsorption levels much less than those of saturation tend to result in microcomposite particles that have inadequate stability relative to each other and will tend to undergo further and more macroscopic aggregation resulting in grit in end use systems such as coatings and films that will detract not only from appearance but from other desirable optical, physical, and resistance properties.

In preparing coating formulations possessing desirable performance properties it may be desirable for the polymeric latex used in the controlled adsorption process of the invention to also function as the polymeric binder for the coating or film. In order for a polymeric latex to function as a binder it will typically be required to be present in the coating or film formulation in an amount greater than its saturation level, especially in coating formulations requiring a low pigment volume concentration. Therefore, when in one embodiment of the process of this invention the selected polymeric latex is to be used as both a dispersant for the titanium dioxide particles and as a binder for the coating or film, the proportion of the polymeric latex which is adsorbed on the titanium dioxide particles will be related to the desired pigment volume concentration of the coating or film.

The absolute percentage of the total amount of the polymeric latex used in the process which actually becomes adsorbed onto the titanium dioxide particles is not, therefore, in this embodiment of the process of the present invention, a meaningful expression of the efficiency of the controlled adsorption process of the invention, without reference to the saturation level of the polymeric latex relative to the titanium dioxide particles onto which it is to be adsorbed. For example, at coating pigment volume concentrations at which the polymeric latex is present at concentrations below the saturation level (i.e. high PVC), the percent of polymeric latex adsorbed onto the titanium dioxide particles may approach 100%, but this does not indicate whether the adsorption process will be effective in providing stability to the composite particle or improved performance properties for the coating or film.

The advantages of the process of the invention may not be achieved even at 100% adsorption if an insufficient amount of the polymeric latex were available for dispersing the titanium dioxide particles in a controlled manner. Similarly, in coating or film formulation where the polymeric latex also functions as the binder and where the pigment volume concentration of the coating or film reflects a concentration of polymeric latex at or above the saturation level (i.e. low PVC), the absolute percentage of the polymeric latex which is adsorbed onto the titanium dioxide particles may be much lower than the absolute percentage of polymeric latex adsorbed on the same titanium dioxide particles at concentrations below the saturation level, but the adsorption process is effective and controlled. This result is primarily due to the fact that because there is more polymeric latex present than that which can possibly adsorb onto the titanium dioxide particles (at or above the saturation level), the advantages of the controlled adsorption process may be achieved even though not all the polymeric latex present is functioning in the adsorption process. Accordingly, when evaluating the effectiveness of the process of the invention it is more important to determine the extent of the adsorption of the polymeric latex onto the titanium dioxide particles relative to the saturation concentration of the polymeric latex than to determine the absolute percentage of the polymeric latex which has adsorbed onto the titanium dioxide particles.

With regard to the average particle size or diameter of the polymeric latex particles and the titanium dioxide particles employed in the present process, it is generally preferred that the polymeric latex particles have an average diameter of from about 20 nm to about four times that of the titanium dioxide particles. However, the optimum relative particle sizes are strongly dependent on the rigidity of the polymeric latex particles, as measured, for example, by their glass transition temperature, and the pigment volume concentration of the coating or product formed from the composition including the composite particles. In at least some coating compositions, hiding is maximized when the polymeric latex particle diameter is greater than the titanium dioxide particle diameter.

The concentration of the titanium dioxide particles (and any other pigments which may be present in the composition) in a coating formulation is expressed in terms of the pigment volume concentration of the formulation. The pigment volume concentration (hereinafter referred to as the "PVC") of a formulation is defined as the volume amount of inorganic particles, including titanium dioxide and other pigment particles as well as extender particles, present in the formulation, divided by the sum of the volume amount of such inorganic particles plus polymeric latex particle solids in the formulation. The overall concentration of pigment particles, extender particles and emulsion polymer particles in a formulation is typically expressed in terms of a percent volume solids for the formulation. The percent volume solids is an expression of the extent of the dilution of the solids in a liquid vehicle, such as water.

If the selected polymeric latex is employed at a concentration equal or greater than the natural saturation level for the selected titanium dioxide particle, the extent of adsorption of the polymeric latex on the surface of the titanium dioxide particle is maximized, and that under such circumstances the viscosity of the dispersed formulation (referred to hereinafter as the "grind" and "grind viscosity", respectively) is effectively minimized. The minimization of the grind viscosity is an expression of the effectiveness of the controlled adsorption process for stabilizing the titanium dioxide particles. Minimizing the grind viscosity is of commercial importance for transporting highly concentrated dispersions of the titanium dioxide particles prior to formulating the dispersion into a coating or film. Consequently, the process of the present invention advantageously provides in particular highly concentrated titanium dioxide slurries with minimized viscosities.

Further, through the selection of the polymeric latex composition the adsorption of the polymeric latex particles on the surface of the titanium dioxide particle can occur substantially upon the intimate mixing or grinding of the polymer latex with the titanium dioxide particles, depending upon the selection of process conditions. The ability to effect substantially immediate adsorption is an important aspect of the present invention as it minimizes any delay between the preparation of the dispersed titanium dioxide dispersion and its transportation or use in preparing the final coating formulation.

It is desired that conditions be selected so that the rate of formation of the composite particles be significantly greater than the rates of competing processes, such as the formation of aggregates of titanium dioxide particles (i.e. homocoagulation processes), while at the same time the formation of aggregates including multiple titanium dioxide particles and polymeric latex particles are substantially avoided. Thus, in terms of interaction strengths, the homoparticle interactions should be repulsive enough to prevent significant homocoagulation of the titanium dioxide particles for a long enough period to permit formation of the composite particles, while heteroparticle interactions should be attractive enough to drive the formation of composite particles before significant homocoagulation occurs, but not so great so that rapid heteroparticle interaction results in the formation of significant amounts of aggregated material including multiple titanium dioxide particles ("grit"). The extent of grit formation can be assessed empirically by making a draw-down of the fully formulated composition including the composite particles and noting the appearance of granular or irregular texture. Thus, grit formation is more readily apparent, and more undesirable, in gloss and semi-gloss coating compositions, than in flat paints, for example. Variables which influence the relative magnitudes of the homoparticle interaction and the heteroparticle interaction include Hamaker constants, particle surface charge, the presence and nature of dispersants or surfactants adsorbed on the surface of the titanium dioxide particles, the pH and ionic strength of the aqueous medium, as well as adsorption reaction conditions such as particle concentrations, temperature, and agitation.

The polymeric latexes used in the practice of the process of the present invention can have monomer compositions and particle sizes typical of polymeric latex binders prepared by standard emulsion polymerization techniques known in the art. If it is otherwise desirable to employ conventional levels of a polyelectrolyte dispersant in a pigment dispersion, it may be possible to employ an irreversibly adsorbing polymeric latex to adsorb to the titanium dioxide particles. Irreversibly adsorbing polymeric latex particles can be prepared by emulsion polymerization processes by selection of process variables and the monomer composition.

In one class of embodiments of the process of the present invention, the polymeric latex particles serve as binder for the product formed by the fully formulated aqueous composition. In this case the effective glass transition temperature of the adsorbed polymeric particles is preferably less than about 60° C., assuming the fully formulated composition is intended for use at room temperature, and film formation must consequently take place at room temperature.

In one aspect of this class of embodiments, the polymeric latex particles are selected such that they can be used to disperse the titanium dioxide particles in the absence of polyeletrolyte dispersant and also serve as binder for the product. In another aspect of this embodiment, the polymeric latex particles are selected such that they can be employed to displace a polyelectroyte pigment dispersant from the surface of the titanium dioxide particles. When the polymeric latex particles are used to displace a pigment dispersant, it is preferable that the factors relating to adsorption, such as the polymeric latex surface potential, are chosen so that polymeric latex particles bind irreversibly to the titanium dioxide particles.

In another class of embodiments of the process of the present invention, the polymeric latex particles do not themselves provide a binder for the product formed by the fully formulated aqueous composition. Because they are not required to flow and form a film, the particles can be more rigid than those employed to provide a binder. Thus, the polymeric particles can have a higher effective glass transition temperature than polymeric particles employed to serve as binder, and can include rigidifying levels of crosslinking. In this case the polymeric latex can also be prepared by standard emulsion polymerization techniques, but typically will not possess the requisite low glass transition temperature suitable for use as a film-forming binder, for example, for paint to be dried at ambient room temperature. In this case, the effective glass transition temperature of the polymeric latex particles is preferably at least about 50° C.

The polymeric latex particles used in these embodiments are preferably selected based on an ability to adsorb rapidly and irreversibly onto the titanium dioxide particles. Such particles are not displaced from the surface of the titanium dioxide particles upon addition of a second variety of polymeric latex having a monomer composition and physical properties which differ from that of the initial polymeric latex.

This aspect of the invention advantageously provides enhanced flexibility in formulation. For example, the second variety of polymeric latex particles can be polymeric latex which has a monomer composition and physical properties which have been optimized for use as a binder for a specific coating application. Some of these optimized properties may not be consistent with use of this specific polymeric latex as a pigment dispersant in the process of the present invention.

In one subclass of these embodiments, the polymeric latex particles of the first variety are used initially to disperse the titanium dioxide particles, and the second variety of polymeric latex particles, the binder-forming particles, are subsequently mixed with the dispersed titanium dioxide particles. In another subclass of these embodiments, dispersion can be otherwise effected, as with a polyelectrolyte pigment dispersant, with a mixture of irreversibly adsorbing polymeric latex particles and binder latex particles being subsequently mixed with the dispersed titanium dioxide particles, the irreversibly adsorbing polymeric latex particles in the presence of the pigment dispersant and advantageously spacing the titanium dioxide particles in the product of the formulated composition to give improved opacity, while the binder latex particles provide a continuous film otherwise optimized for the application.

Irreversibly adsorbing polymeric latex particles useful in the process of this invention may be prepared by several alternative processes. In one such process, emulsion polymerization process variables are controlled to provide a preferred distribution of acid functionality for the polymer latex particles. In particular, processes which provide carboxylate functionality preferentially at the surface of the polymeric latex particles are preferred.

In another process for preparing irreversibly adsorbing polymeric latex particles, the monomer mixture from which the polymeric latex is polymerized includes at least one dihydrogen phosphate ester of an alcohol in which the alcohol contains a polymerizable vinyl or olefinic group; examples include allyl phosphate, alkyl cellosolve phosphate, hydroxyethyl methacrylate phosphate, the mono- or diphosphate of bis(hydroxyethyl) fumarate or itaconate, etc. In particular, polymeric latex particles polymerized from monomer mixtures including the dihydrogen phosphate ester of 2-hydroxyethyl methacrylate are preferred.

In yet another process for preparing irreversibly adsorbing polymeric latex particles, the monomer mixture from which the polymer latex is polymerized includes at least one ethylenically unsaturated, polymerizable, dicarboxylic acid. In particular, polymeric particles polymerized from monomer mixtures including itaconic acid are preferred.

In general it is believed that reducing the effective glass transition temperature of the polymeric latex (for example, by changing the monomer composition) increases the tendency to adsorb irreversibly, as does increasing the level of acid-functional monomers or the level of phosphate ester-functional monomers or itaconic acid in the composition.

Thus, the present invention provides aqueous dispersions of composite particles, as well as coating compositions and pigment slurries including such composite particles, wherein the composite particles each comprise a plurality of polymeric latex particles adsorbed to a titanium dioxide particle, the polymeric latex particles including dihydrogen phosphate ester functional groups. These dihydrogen phosphate ester functional groups are believed to result from the polymeric latex particles being polymerized from monomer including at least one polymerizable dihydrogen phosphate-functional monomer. The polymerizable dihydrogen phosphate-functional monomer can be selected from the dihydrogen phosphate esters of an alcohol, the alcohol including a polymerizable group selected from polymerizable vinyl groups and polymerizable non-vinyl olefinic groups. Preferably, the polymerizable dihydrogen phosphate-functional monomer is selected from the dihydrogen phosphate monoester of 2-hydroxyethyl methacrylate, and mixtures of the dihydrogen phosphate monoester of 2-hydroxyethyl methacrylate and the phosphoric acid diester of 2-hydroxyethyl methacrylate. Similarly, the present invention provides aqueous dispersions of composite particles, and coating compositions and pigment slurries including such composite particles, in which the composite particles each comprising a plurality of polymeric latex particles adsorbed to a titanium dioxide particle, the polymeric latex particles including polymerized residues of itaconic acid.

The polymeric latex used in the present invention can be prepared by any technique known in the art, such as suspension polymerization, interfacial polymerization, or emulsion polymerization. Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. The preparation of polymeric latexes is discussed generally in D.C. Blackley, *Emulsion Polymerization* (Wiley, New York, 1975). The preparation of acrylic polymeric latexes is described in, for example, *Emulsion Polymerization of Acrylic Polymers,* Bulletin, Rohm and Haas Company, Philadelphia.

A polymerization initiator can be used in carrying out the polymerization of the polymeric latex particles. Examples of polymerization initiators which can be employed include polymerization initiators which thermally decompose at the polymerization temperature to generate free radicals. Examples include both water-soluble and water-insoluble species. Examples of free radical-generating initiators which can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane); hydroperoxides such as t-butyl hydroperoxide and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like.

Polymerization initiators can be used alone or as the oxidizing component of a redox system, which also includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate. The reducing component is frequently referred to as an accelerator or a catalyst activator.

The initiator and accelerator, commonly referred to as catalyst, catalyst system or redox system, can be used in proportion from about 0.001% to 5% each, based on the weight of monomers to be copolymerized. Promoters such as chloride and sulfate salts of cobalt, iron, nickel or copper can be used in small amounts. Examples of redox catalyst systems include tert-butyl hydroperoxide/sodium formaldehyde sulfoxylate/Fe(II), and ammonium persulfate/sodium bisulfite/sodium hydrosulfite/Fe(II). The polymerization temperature can be from room temperature to about 90° C., and can be optimized for the catalyst system employed, as is conventional.

Chain transfer agents can be used to control polymer molecular weight, if desired. Examples of chain transfer agents include mercaptans, polymercaptans and polyhalogen compounds. Examples of chain transfer agents which may be used include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; halogenated compounds such as carbon tetrachloride, tetrachloroethylene, and tricholoro-bromoethane. Generally from 0 to 10% by weight, based on the weight of the monomer mixture, can be used. The polymer molecular weight can be controlled by other techniques known in the art, such as selecting the ratio of initiator to monomer.

Catalyst and/or chain transfer agent can be dissolved or dispersed in separate or the same fluid medium and gradually added to the polymerization vessel. Monomer, either neat or dissolved or dispersed in a fluid medium, can be added simultaneously with the catalyst and/or the chain transfer agent. Amounts of initiator or catalyst can be added to the polymerization mixture to "chase" residual monomer after polymerization has been substantially completed to polymerize the residual monomer as is well known in the polymerization arts.

Aggregation of polymeric latex particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents, such as protective colloids, can also be used. However, it is preferred that the amount and type of stabilizing surfactant or other type of stabilizing agent employed during the polymerization reaction be selected so that residual stabilizing agent in the aqueous product of the polymerization reaction does not significantly interfere with the subsequent adsorption of the polymeric latex to the titanium dioxide. Further, charged initiator fragments and copolymerized monomer bearing charged functional groups such as copolymerized acid-functional monomers are known to contribute to the stability of the resulting polymeric latex particles. It is important to note that stabilizing surfactants, copolymerized acidic monomers, residual initiator fragments, and the like, which tend to contribute to stability of the polymeric latex particles with respect to aggregation, or homocoagulation, may also tend to stabilize the polymeric latex particles with respect to heterocoagulation in general, and composite particle formation in particular. Thus adjusting polymerization conditions to provide a desired level of residual initiator fragments and surface acid may be very important in providing polymeric latex particles for use in the controlled adsorption process of the present invention.

The polymeric latexes useful in the process of the present invention can be prepared from a wide range of polymerizable monomers, such as, for example, monoethylenically unsaturated monomers, including alpha, beta-monoethylenically unsaturated monomers such as alkyl acrylates and methacrylates. By "acrylic polymeric latex" is meant a polymeric latex polymerized from monomers comprising substantially polymerizable monomers including the acryl group (—COCH'CH$_2$) or methacryl (—COC(CH$_3$)=CH$_2$) group, and specifically greater than about 80 weight percent (meth)acrylic monomers, based on the total monomer weight. Mixtures of polymeric latexes can also be used.

Examples of polymeric latexes which can be employed in the process of the present invention include those polymerized from ethylenically unsaturated monomers, such as alpha, beta-ethylenically unsaturated monomers, including styrene, butadiene, alpha-methylstyrene, vinyltoluene, vinylnaphthalene, ethylene, vinyl acetate, vinyl versatate, vinyl chloride, vinylidene chloride, acrylonitrile, methacrylonitrile, (meth)acrylamide, various (C$_1$–C$_{20}$)alkyl esters of (meth)acrylic acid; for example, methyl (meth) acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth) acrylate, n-dodecyl (meth)acrylate, tetradecyl (meth) acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth) acrylate; other (meth)acrylates such as isobornyl (meth) acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate; mono-, di-, and trialkyl esters of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate" and "(meth) acrylic" denotes both "methacrylic" and "acrylic."

The ethylenically unsaturated monomer can also include at least one multi-ethylenically unsaturated monomer effective to raise the molecular weight and crosslink the polymer. Examples of multi-ethylenically unsaturated monomers that can be used include allyl (meth)acrylate, tripropylene glycol di(meth)acrylate, diethylene glycol di(meth)acrylate, ethylene glycol di(meth)acrylate, 1,6-hexanediol di(meth) acrylate, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, and divinylnaphthalene.

In addition to those monomers which are "functional" in the sense of including one or more polymerizable ethylenically unsaturated groups, monomers which also include one or more additional functional groups can be used in preparing the polymeric latexes used in the process of this invention. An important class of these functional monomers is that made up of the those polymerizable ethylenically unsaturated monomers having acidic functional groups. Examples of these include acrylic acid, methacrylic acid, itaconic acid, beta-acryloxypropionic acid and higher monoacidic oligomers of acrylic acid, ethacrylic acid, alpha-chloroacetic acid, alpha-vinylacrylic acid, crotonic acid, alpha-phenylacrylic acid, cinnamic acid, chlorocinnamic acid, beta-styrylacrylic acid, itaconic acid, maleic acid, dihydrogen phosphate esters of an alcohol in which the alcohol also contains a polymerizable vinyl or olefinic group, such as allyl phosphate, allyl Cellusolve™ phosphate, mono- or diphosphate of bis (hydroxyethyl) fumarate or itaconate, derivatives of (meth) acrylic acid esters, such as, for example, phosphates of hydroxyalkyl(meth)acrylates including 2-hydroxyethyl (meth)acrylate, such as Kayamer® (trademark of Nihon Kayaku Co., Ltd.) PM-1, PM-2, PA-1, and PA-2 monomers, 3-hydroxypropyl (meth)acrylates, and the like. Examples of dihydrogen phosphate ester derivatives which can be employed include vinylbenzyl phosphates, and:

CH$_2$=CCH$_3$CO$_2$CH$_2$CH$_2$OPO(OH)$_2$
CH$_2$=CCH$_3$CO$_2$CH$_2$CH[OPO(OH)$_2$]CH$_3$
CH$_2$=CCH$_3$CO$_2$CH$_2$CH$_2$CH$_2$OPO(OH)$_2$
CH$_2$=CCH$_3$CO$_2$CH$_2$CHOHCH$_2$OPO(OH)$_2$

Thus, the present invention also provides aqueous dispersions of composite particles, as well as coating compositions and pigment slurries including such composite particles, in which the composite particles include polymeric latex particles polymerized from monomer including at least one polymerizable dihydrogen phosphate-functional monomer selected from the dihydrogen vinylbenzyl phosphates, and CH$_2$=CCH$_3$CO$_2$CH$_2$CH$_2$OPO(OH)$_2$, CH$_2$=CCH$_3$CO$_2$CH$_2$CH[OPO(OH)$_2$]CH$_3$, CH$_2$=CCH$_3$CO$_2$CH$_2$CH$_2$CH$_2$OPO(OH)$_2$, and CH$_2$=CCH$_3$CO$_2$CH$_2$CHOHCH$_2$OPO(OH)$_2$.

Small amounts of acid-functional copolymerizable monomer, such as methacrylic acid, acrylic acid, and/or itaconic acid, are typically included in preparing polymeric latexes to confer colloidal stability. As noted above, in one embodiment of the present invention, preparation of polymeric latex particles from monomer mixture including itaconic acid is preferred. In another presently preferred embodiment of the present invention, as noted above, the polymeric latex employed is polymerized from monomer mixture including at least one dihydrogen phosphate ester of an alcohol, the alcohol containing a polymerizable vinyl group or other polymerizable olefinic group, such as a dihydrogen phosphate derivative of a (meth)acrylic acid ester.

In the emulsion copolymerization of ethylenically unsaturated monomers including minor amounts (such as less than about ten percent by weight) of ethylenically unsaturated carboxylic acid-functional comonomers such as (meth) acrylic acid, the resulting polymeric acid groups may be buried inside the colloidal polymeric particles produced by the polymerization and consequently inaccessible to species dissolved in the aqueous phase, or the polymeric acid groups may be at or near the surface of the particles, or even present in the aqueous phase in the form of water-soluble polymer. In addition, some of the acid-functional monomer may remain unpolymerized. This residual monomer is ususally to be found in the aqueous phase. Acid functionality which is at or near the surface of the particles (that is, proximate the surface of the polymeric latex particles) can be measured by potentiometric or conductometric titration techniques.

For example, if the polymeric latex particles are treated with ion-exchange resin and then titrated conductometrically, the amount of carboxylic acid at or near the surface of the particles can be measured as described in H. J. Van den Hul and J. W. Vanderhoff, *Electro. Chem. Interfac. Electrochem.,* 37 161–182 (1972). High levels of surface carboxylic acid promote the adsorption process of this invention.

For the same mixture of monomers, the amount of surface carboxylic acid groups in the resulting polymeric latex particles depends on the specific emulsion polymerization employed. A number of factors can be important, including the particle size of the resulting polymeric latex, the pH of the polymerization medium, how the monomer is added to the polymerization reactor, and the choice of carboxylic acid monomer. For instance, if a mixture of 50 percent by weight butyl acrylate, 49 percent methyl methacrylate, and one percent methacrylic acid is gradually added to a polymerization reactor after the polymerization has been initiated, such as in a conventional gradual addition process, to give 200 nm polymer particles, titration indicates that about 25 percent of the total methacrylic acid is "surface acid," at or near the surface of the polymeric latex particles. If acrylic acid is substituted for methacrylic acid, the surface acid can increase. Similarly, if the process is altered so that all the monomer is added to the reactor, and the polymerization is then initiated, as is practical in a small-scale batch process, the surface acid can be found to be somewhat higher. In the present application, a process which preferentially provides acid functionality proximate the surface of the polymer latex particles is one which provides greater surface acid functionality than a conventional gradual addition process, or a conventional "single shot" batch process (such as a conventional process in which base is not added to the polymerization mix and the acidic functional groups consequently remain substantially nonionized through the polymerization process), as determined by potentiometric titration.

There are a number of ways known in the art for increasing the fraction of the acid that becomes surface acid. For example, if enough base is added during the polymerization to partially neutralize the carboxylic acid, the surface acid can be increased measurably. However, higher levels of base can decrease surface acid. If the carboxylic acid monomer is added to the reactor in a nonuniform manner, the amount of surface acid can be increased. Examples of nonuniform carboxylic acid monomer additions that increase surface acid are described in K. L. Hoy, *J. Coat. Tech.,* 51 27–41 (1979).

Other types of copolymerizable functional monomers can also be included, depending on the ultimate application for which the product produced by the process of the present invention is intended. For example, small amounts of adhesion-promoting copolymerizable monomers can also be included. Examples of other types of functional monomers include hydroxy-functional monomers such as 2-hydroxethyl (meth)acrylate, amino-functional monomers such as dimethylaminoethyl (meth)acrylate, epoxy-functional monomers, such as glycidyl methacrylates and the like.

Examples of synthetic polymeric latexes which can be used include acrylic copolymer latexes, such as butyl acrylate/methyl methacrylate/acid and ethyl acrylate/methyl methacrylate/acid copolymer latexes; vinyl acetate homopolymer and copolymer latexes, including ethylene/ vinyl acetate copolymer latexes, styrene/butadiene copolymer latexes, and the like.

By selecting the type and concentration of monomers having known glass transition temperatures and acid functionalities, polymeric latexes having properties useful in the process of the invention as well as being specifically suited as binders for the specific coating or film formulation application can be prepared.

The particle size, particle size distribution, and molecular weight of the polymeric latex can be selected by the choice of a particular polymerization process, as for example through the use of particular initiator and chain transfer systems, as is well known in the polymerization arts. The average particle size and the molecular weight of the polymeric latex are important with regard to both the adsorption onto the titanium dioxide particles, as well as with respect to the properties of the polymeric latex when it is employed as a binder in the the fully formulated aqueous composition including the composite particles.

Preferably, the polymeric latex used in the process of the present invention of adsorbing onto and dispersing the titanium dioxide particles has an average particle diameter in the range of from approximately four times the average particle diameter of the titanium dioxide pigment particles down to about 20 nm, and more preferably from approximately equal to the average diameter of the titanium dioxide particles down to about one-quarter the average diameter of the titanium dioxide particles.

For example, if the titanium dioxide particle to be dispersed has an average particle size of about 200 nanometers, the polymeric latex particle should have an average particle size in the range of from about 20 to less than about 800 nanometers. When the polymeric latex particles are employed in the process of the invention at or above the natural saturation level relative to the titanium dioxide particle, polymeric latex of the same composition having relatively larger particle sizes, within the above range, are preferable to polymeric latex of the same composition having relatively smaller average particle diameters, within the above range, for maximizing the extent of adsorption onto the surface of the titanium dioxide particles. By "average particle size" or "average particle diameter" is meant an average determined experimentally by the quasielastic light scattering technique, such as provided, for example, by the Model BI-90 Particle Sizer, of Brookhaven Instruments Corp.

The selection of the relative surface charges of the polymeric latex particles and the titanium dioxide particles in the medium used for conducting the adsorption process is an important variable which affects both the extent of adsorption and the stability of the resulting dispersion of composite particles. In one presently preferred embodiment of the invention, it is preferred that the surface charge of the polymeric latex be of the same sign of charge as the sign of the surface charge of the titanium dioxide particle onto which the polymeric latex is to be adsorbed. More particularly, in this embodiment in aqueous formulations it is preferred that the polymeric latex and the titanium dioxide particle onto which it is to be adsorbed both have a negative surface charge. Furthermore, in this embodiment it is preferred that the surface charge on the polymeric latex be more negatively charged than the surface charge on the titanium dioxide particle. It is especially preferred that the surface charge on the polymeric latex be at least about 30 millivolts more negatively charged than the surface charge on the titanium dioxide particle.

For example, in the case of the adsorption of a polymeric latex onto the surface of titanium dioxide particles, where the zeta potential of the titanium dioxide particles in the aqueous medium is about −50 mv, it is believed that minimum grit formation occurs, at the saturation level, when the zeta potential of the polymeric latex is more negative than −50 mv, preferably from about −50 mv to about −100 mv. The polymeric latex particles preferably have a surface charge of from about −40 mv to about −110 mv in order to adsorb onto, and form a stable dispersion with, the titanium dioxide particles, in those cases in which the titanium dioxide particles have a zeta potential from about −20 mv to −60 mv.

As in other aqueous systems including charged particles, the magnitude of the effective electrical repulsive forces depends on the dielectric strength and the ionic strength of the medium. As a practical matter, the dielectric strength will be determined by the dielectric constant of water, because, while many aqueous coating compositions include small amounts of organic cosolvents for various purposes, such as encouraging coalesence and film formation by polymeric latex particles used as binder, these do not significantly vary the dielectric constant of the medium.

On the other hand, the ionic strength of the medium in coating compositions can vary over a significant range, and include contributions from a variety of simple ions and polyionic species. For example, coatings compositions typically range in pH from about 6 to 11 or more, a range of five orders of magnitude in the concentration of hydroxyl ion. While the strength of the repulsive forces between the polymeric latex particles and the titanium dioxide particles can be varied to some extent by adjusting the ionic strength of the aqueous medium through varying the pH and by addition of charged species, in general it is more desirable to vary the surface potential of the particulate species as reflected by the zeta potential of the polymeric latex particles and/or the titanium dioxide particles instead.

Varying the pH is of course likely to change the zeta potential of both the titanium dioxide particles and the polymeric latex particles directly. However, charged species added to adjust the ionic stregth will also be present in the formulated coating composition, and the product formed by the coating composition, and the effect of the presence of the charged species on the formulated coating composition and the ultimate product must be carefully considered. Preferably, in most cases, no ionic species are added merely to adjust the ionic strength of the medium, and any desired adjustment in the magnitude of the electrical repulsive forces is effected in another manner. This is because added ionic species may have an undesirable effect on the properties of the product formed using the composition including the composite particles. For example, if ionic strength is increased by addition of a simple electrolyte such as sodium chloride, and the composite particles are subsequently used in formulating an aqueous coating composition, the film formed from the coating composition is likely to have adversely increased water sensitivity due to the presence of the additional salt. On the other hand, in some embodiments of the process of the present invention, it may be desirable to adjust the ionic stregth of the aqueous medium by addition of a salt.

The surface potential of the titanium dioxide particles can be adjusted in a number of different ways. As discussed above, the particles can be pretreated to provide inorganic surface coatings, such as coatings of silica, aluminum oxide, or mixtures of silica and aluminum oxide, on titanium dioxide particles. In addition, small molecular species, such as silanes or titanates, can be adsorbed on and reacted with surface of the titanium dioxide particles, and the resulting surface sites can be subsequently modified chemically to provide surface charges. Examples of such species include N-2-aminoethyl-3-aminopropyltrimethoxysilane, 3-aminopropyltrimethoxysilane, 3-methacryloxypropyltrimethoxysilane, and vinyltriacetoxysilane. Alternatively, species having the desired charge, or which can be modified subsequently to have the desired charge, can be simply adsorbed to the surface of the titanium dioxide particles. The most important examples of these are low molecular wieght polyelectrolytes such as conventional pigment dispersants.

The selection of additives for adjusting the surface charge of the inorganic material particles depends on whether the surface charge on the particle needs to be raised or lowered. Additives which can be employed for the purpose of making the surface charge more negative include commonly available anionic surfactants and polysoaps, while a variety of monomeric and polymeric amino compounds or their quaternary derivative compounds can be employed if a less negative surface charge is desired.

Examples of suitable anionic surfactants include the anionic polyelectrolyte pigment dispersants, such as polyacrylic acid, polymethacrylic acid, copolymeric acids including copolymeric acids including copolymerized maleic acid, polyphosphates such as potassium tripolyphosphate, ammonium, alkali metal, alkaline earth metal, and lower alkyl quaternary ammonium salts of: sulfosuccinates such as di($C_7$–$C_{25}$)alkylsulfosuccinates and higher alkyl sulfosuccinates, such as octyl sulfosuccinate; sulfates such as the higher fatty alcohol sulfates, for example, lauryl sulfate; sulfonates including aryl sulfonates, alkyl sulfonates, and the alkylaryl sulfonates, for example, isopropylbenzene sulfonate, isopropylnaphthalene sulfonate and N-methyl-N-palmitoyltaurate, isothionates such as oleyl isothionate; and the like. Additional examples include the alkylarylpoly(ethyleneoxy)ethylene sulfates, sulfonates and phosphates, such as t-octylphenoxypoly(ethyleneoxy) ethylene sulfates and nonylphenoxy-poly(ethyleneoxy) ethylene phosphates, either having one to seven oxyethylene units.

Examples of suitable monomeric and polymeric amino compounds for reaction with excess negative surface charges on the inorganic material particle surface include alkylbenzylammonium halides such as diisobutylphenoxy-ethoxyethyldimethylbenzyl ammonium chloride, tertiary amines formed by ethoxylation of primary amines such as primary tallow amines, imidazoline and piperazine derivatives, 2-methyl-2-aminomethylpropanol, and the like.

Two important properties of the polymeric latex for the purpose of the process of the invention are the glass transition temperature of the polymeric latex and the latex surface charge density. The latex surface charge density is closely related to the surface potential of the polymeric latex particles, and depends on such factors as the nature, amount and distribution or residual ionic initiator fragements in the latex, and the nature, amount, and distribution of carboxyl or other acid functionality in the polymeric latex. While the chemical composition of a polymeric latex binder is important for achieving the resultant properties of the coating or film when the polymeric latex also acts as the binder, the glass transition temperature and amount of acid functionality in the polymeric latex are important in the adsorption process. The amount of acid functionality at the surface of the polymeric latex particles is believed to be especially important, as it is believed to relate directly to the surface charge density and zeta potential of the polymeric latex particles. In a presently preferred embodiment of the present process, a polymeric latex is employed by a process which preferentially provides acid functionality at the surface of the polymer latex particles. Examples of polymerization processes which preferentially provide surface acid are described in K. L. Hoy, *J. Coat. Tech.*, 51, 27–41 (1979).

While the adsorption of the selected polymeric latex onto the titanium dioxide particles can occur rapidly, the adsorption may be reversible or irreversible with time. There are several factors which favor irreversible adsorption. For example, when copolymerizable dihydrogen phosphate-functional monomers are employed in preparing the polymeric latex particles, irreversible adsorption has been found to be favored, as well as when copolymerized itaconic acid is employed. Irreversible adsorption is also favored when the glass transition temperature of the polymeric latex is relatively low (such as less than about 50° C.) or when the amount of acid functionality in the emulsion polymer is relatively high (such as greater than about 2 weight percent).

When a selected polymeric latex which irreversibly adsorbs onto the titanium dioxide particles is employed in the process of the invention there is a threshhold pigment volume concentration ("TPVC") for the corresponding fully formulated coating composition above which the coating performance can deteriorate rapidly. This threshhold PVC is dependent upon the composition of the polymeric latex used in the adsorption process. When the threshhold PVC is exceeded, both the gloss and hiding of the coating formulation are significantly reduced and grit formation begins to be significant. The critical PVC appears to correlate with the saturation PVC in the grind, and the concentration of the irreversibly adsorbing polymeric latex should preferable be at or above the saturation level regardless of the PVC.

When the polymeric latex selected for use in adsorbing onto the titanium dioxide particle also functions as the polymeric binder for the coating composition it is preferred that the polymeric latex not desorb from the inorganic particle. This can be accomplished by either utilizing a soft (low $T_g$) polymeric latex or by increasing the concentration of acid in the polymeric latex.

The presence of conventional polyelectrolyte dispersants has an effect on the adsorption process of the present invention. While low concentrations of conventional water-soluble polyelectrolyte dispersants, on the order of about 0.2 weight percent or lower, have little adverse effect on the adsorption of selected polymeric latexes onto titanium dioxide particle surfaces, the use of higher concentrations of these conventional water-soluble polyelectrolytes dispersants can have a significant adverse effect upon the adsorption of the selected polymeric latexes onto titanium dioxide particle surfaces. The use of more than about 0.2 weight percent of polyacrylic acid-type polyelectrolyte dispersants has been found to preclude a selected polymeric latex from adsorbing onto the titanium dioxide particle surface.

It is believed, without intending to be bound by any particular explanation of the observed phenomenom, that the suppression of polymeric latex adsorption is due to the increase in the surface charge of the titanium dioxide particle from the presence of the polyelectrolyte dispersant. Accordingly, the process of the present invention can be carried out with a minimum of polyelectrolyte dispersant present in the aqueous medium. However, the presence of low concentrations of conventional polyelectrolyte dispersants is believed to actually be beneficial for eliminating the presence of grit in the fully formulated composition. Preferably, from about 0.1 to 0.2 percent by weight of a polyelectrolyte dispersant such as Tamol® (trademark of Rohm and Haas) 731 dispersant (sodium salt of polymeric carboxylic acid) is used as a predispersant when a relatively low glass transition polymeric latex, suitable for a film-forming binder, is employed in the process of this invention, so as to minimize grit formation. In general grit formation is believed to increase with decreasing polymeric latex glass transition temperature, decreasing polymeric latex surface charge, and decreasing polymeric latex particle size. In addition, poor mixing is believed to increase grit formation.

In one presently preferred embodiment of the present invention, an emulsion polymerization process known to provide acid functionality preferentially at the surface of the polymeric latex particles is employed to prepare the polymeric latex for adsorption on the titanium dioxide particles. In this case, the level of polyelectrolyte dispersant in the pigment dispersion and the formulated coating may be higher, such as up to one percent or more of the weight of the titanium dioxide depending on the specific polyelectrolyte dispersant employed. In this case, a weakly absorbing polyelectrolyte dispersant, such as Tamol SG-1 dispersant (ammonium salt of copolymer of a carboxylic acid monomer and a hydrophilic comonomer) can be employed at a high level such as one percent, while a strongly absorbing polyelectrolyte dispersant such as a polyacrylic acid dispersant, which strongly adsorbs to the surface of the titanium dioxide particles, and which displaces weakly adsorbed polyelectrolyte dispersants from the surface of titanium dioxide particles, may require use at lower levels.

In another presently preferred embodiment of the present invention, an emulsion polymerization process is used to prepare a polymeric latex from monomer mixture including one or more ethylenically polymerizable derivatives of phosphoric acid, such as one or more dihydrogen phosphate esters of an alcohol in which the alcohol also contains a polymerizable vinyl or olefinic group, such as partial esters of phosphoric acid and 2-hydroxyethyl methacrylate. Examples of such partial esters are given above and include the monoester of phosphoric acid with hydroxyethyl methacrylate, the diester of phosphoric acid with hydroxyethyl methacrylate, and mixtures thereof. The resulting phosphoric acid ester-functional polymeric latex particles adsorb to titanium dioxide particles more strongly than polymeric latex prepared from monomer mixture which does not include phosphoric acid ester-functional monomer.

Figure 5:
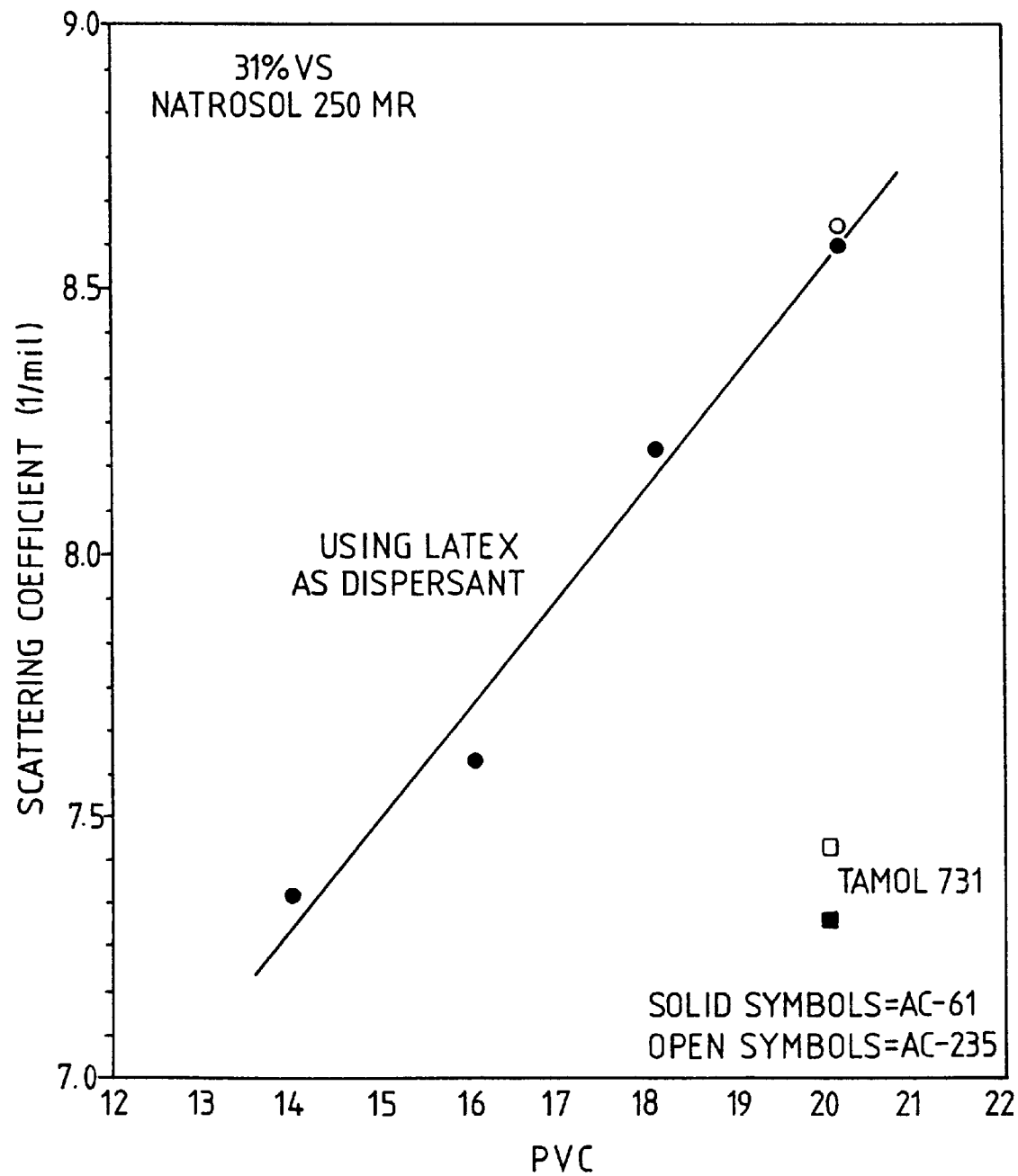
FIG. 5 is a graph of the scattering coefficients of films formed from prior art coating compositions including a polyelectrolyte dispersant and films formed from coating compositions prepared using the process of the present invention, as functions of pigment volume concentration.

The process of the present invention can significantly increase the hiding of titanium dioxide containing emulsion paint formulations (as determined by measuring the scattering coefficient of the paint) of the same PVC compared with the scattering coefficient of a paint formulation prepared by the use of conventional polyelectrolyte dispersants. An alternate way of expressing this improvement is that the process of the invention permits the reduction of the PVC of a 20% PVC titanium dioxide paint formulation by 20 percent while achieving the same scattering coefficient or degree of hiding as can be obtained by the use of a conventional polyelectrolyte pigment dispersant. This translates into a reduction of titanium dioxide use level of 40 pounds per hundred gallons of paint, or, at the current titanium dioxide price of 95 cents per pound, a 38 cent per gallon decrease in titanium dioxide raw material costs. The hiding improvement is increased as the titanium dioxide volume concentration of the paint formulation increases. The improvement provided by the process of the present invention is illustrated in FIG. 5, which is a graph in which the scattering coefficients of films formed from an aqueous coating composition prepared using the inventive process are plotted as a function of PVC and compared with the those of films formed from coating compositions prepared using a conventional process.

Furthermore, the improved performance of paint formulations prepared by the present process is achieved even in the presence of substantial amounts of large particle size extenders, such as calcium carbonate and alumino silicate, typically employed in such formulations. In this regard the improved hiding is obtained by the controlled adsorption of the primary pigment, the titanium dioxide. This improvement is not lost upon the incorporation of other types of inorganic or organic particles, such as extender pigment particles.

In addition, the improved hiding achievable by use of the process of this invention is realized when the coating formulation is prepared with conventional thickeners of the associative and non-associative types; this improvement is not dependent upon the selected thickener. This result is surprising and contrary to the result typically encountered when paints are formulated using conventional polyelectrolyte dispersants. In such conventional systems the hiding property of the formulated paint can vary greatly as a function of the thickener employed. The controlled adsorption process of the invention therefore offers paint formulators a greater choice in selecting thickeners for the final paint formulation without concern over the choice of thickener adversely affecting the final hiding properties of the paint.

Furthermore, in addition to improving the hiding of paint formulations, the process of this invention also has been found to advantageously improve the gloss, high shear viscosity, scrub resistance, and early blister resistance and metal marking resistance of paint formulations compared with paint formulations dispersed with conventional polyelectrolyte dispersants, as well as improving the corrosion resistance of paint formulations.

The process of the invention may be carried out in a number of alternative manners. For example, the polymeric latex particles can be selected so that they will serve as film-forming binder for the product formulated using the composite particles. Alternatively, the polymeric latex particles can be selected so that they are not film-forming in the formulated product. In either case, the polymeric latex particles can be selected for use in dispersing the titanium dioxide particles, or for adsorption to titanium dioxide particles previously otherwise dispersed.

In one embodiment the surface charge of the titanium dioxide particles is adjusted and then the surface charge-adjusted titanium dioxide particles are simply milled directly with the polymeric latex. In another embodiment, the titanium dioxide particles, having their surface charge adjusted as necessary, is pre-dispersed in the absence of the polymeric latex. This is followed by blending with the polymeric latex under circumstances by which adsorption does not occur and then adjusting the medium until adsorption does occur, such as by altering the pH of the medium.

The process can involve the direct grinding of dry titanium dioxide particles in water with polymeric latex. In contrast with conventional pigment dispersion processes, the pigment dispersion process employed in the present invention is useful to prepare a concentrated pigment dispersion wherein the final concentration of pigment in the coating composition can be obtained directly in this one step without the formation of grit.

In carrying out the process of the present invention, it may be desirable to adjust the pH of the aqueous solution used for carrying out the process to a pH in the range of from about a pH of 6 to a pH of about 10.

In addition to the titanium dioxide particles, which are typically of relatively small particle size, on the order of 200–250 nm, other pigment particles, such as the large particle size extender pigment particle typically included in many types of coating formulation to reduce new material costs, can also be employed in addition to the titanium dioxide pigment particles in the process of the present invention. Examples of large particle size extender pigment particles which can be used include calcium carbonate, alumino-silicate, amorphous silica, and the like.

Similarly, the aqueous medium in which the titanium dioxide particles are ground with the polymeric latex dispersant can also include water-miscible solvents, such as glycols and glycol ethers, such as are conventional in the coatings arts. Examples of water-miscible solvents employed include propylene glycol, ethylene glycol, ethylene glycol monomethyl ether, and the like.

Aqueous coating compositions are frequently formulated at alkaline pH to stabilize anionically charged latex binder against agglomeration and for other reasons. The principles of formulating aqueous coating compositions are reviewed, for example, in *Formulation of Organic Coatings* (N. I. Gaynes ed. D. Van Nostrand Co. Inc. Princeton, N.J. 1967) at pp. 189–230.

The present invention provides aqueous dispersions of composite particles which can be used in a variety of applications. In some cases, in which a "soft" (i.e. low glass transition temperature) polymeric latex has been used to form the composite particles, the resulting aqueous dispersion can be used as is, or with the addition of other components, the soft adsorbed polymeric latex serving as binder for the composition. In other cases, additional polymeric latex will be added in formulating aqueous compositions for various applications, and the additional polymer latex will serve as the product binder in addition to or instead of the adsorbed polymeric latex.

Often the binder-forming latex polymer particles contain carboxyl functional groups. Under suitable conditions, the carboxyl groups are ionized and the resultant charges on the latex particle surface electrostatically stabilize the latex against premature agglomeration. Often a volatile base, typically ammonia, is used to adjust the pH of the coating composition. When the coating composition is applied to a substrate to be coated, the volatile base is lost and the pH of the coating composition drops, destabilizing the latex particles of the binder and thus encouraging agglomeration to form a continuous binder film.

In addition to binder-forming polymeric latex particles and composite polymeric latex-titanium dioxide particles, aqueous coating compositions prepared according to the process of the present invention can include typical coatings ingredients. For example, they can include extender pigments as noted above such as calcium carbonate, amorphous silica, and the like; defoamers; biocidal agents such as zinc oxide, 2-N-octyl-4-isothiazole-3-one, and phenyl mercuric acetate; coalescing agents such as diethylene glycol monoethyl ether acetate and ethylene glycol monobutyl ether acetate; plasticizers such as dialkyl phthalates including dibutyl phthalate, dioctyl phthalate and the like; freeze-thaw stabilizers such as ethylene glycol, propylene glycol and diethylene glycol; nonionic wetting agents such as polyethylenoxylates of fatty acids, alkanols, alkylphenols, and glycols; polyelectrolyte pigment dispersants at low levels; thickeners such as polyelectrolyte and cellulosic thickeners; rheology control agents such as associative thickeners and the like; colorants such as colored pigments and dyes; perfumes; cosolvents and the like.

In the examples which follow, the following abbreviations are used:
AA acrylic acid
MAA methacrylic acid
AMPS 2-acrylamido-2-methyl-1-propanesulfonic acid
IA itaconic acid
EA ethyl acrylate
BA butyl acrylate
MMA methyl methacrylate
PEM phosphoethyl methacrylate
DI deionized The illustrative examples which follow illustrate the process of the present invention as a function of the parameters of the selected emulsion polymer and the adsorption achieved. These examples will aid those skilled in the art in understanding the present invention; however, the present invention is in no way limited thereby. In the examples which follow, percentage composition is by weight, unless otherwise noted.

EXAMPLE 1

A polymeric latex (46.2% solids) having a monomer composition of 46 BA/50.5 MMA/3.5 MAA was prepared using a conventional gradual-addition, batch polymerization process. The glass transition temperature ($T_g$) calculated from the monomer composition by the method of Fox was 10° C. The polymeric latex was found to have an average particle size of 117 nm using a Brookhaven BI-90 light-scattering instrument to measure the particle size. The weight percent of methacrylic acid monomer on polymer solids was calculated to be 3.5 percent. 193 g of the polymeric latex was placed in a stainless steel grind bucket and the pH of the latex was adjust to 11 by addition of ammonia. The bucket was positioned in a high speed disc disperser and mixing was begun at low speed while cooling in ice. 216 g of Ti-Pure® (trademark of Du Pont de Nemours Corp.) R-900 grade rutile titanium dioxide pigment was slowly added to the bucket. Mixing speed was increased and water added as necessary to maintain good grinding action. Defoamer (Colloid® 643) was added as needed. After mixing was complete, grinding was continued at high speed for 15–30 minutes. This provided a pigment grind with a PVC of 40% and 45% volume solids. Immediately after grinding, a sample was removed and centrifuged. The characteristics of the latex and the titanium dioxide, and the grinding conditions, are summarized in Table IA.

The concentration of unadsorbed latex in the supernatant was determined gravimetrically and used to calculate the milligrams of latex adsorbed per gram of titanium dioxide. This procedure was repeated after one day and two days. The results are given in Table IA. This example illustrates that the adsorption process conditions can be adjusted so that adsorption is extremely rapid. The rapidity is illustrated by the fact that adsorption is virtually complete during the time of grinding (compare 406 mg/g absorbed immediately after grinding with 407 mg/g absorbed after 2 days).

EXAMPLES 2–18

The process of Example 1 was repeated, except as follows: Acrylic polymeric latexes having the particle sizes and acid levels shown in Tables IA–ID were substituted for the polymeric latex used in Example 1. The calculated $T_g$ for the polymeric latexes is given in Tables IA–ID. The grinding conditions, specifically the pH, PVC, volume solids and the speed of the disc disperser were varied as shown in Tables IA–ID. In one case, Example 7, Ti-Pure R-902 titanium dioxide was substituted for the R-900 grade. Absorption was measured as in Example 1, and the results are given in Tables IA–ID.

The results in Tables IA–ID confirm the rapidity of the adsorption of the polymeric latex; in most cases the amount absorbed after a day or two days is the same, within experimental error, as that absorbed immediately. In addition, the data show that adsorption conditions can be adjusted so that the rate of adorption can be reduced if desired. In particular, Example 5 shows that conditions can be selected so that complete adsorption does not occur upon mixing, but rather requires a more extended period, for example, on the order of as long as a day, or more.

Examples 12 through 16 illustrate the saturation level concept: As the PVC decreases (greater ratio of polymeric latex to titanium dioxide) the amount adsorbed increases only slightly indicating saturation of the titanium dioxide.

These results also demonstrate the high adsorption efficiency attainable by the process of the present invention for a wide range of latex compositions and grinding conditions. The high efficiency is illustrated by the fact that essentially complete adsorption of the latex is achieved when the amount of latex added is adjusted to provide close to the saturation level of the latex on the titanium dioxide. This is shown in particular by Examples 1, 10, 12, and 13 which demonstrate that 99% of the total latex added is adsorbed on the titanium dioxide.

These examples also show that the level of adsorption is sensitive to the latex particle size but relatively insensitive to variables such as titanium dioxide grade (Examples 6 and 7), latex monomer composition, latex acid level and type, grinding conditions, such as the dispersion disc speed (Examples 11–13), pigment volume concentration, and volume solids.

TABLE IA

| Example | 1 | 2 | 3 | 4 | 5 |
|---|---|---|---|---|---|
| Latex: | | | | | |
| Particle Size (nm) | 117 | 76 | 113 | 117 | 67 |
| Acid type | MAA | MAA | AMPS | MAA | MAA |
| Acid level (%) | 3.5 | 7 | 4.8 | 3.5 | 1 |
| Tg (° C.) | 10 | 10 | 1 | 10 | 1 |
| Titanium dioxide: | R-900 | R-900 | R-900 | R-900 | R-900 |
| Grinding conditions: | | | | | |
| pH | 11 | 9 | 9 | 9 | 11 |
| RPM | | | | | |
| % PVC | 40 | 40 | 40 | 40 | 40 |
| % Volume Solids | 45 | 32 | 38 | 40 | 40 |
| mg latex added per g TiO$_2$ | 412 | 412 | 412 | 412 | 412 |
| Adsorption (mg/g): | | | | | |
| Immediate | 406 | 237 | 381 | 379 | 217 |
| 1 Day | 407 | 219 | 386 | 380 | 335 |
| 2 Days | 407 | 219 | 388 | 380 | 312 |
| % Adsorbed | 99 | 53 | 94 | 92 | 76 |

TABLE IB

| Example | 6 | 7 | 8 | 9 | 10 |
|---|---|---|---|---|---|
| Latex: | | | | | |
| Particle Size (nm) | 112 | 113 | 53 | 111 | 164 |
| Acid monomer | MMA | MMA | AA | AA | AA |
| Acid level (%) | 1 | 1 | 1.3 | 1.3 | 1.3 |
| Tg (° C.) | 105 | 105 | 9 | 9 | 9 |
| Titanium dioxide: | R-900 | R-902 | R-900 | R-900 | R-900 |
| Grinding conditions: | | | | | |
| pH | 9 | 9 | 9 | 9 | 9 |
| RPM | | | | | |
| % PVC | 40 | 40 | 40 | 40 | 40 |
| % Volume Solids | 45 | 46 | 40 | 40 | 40 |
| mg latex added per g TiO$_2$ | 412 | 412 | 412 | 412 | 412 |
| Adsorption (mg/g): | | | | | |
| Immediate | 376 | 336 | 204 | 371 | 410 |
| 1 Day | 370 | 308 | 213 | 374 | 410 |
| 2 Days | 371 | 306 | | | |
| % Adsorbed | 90 | 74 | 52 | 91 | 99 |

TABLE IC

| Example | 11 | 12 | 13 | 14 | 15 |
|---|---|---|---|---|---|
| Latex: | | | | | |
| Particle Size (nm) | 150 | 150 | 150 | 150 | 150 |
| Acid type | MAA | MAA | MAA | MAA | MAA |
| Acid level (%) | 1 | 1 | 1 | 1 | 1 |
| Tg (° C.) | 10 | 10 | 10 | 10 | 10 |
| Titanium dioxide: | R-900 | R-900 | R-900 | R-900 | R-900 |
| Grinding conditions: | | | | | |
| pH | 9 | 9 | 9 | 9 | 9 |
| RPM | 650 | 1500 | 3800 | 1500 | 1500 |
| % PVC | 40 | 40 | 40 | 30 | 20 |
| % Volume Solids | 40 | 40 | 40 | 40 | 40 |
| mg latex added per g TiO$_2$ | 412 | 412 | 412 | 642 | 1100 |
| Adsorption (mg/g): | | | | | |
| Immediate | 383 | 410 | 409 | 475 | 459 |
| 1 Day | 395 | 410 | 410 | 438 | 455 |
| 2 Days | | | | | |
| % Adsorbed | 96 | 99 | 99 | 68 | 41 |

TABLE ID

| Example | 16 | 17 | 18 |
|---|---|---|---|
| Latex: | | | |
| Particle Size (nm) | 150 | 150 | 150 |
| Acid type | MAA | MAA | MAA |
| Acid level (%) | 1 | 1 | 1 |
| Tg (° C.) | 10 | 10 | 10 |
| Titanium dioxide: | R-900 | R-900 | R-900 |
| Grinding conditions: | | | |
| pH | 9 | 9 | 9 |
| RPM | 500 | 1500 | 1500 |
| % PVC | 10 | 40 | 40 |
| % Volume Solids | 40 | 30 | 20 |
| mg latex added per g TiO$_2$ | 2475 | 412 | 412 |
| Adsorption (mg/g): | | | |
| Immediate | 508 | 383 | 250 |
| 1 Day | 503 | 399 | 337 |
| 2 Days | | | 356 |
| % Adsorbed | 20 | 97 | 86 |

EXAMPLE 19

A 40% PVC latex-dispersed grind (Example 19) was prepared by mixing 111.82 g of water 152.48 g of latex, and 168.00 g of Ti-Pure R-900 titanium dioxide in a Waring blender on low speed for five minutes using a water-jacketed stainless steel blend container. The polymeric latex was similar to that of Example 6 except that the average particle size was 120 nm.

A conventionally dispersed control (Comparative Example 1) was prepared by mixing 111.82 g of water, 6.914 g of Tamol 731 dispersant, and 168.00 g of Ti-Pure R-900 titanium dioxide using a high speed disk disperser at about 4000 rpm for ten minutes. The speed was decreased to 1200 rpm and 152.48 g of polymeric latex was added while stirring for an additional ten minutes.

Figure 6A:
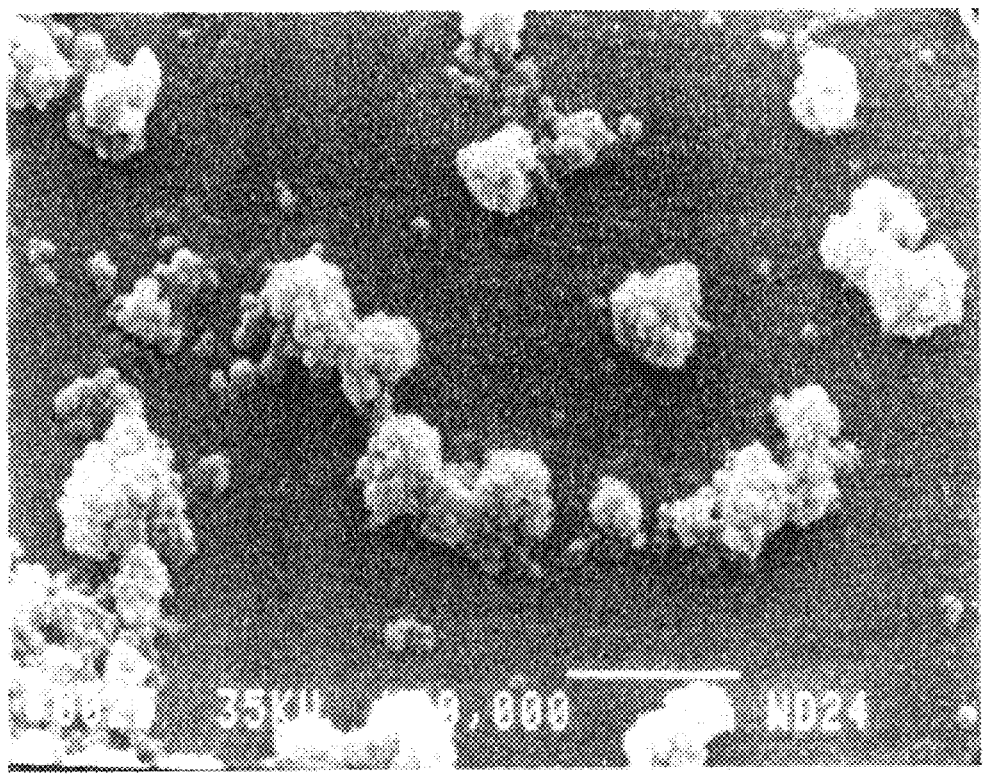
FIG. 6a is a scanning electron micrograph of composite particles prepared according to the process of the present invention.
Figure 6B:
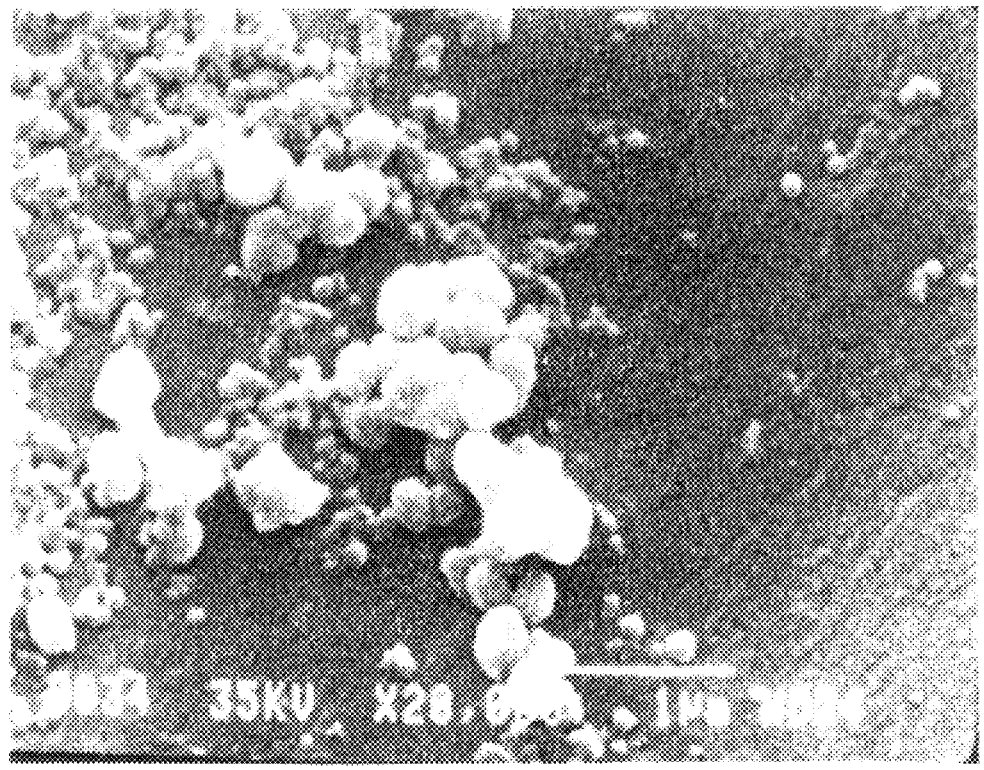
FIG. 6b is a scanning electron micrograph of a mixture of titanium dioxide and polymeric latex particles prepared according to a prior art process.

A portion of each grind was diluted to about one percent by volume with water, a small drop placed on a standard SEM sample holder, and the water allowed to evaporate. The dried samples were then sputter coated with gold and examined via scanning electron microscopy. The resulting micrographs (magnification of 20,000:1) are shown in FIG. 6a (Example 19) and FIG. 6b (Comparative Example 1).

Figure 9:
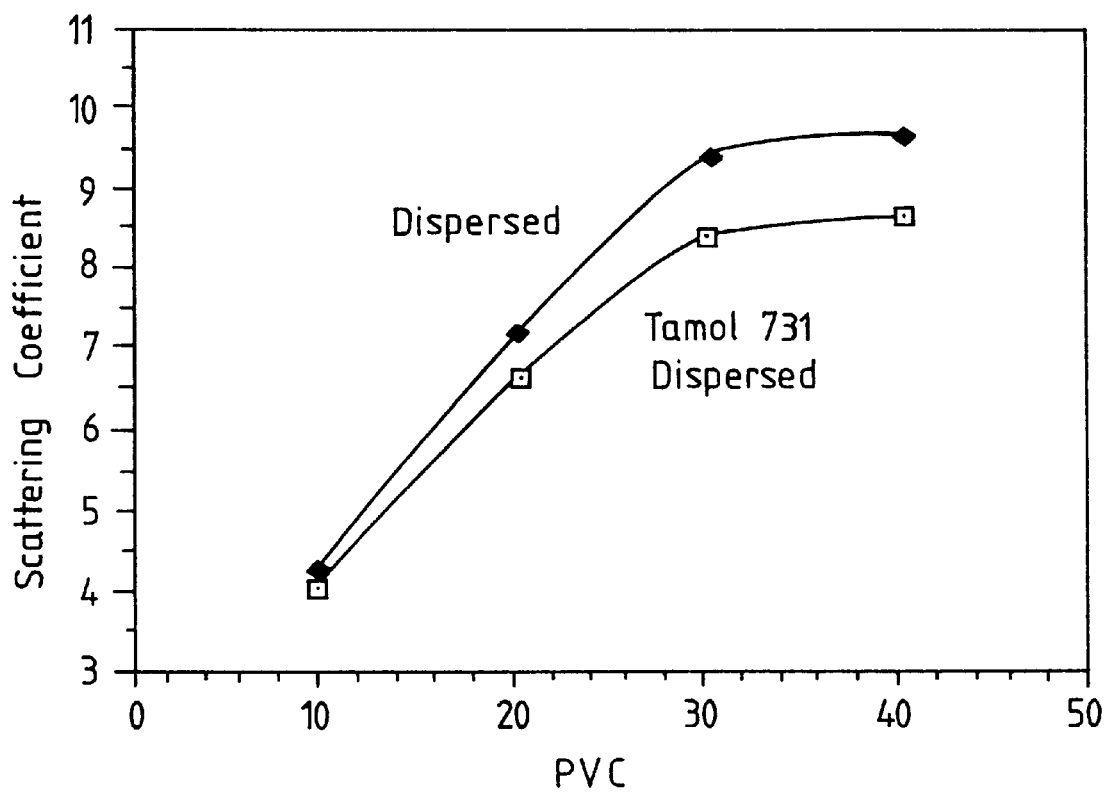
FIG. 9 is a graph of Kubelka-Munk scattering coefficient as a function of % PVC for a series of paints prepared according to the process of the present invention and compared with those for a series of conventionally dispersed paints.

FIG. 9a shows "raspberry"-shaped composite particles resulting from the adsorption of the small latex particles on the surfaces of the larger titanium dioxide particles. By contrast, the smooth titnium dioxide particles and the unadsorbed latex particles seen in FIG. 6b demonstrate the absence of such adsorption under conventional grinding conditions. These micrographs provide a direct visual confirmation of the adsorption process of the present invention.

EXAMPLE 20

A 20% PVC latex-dispersed (Rhoplex AC-61) pigment grind was prepared as in Example 1 except that the following formulation was used:

| Component | Weight (g) |
|---|---|
| Rhoplex AC-61 polymeric latex | 246.88 |
| propylene glycol | 10 |
| Colloid 643 defoamer | 0.5 |
| water | 10 |
| Ti-Pure R-900 titanium dioxide | 102.36 |

Figure 7:
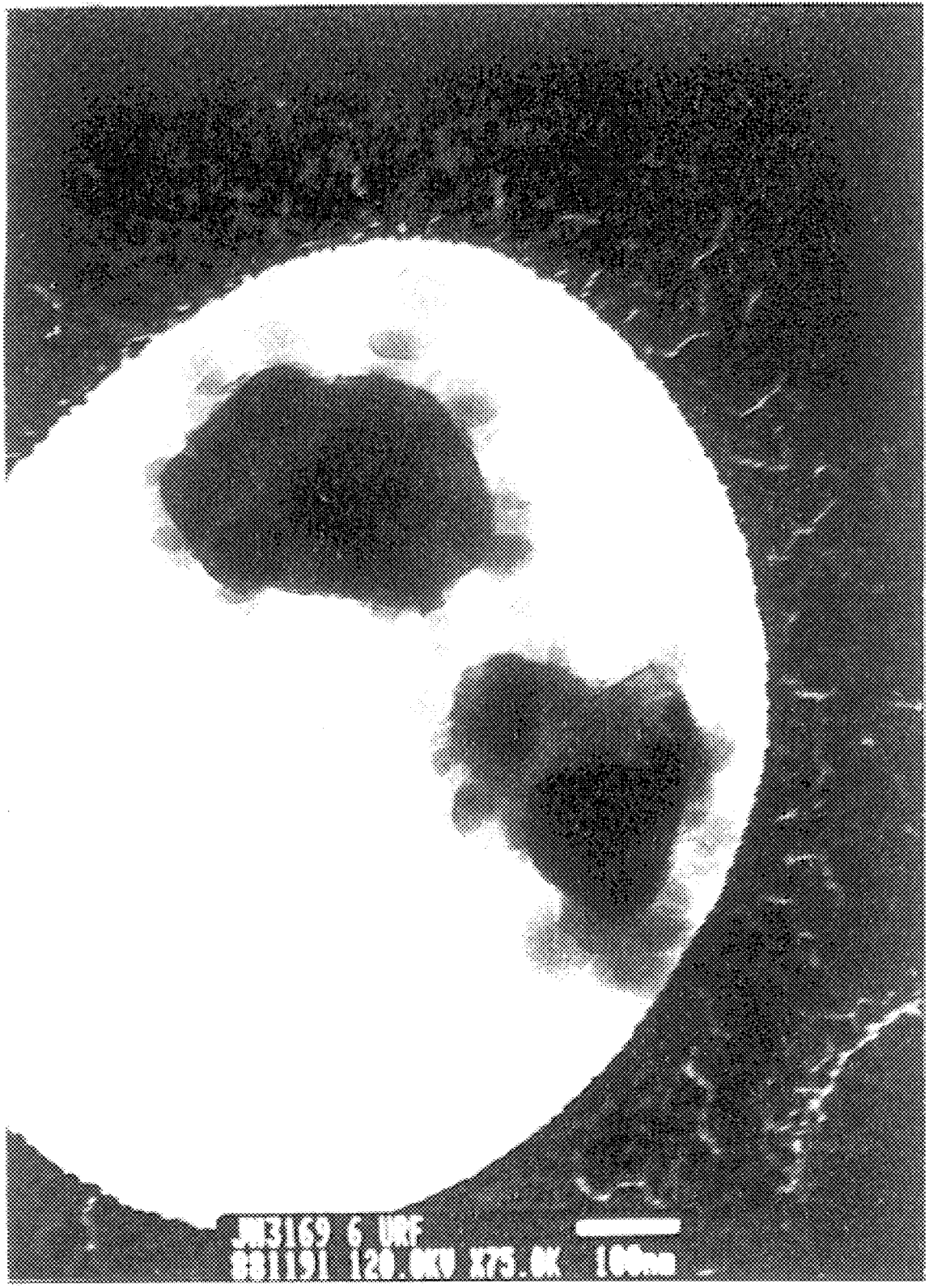
FIG. 7 is a transmission electon micrograph showing composite particles prepared according to the process of the present invention.

A portion of this grind was diluted about 20:1 with water a a drop placed on a 200 mesh carbon grid. Excess liquid was blotted off to leave a thin film which was frozen instantaneously by immersing at liquid ethane held at a temperature of 77° K by a surrounding liquid nitrogen bath. The frozen sample was then examined by transmission electron microscopy while being maintained at a temperature of −165° C. A representative micrograph is shown as FIG. 7. The micrograph shows composite particles in which the polymeric latex particles (the lighter objects) are adsorped on the surface of titanium dioxide particles (the darker objects).

EXAMPLES 21–27

Figure 8A:
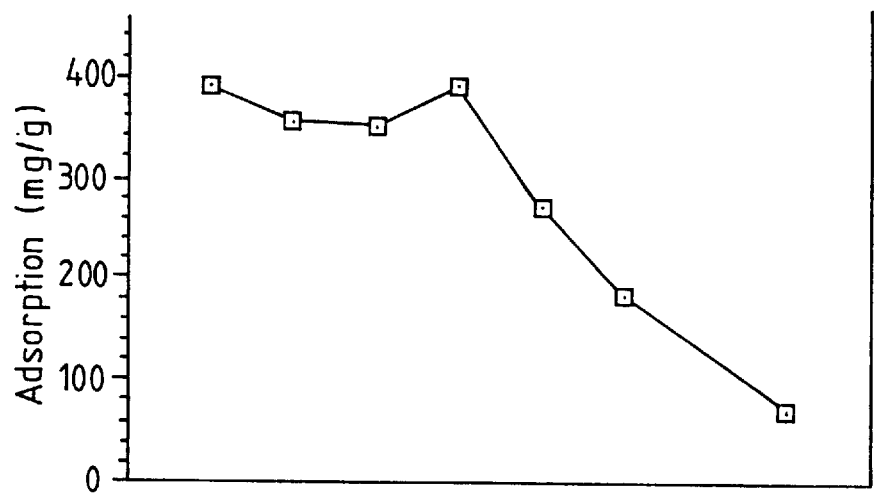
FIG. 8a is a graph of the adsorption of polymeric latex on titanium dioxide particles for pigment grinds exemplifying the process of the invention as a function of grind PVC.

The procedure of Example 1 was repeated except that 30% volume solids grinds of varying PVC were prepared (pH=9) using a commercially available polymeric latex (Rhoplex® AC-61 latex)(Rhoplex is a trademark of Rohm and Haas Company) having a particle size of 150 nm, and glass transition temperature of 9° C., and titanium dioxide (Ti-Pure R-900). Adsorption in milligrams of latex per gram of titanium dioxide was determined as in Example 1. viscosity was measured using a Brookfield viscometer at 6 RPM and 60 RPM. Zeta potential was measured in an aqueous medium comprising 15 mM KCL at a pH of 9 using a Malvern Zetasizer® IIc instrument. The results of the measurements are given in Table II and shown in FIGS. 8a–8c in which absoption, log (grind viscosity) and zeta potential are respectively plotted as functions of the grind PVC.

Figure 8B:
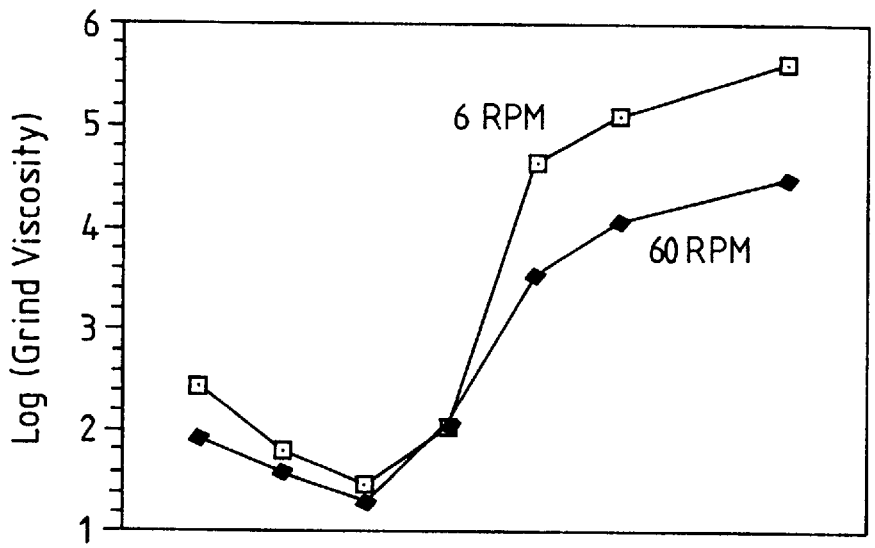
FIG. 8b is a graph of the logarithm of grind viscosity of the pigment grinds of FIG. 6a as a function of grind PVC.
Figure 8C:
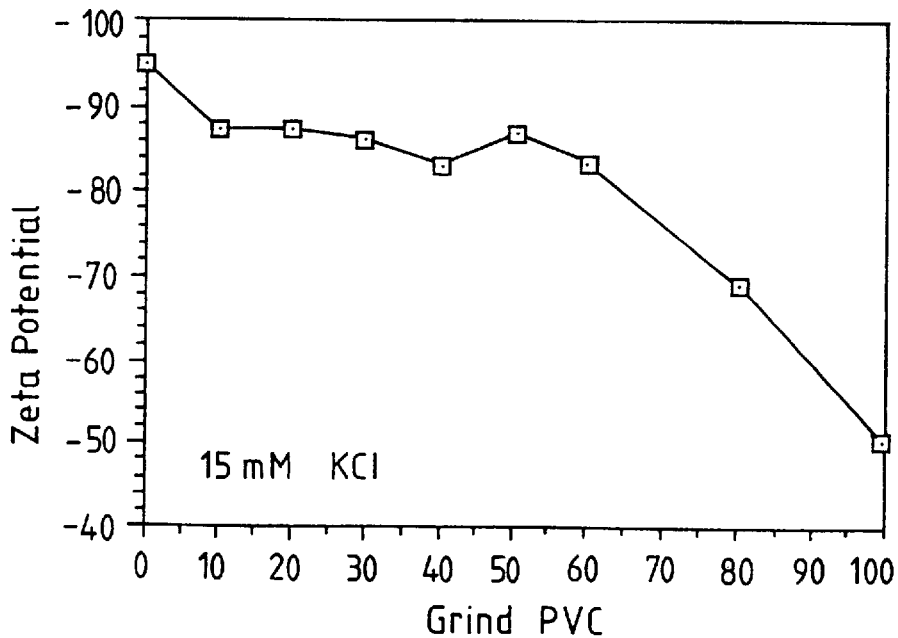
FIG. 8c is a graph of the zeta potential of the composite particles formed in the pigment grinds of FIG. 6a as a function of grind PVC.

These results show that the composite latex-titanium dioxide particles prepared by the process of this invention have decreased grind viscosity and increased surface charge. The adsorption results shown in FIG. 8a demonstrate that, at PVC's below about 40, sufficient latex is added to saturate the titanium dioxide surface with latex; that is, the latex charge is equal to or greater than the saturation level of the Rhoplex AC-61 polymeric latex on Ti-Pure R-900 titanium dioxide. At higher PVCs, however, there is insufficient latex present and the level of adsorption decreases with increasing PVC. As shown in FIG. 8b grind viscosity is observed to be high at high PVCs where there is little latex adsorption, but low at low PVCs where adsorption is complete. This demonstrates that latex adsorption results in a profound lowering of grind viscosity. In a similar manner, as shown in FIG. 8c, the surface charge density of the composite particle, as indicated by its zeta potential, is high at low PVCs where adsorption is maximized, but decreases as adsorption decreases at high PVCs. The higher surface charge of the latex-dispersed titanium dioxide is an indication of greater stability.

TABLE II

| Example | Grind PVC | Absorption (mg/g) | Zeta Potential | Grind Viscosity (cp)[1] 6 rpm | 60 rpm |
|---|---|---|---|---|---|
| Rhoplex AC-61 | 0 | — | −95 | — | — |
| 21 | 10 | 388 | −87 | 260 | 80 |
| 22 | 20 | 356 | −87 | 62 | 39 |
| 23 | 30 | 354 | −86 | 28 | 19 |
| 24 | 40 | 394 | −83 | 100 | 111 |
| 25 | 50 | 273 | −86 | 39,100 | 3,170 |
| 26 | 60 | 182 | −83 | 118,000 | 10,300 |
| 27 | 80 | 68 | −68 | 390,000 | 27,900 |
| Ti-Pure R-900 | 100 | — | −50 | — | — |

[1]Grind viscosity is measured using a Brookfield viscometer at the speed shown.

EXAMPLES 28–31

A 20% PVC latex-(Rhoplex AC-61) dispersed grind was prepared as in Example 1 (except as follows) according to the following formulation:

| Component | Weight (g) |
|---|---|
| Rhoplex AC-61 latex | 493.77 |
| propylene glycol | 20.00 |
| Colloid 643 defoamer | 8.00 |
| Ti-Pure R-900 titanium dioxide | 204.72 |

Analogous grinds were also prepared in which the Ti-Pure R-900 titanium dioxide was pre-dispersed with 0.05% to 1.0% by weight Tamol® 731 polyacrylic acid dispersant (Tamol is a trademark of Rohm and Haas Company). Tamol 731 is a sodium salt of polymeric carboxylic acid. Pigment dispersion with one percent by weight polymeric carboxylic acid dispersant is considered conventional. In preparing these grinds, a conventional Tamol 731-dispersed grind was prepared first; latex (Rhoplex AC-61) was then added and the mixture milled on a high speed disk disperser for 15 minutes. Adsorption in milligrams of latex per gram of titanium dioxide was determined as in Example 1. The results of the absorption measurement are shown in Table III. These results show that the advantageous results of the process of this invention are realized even in the presence of low levels of conventional water-soluble polyelectrolyte dispersants. However, high levels of such dispersants (e.g. several tenths of a percent by weight or higher, typical of those levels used for conventional dispersion of titanium dioxide) can result in complete suppression of adsorption. This effect is believed to be attributable due to the increase in titanium dioxide surface charge which results from adsorption of the conventional polyelectrolyte dispersant and addition of other species which result in adjusting surface charge to an inappropriate level (here too high) should lead to similar behavior.

TABLE III

| Example | Dispersant | Adsorption (mg/g) |
|---|---|---|
| 28 | AC-61 | 562 |
| 29 | 0.05% Tamol 731/AC-61 | 378 |
| 30 | 0.1% Tamol 731/AC-61 | 351 |
| 31 | 0.2% Tamol 731/AC-61 | 208 |
| Comp. 2[1] | 0.3% Tamol 731/AC-61 | −13 |
| Comp. 3[1] | 0.5% Tamol 731/AC-61 | −80 |
| Comp. 4[1] | 1.0% Tamol 731/AC-61 | −174 |

[1]Comparative example.

EXAMPLES 32–44

The process of Examples 28–31 was repeated to provide 35% volume solids pigment grinds using titanium dioxide pre-dispersed with 0.05% Tamol 731 polyelectrolyte dispersant and a series of polymeric latexes of varying particle size and glass transition temperature and containing varying amounts of acidic monomer, as given in Table IV. The polymeric latexes were prepared using a gradual-addition, batch process, with all of the acidic monomer being added in the monomer mixture, except in the case of Example 39, in which the acidic monomer was added in a manner known to provide a preferred distribution of acid functionality at the surface of the polymeric latex.

After equilibrating grind for one week, a sample was removed, diluted 1 part to 3 parts with water, and centrifuged. The concentration of unadsorbed latex in the supernatant was determined gravimetrically and used to calculate the milligrams of latex adsorbed per gram of titanium dioxide.

To determine the reversibility of the latex adsorption, 1% polyacrylic acid (Tamol 963 dispersant) was added to a portion of the remaining grind and the mixture stirred for 15 minutes. After equilibrating for 1 week, latex adsorption was determined as before. This procedure was carried out immediately after the grind was made and after it had been allowed to equilibrate for 1 day and 1 week. The results are given in Table IV.

These results in Table IV show that the ability of polyacrylic acid to desorb previously adsorbed latex decreases with decreasing effective Tg and increasing surface acidity of the latex.

Although in Examples 32–44 the effective Tg is controlled either by modifying the latex monomer composition so as to modify the actual polymer Tg (Examples 32–35), or by the addition of a low molecular weight plasticizer (Example 36), other methods of adjusting the effective Tg should be similarly efficacious. Likewise, surface acidity is controlled in these Examples 32–44 by varying the level of acidic monomer (Examples 33 and 37–38), or by polymerization process to enhance the surface acid (Example 39), but other methods of influencing latex surface acidity should be equally satisfactory.

The combined effects of Tg and surface acidity are also clearly demonstrated by the results given in Table IV. While desorption decreases significantly on going from 2% to 5% methacrylic acid when the Tg equals 50° C. (Examples 33 and 37), it actually increases slightly for the same change in acidity at Tg=90° C. (Examples 32 and 40).

The results in Table IV also demonstrate that the type of acid functionality greatly influences reversibility. Thus replacing methacrylic acid with phosphoethyl methacrylate results in a decrease in desorption (Examples 37 and 41). A similar decrease in reversibility is obtained by replacing methacrylic acid with itaconic acid (Examples 33 and 42).

Table IV also shows that reversibility is not significantly effected by latex particle size (Examples 33 and 43 and Examples 35 and 44).

TABLE IV

| Example | Part. Size (nm) | Tg (° C.) | Acidic Monomer | Total Latex (mg/g) | Adsorption (mg/g) | % Desorption[1] After Equilibration | | |
|---|---|---|---|---|---|---|---|---|
| | | | | | | Immed. | 1 day | 1 week |
| 32 | 69 | 92 | 2% MAA | 158 | 142 | 99 | 97 | 80 |
| 33 | 65 | 49 | 2% MAA | 158 | 122 | 101 | 88 | 51 |
| 34 | 63 | 29 | 2% MAA | 158 | 127 | 110 | 33 | 2 |
| 35 | 86 | 10 | 1% MAA | 280 | 276 | 29 | 31 | 13 |
| 36 | 63 | 29[2] | 2% MAA | 158 | 153 | 86 | 9 | −2 |
| 37 | 64 | 51 | 5% MAA | 158 | 137 | 91 | 67 | 20 |
| 38 | 66 | 52 | 10% MAA | 158 | 132 | 95 | 7 | 2 |
| 39 | 64 | 51 | 5% MAA | 158 | 137 | 64 | 1 | 0 |
| 40 | 73 | 94 | 5% MAA | 158 | 152 | 109 | 105 | 97 |
| 41 | 56 | 54 | 2% MAA + 2% PEM[3] | 158 | 156 | 23 | 7 | 3 |
| 42 | 69 | 50 | 2% IA[4] | 158 | 157 | 22 | −1 | −1 |
| 43 | 161 | 49 | 2% MAA | 521 | 491 | 70 | 32 | 45 |
| 44 | 148 | 10 | 1% MAA | 521 | 512 | 49 | 16 | 8 |

[1]Desorption values less than 0 and greater than 100 reflect experimental error in the desorption measurement and imply no desorption and complete desorption respectively.
[2]Contains 10% Texanol ® coalescent (trademark of Eastman Kodak Co.), 2,2,4-trimethyl-1,3-pentanediol monoisobutyrate.
[3]PEM = phosphoethyl methacrylate.
[4]IA = itaconic acid.

EXAMPLES 45–47

A typical conventionally dispersed 20% PVC gloss paint (Comparative Example 5) was prepared according to the following formulation.

Pigment grind:

| Component | Weight (g) |
| --- | --- |
| water | 20 |
| propylene glycol | 20 |
| Colloid 643 defoamer | 1 |
| Tamol 731 dispersant | 8.22 |
| Ti-Pure R-900 titanium dioxide | 204.72 |

These components were milled on a high speed disk disperser to form a pigment grind, and were letdown at a slower speed with the following:

| Component | Weight (g) |
| --- | --- |
| Rhoplex ® AC-61 polymer latex | 493.77 |
| Colloid 643 defoamer | 4 |
| Texanol coalescent | 22.96 |
| Triton GR-7M surfactant | 2 |
| propylene glycol | 59 |
| Nuosept ® 95 preservative | 6 |
| water and Natrosol ® 250 MR cellulosic thickener | 175.03 |

The mix is thickened to a Stormer viscosity of of 90 KU by addition of an aqueous solution of the cellulosic thickener, and the pH of the mix is adjusted to 9 by addition of a concentrated ammonia solution. Rhoplex is a trademark of Rohm and Haas Co. Nuosept is a trademark of Nuodex, Inc. Natrosol is a trademark of Hercules, Inc.

Latex-dispersed analogs of Comparative Example 5 were prepared at 20% PVC (Example 45) and lower PVCs (Examples 46–47) by omitting the Tamol 731 dispersant and including the Rhoplex AC-61 polymeric latex in the grind. To prepare the latex-dispersed grinds, all wet ingredients were placed in an ice-cooled grind bucket and the Ti-Pure R-900 titanium dioxide was added while stirring slowly. Mixing speed was then increased to give a good vortex and milling was continued for 15 minutes. Kubelka-Munk scattering coefficients were determined for all paints using a modification of ASTM D 2805–70. The results of these measurements are given in Table V.

These examples demonstrate that there is a substantial increase in hiding as reflected by the Kubelka-Munk scattering coefficients when titanium dioxide is dispersed with polymeric latex according to the process of this invention rather than when the titanium dioxide is dispersed with a conventional water-soluble, polyelectrolyte dispersant. For example, the scattering coefficient measured for the 20% PVC gloss paint in which the titanium dioxide was dispersed conventionally was 7.45 (Comparative Example 5) while the scattering coefficient for the 20% PVC gloss paint prepared according to the present invention was 8.65 (Example 45).

The increased scattering efficiency of latex-dispersed titanium dioxide allows paints to be formulated at significantly lower PVCs without loss of hiding power, greatly reducing the usage of expensive titanium dioxide. This is shown by the fact that the paint of Example 47, which has a PVC of only 16%, has about the same scattering coefficient as that of Comparative Example 45 which has a PVC of 20%, twenty-five percent higher.

TABLE V

| Example | Dispersant | % PVC | Scattering Coefficient |
| --- | --- | --- | --- |
| Comp. 5[1] | Tamol 731 | 20 | 7.45 |
| 45 | AC-61 | 20 | 8.65 |
| 46 | AC-61 | 18 | 7.99 |
| 47 | AC-61 | 16 | 7.42 |

[1]Comparative Example.

EXAMPLES 48–51

A series of latex-dispersed paints (Examples 48–51) and a series of conventionally dispersed paints (Comparative Examples 6–9), each series having 40, 30, 20, and 10% PVC, were prepared according to the formulation of Examples 45–47 except that the Rhoplex AC-61 latex was replaced with Rhoplex AC-235 latex, a commercially available latex intended for paint application, and the Texanol coalescent was omitted. Kubelka-Munk scattering coefficients were determined as in Examples 45–47. The results obtained are given in Table VI and shown in FIG. 9.

These results show that the improved hiding obtained by dispersing titanium dioxide with latex according to the process of this invention is realized over a wide range of titanium dioxide PVCs. The greatest increases in the scattering coefficient are observed at high PVCs (Examples 50–51) where the distances between the individual titanium dioxide particles are small.

TABLE VI

| Example | % PVC | Scattering Coefficient |
| --- | --- | --- |
| 48 | 10 | 4.25 |
| Comp. 6[1] | 10 | 4.04 |
| 49 | 20 | 7.18 |
| Comp. 7[1] | 20 | 6.60 |
| 50 | 30 | 9.40 |
| Comp. 8[1] | 30 | 8.39 |
| 51 | 40 | 9.68 |
| Comp. 9[1] | 40 | 8.61 |

[1]Comparative example.

EXAMPLES 52–55

A typical conventionally dispersed flat paint (Comparative Example 10) containing 15% PVC titanium dioxide (Ti-Pure R-900) and 37% alumino-silicate extender (Minex 4) was prepared according to the following formulation:

Pigment grind:

| Component | Weight (g) |
| --- | --- |
| water | 200 |
| ethylene glycol | 18 |
| Colloid 643 defoamer | 2 |
| Tamol 731 dispersant | 12.9 |
| Natrosol 250MHR thickener | 2.5 |
| Ti-Pure R-900 titanium dioxide | 180 |
| Minex ® 4 alumino-silicate (Minex is a trademark of Falconbridge Ltd.) | 280 |

The mixture was milled on a high speed disk disperser and letdown at a slower speed with the following:

| | |
|---|---|
| Rhoplex AC-61 polymer latex | 337.6 |
| Colloid 643 defoamer | 4 |
| Texanol coalescent | 15.7 |
| Nuosept 95 preservative | 6 |
| water and Natrosol 250 MR cellulosic thickener solution | 103.2 |

The paint was thickened to a Stormer viscosity of 95 KU, and the pH was adjusted to 9.5 by addition of ammonia.

Four latex-dispersed analogs (Examples 52–55) of Comparative Example 10 were prepared by omitting the Tamol 731 dispersant and including the Rhoplex AC-61 latex in the grind. The latex-dispersed grinds for these four paints were all prepared in a manner similar to Examples 45–47 but with the following variations: (1) Ti-Pure R-900 added before Minex 4 (Example 52); (2) Minex 4 added before Ti-Pure R-900 (Example 53); (3) separate latex-dispersed Ti-Pure R-900 grind and Minex 4 grind prepared (Example 54); and (4) separate grinds, the Ti-Pure R-900 latex-dispersed, the Minex 4 conventionally dispersed with Tamol 731 (Example 55).

Kubelka-Munk scattering coefficients were determined as above. The results are given in Table VII. These results demonstrate that the improved hiding obtained by dispersing titanium dioxide with latex according to the process of this invention is realized even in the presence of substantial levels of the large particle size extenders typically used in higher PVC paints. The Minex 4 alumino-silicate had an average particle size of about 7.5 microns (National Paint and Coatings Association Raw Materials Index). Further, these results demonstrate that, in order to achieve the increased hiding, it is only necessary that the titanium dioxide be latex-dispersed, latex dispersion of the extender pigment is not required.

TABLE VII

| Example | Dispersant | Comments | Scattering Coefficient |
|---|---|---|---|
| Comp. 10[1] | Tamol 731 | Control | 4.16 |
| 52 | AC-61 | R-900 added before Minex 4 | 4.71 |
| 53 | AC-61 | Minex 4 added before R-900 | 4.83 |
| 54 | AC-61/AC-61 | separate R-900/Minex 4 grinds | 4.79 |
| 55 | AC-61/Tamol 731 | separate R-900/Minex 4 grinds | 4.68 |

[1]Comparative example.

EXAMPLES 56–59

The latex-dispersed grinds of Examples 28–31 and Comparative Examples 2–4 were letdown to paints according to the formulation of Examples 45–47 to provide the paints of Examples 56–59 and Comparative Examples 11–13. Kubelka-Munk scattering coefficients were determined, and the results are given in Table VIII along with results for a control paint conventionally dispersed with Tamol 731 dispersant (Comparative Example 14).

These results demonstrate that low levels of conventional pre-dispersants can be beneficial in cases where dispersing titanium dioxide with latex according to the process of this invention results in grit in the fully formulated paint, as with Example 57. In such cases, low levels of conventional predispersant eliminate the grit without seriously compromising hiding. However, levels of pre-dispersant which are too high (Comparative Examples 11–13, 0.3%–1.0% by weight, respectively) suppress latex adsorption and with it the increased hiding which results from such adsorption.

TABLE VIII

| Example | Dispersant | Grit | Scattering Coefficient |
|---|---|---|---|
| 56 | AC-61 | Moderate | 8.40 |
| 57 | 0.05% Tamol 731/AC-61 | None | 7.92 |
| 58 | 0.1% Tamol 731/AC-61 | None | 8.10 |
| 59 | 0.2% Tamol 731/AC-61 | None | 8.07 |
| Comp. 11[1] | 0.3% Tamol 731/AC-61 | None | 7.59 |
| Comp. 12[1] | 0.5% Tamol 731/AC-61 | None | 7.41 |
| Comp. 13[1] | 1.0% Tamol 731/AC-61 | None | 7.18 |
| Comp. 14[1] | 1.0% Tamol 731 | None | 7.17 |

[1]Comparative example.

EXAMPLES 60–64

Latex-dispersed (Examples 60–64) and conventionally dispersed (Comparative Examples 15–19) paints were prepared according to the formulation of Examples 45–47 using five different thickeners, as given in Table IX.

TABLE IX

| Thickener | Type | Efficiency |
|---|---|---|
| Natrosol 250MR | non-associative | |
| Acrysol ® RM-825[1] | nonionic associative | High |
| Acrysol RM-1020 | nonionic associative | Low |
| Acrysol TT-935 | anionic associative | High |
| Acrysol RM-5 | anionic associative | Low |

[1]Acrysol is a trademark of Rohm and Haas Co.

Kubelka-Munk scattering coefficients were determined as above. Results are given in Table X. In each case, the hiding of the latex-dispersed paint was greater than the hiding of the conventionally dispersed paint. These results demonstrate that the improved hiding obtained by dispersing titanium dioxide with latex according to the process of this invention is realized with both non-associative and associative-type thickeners. Unlike paints based on conventional water-soluble dispersants, where the hiding can vary greatly from thickener to thickener, latex-dispersed paints show the same excellent hiding regardless of the the type of thickener used.

TABLE X

| Example | Thickener | Scattering Coefficient |
|---|---|---|
| 60 | Natrosol 250MR | 8.44 |
| Comp. 15[1] | Natrosol 250MR | 7.44 |
| 61 | Acrysol RM-825 | 8.30 |
| Comp. 16[1] | Acrysol RM-825 | 7.76 |
| 62 | Acrysol RM-1020 | 8.31 |
| Comp. 17[1] | Acrysol RM-1020 | 7.68 |
| 63 | Acrysol TT-935 | 8.04 |
| Comp. 18[1] | Acrysol TT-935 | 7.17 |
| 64 | Acrysol RM-5 | 8.07 |
| Comp. 19[1] | Acrysol RM-5 | 7.86 |

[1]Comparative example.

EXAMPLES 65–79

Figure 10A:
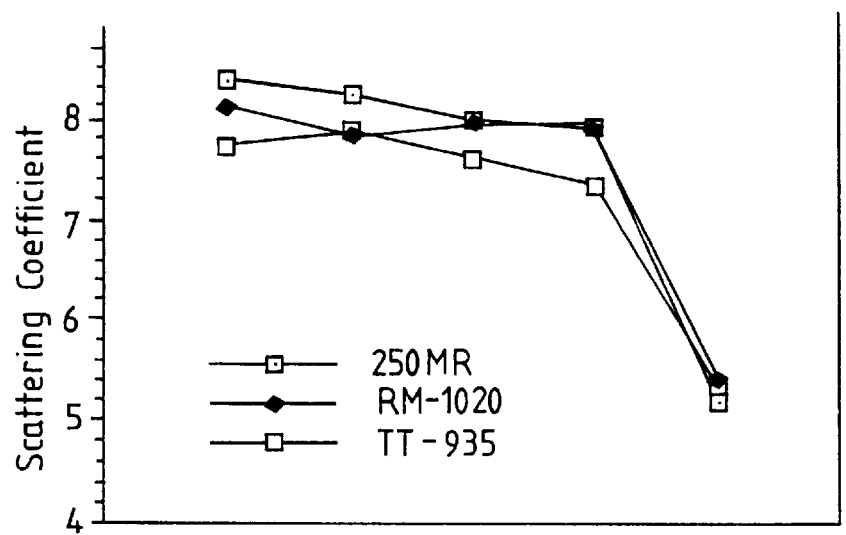
FIG. 10a is a graph of Kubelka-Munk scattering coefficient as a function of grind PVC for a series of paints preparing according to the process of the present invention and storing a critical PVC.
Figure 10B:
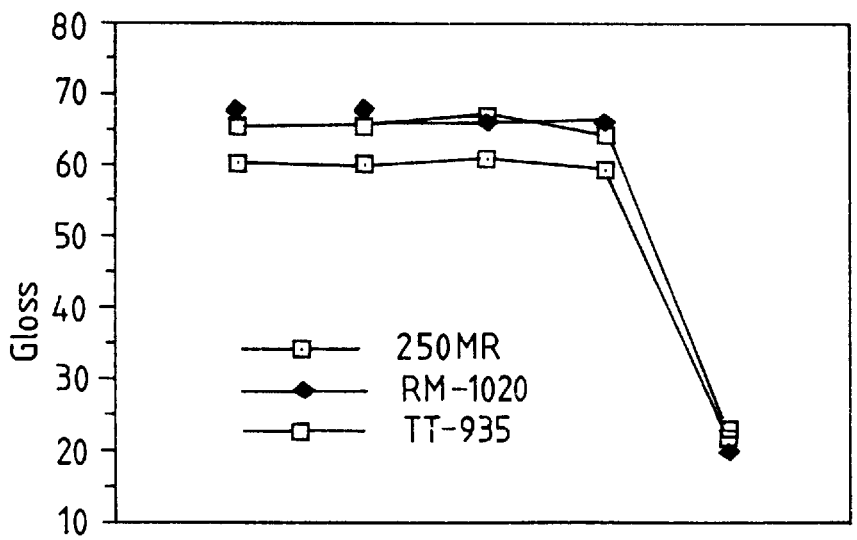
Figure 10C:
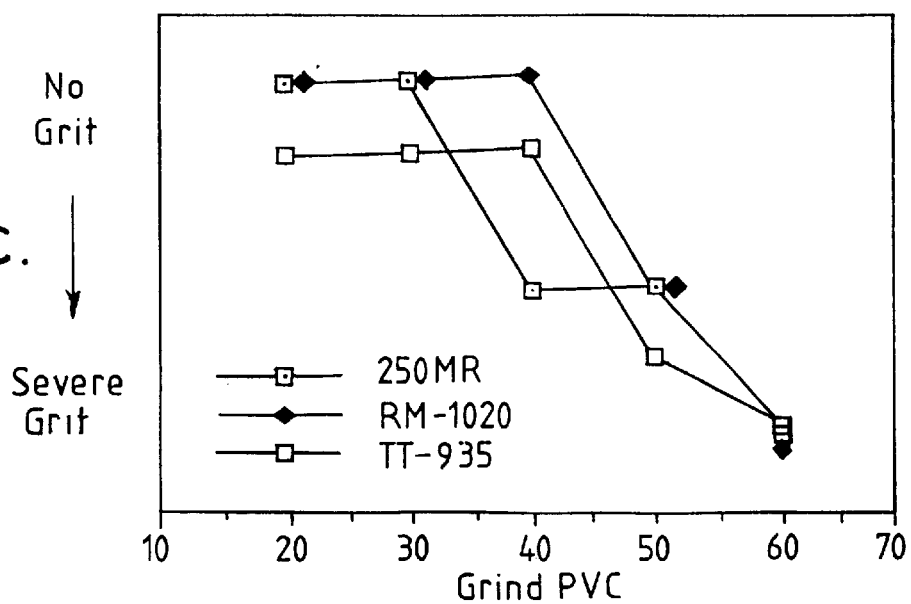

Latex-dispersed gloss paints were prepared by the process of Examples 56–59 in which the Ti-Pure R-900 was pre-dispersed with 0.1% Tamol 731 dispersant. Pigment grinds were prepared as in Examples 28–31 but the amount of latex dispersant (Rhoplex AC-61) added to the grind was varied so as to give grind % PVCs of 20, 30, 40, 50, and 60. Binder latex (Rhoplex AC-61) was added to the letdown as needed to give a final paint % PVC of 20. Paints were thickened with Natrosol 250MR, Acrysol RM-1020, and Acrysol TT-935 thickeners. Kubelka-Munk scattering coefficients were determined as above, and 60° gloss was measured using a Pacific Scientific Glossgard II glossmeter. Grit was rated on a qualitative scale. Results are given in Table XI and plotted in FIGS. 10a–10c.

As noted above (Examples 32–44, Table IV), it appears that low $T_g$ latexes (the $T_g$ of Rhoplex AC-61 polymeric latex is 9° C.) adsorb irreversibly on titanium dioxide. The results shown in FIGS. 10a–10c and reported in Table XI demonstrate that, when an irreversible adsorbed latex is used to disperse titanium dioxide according to the process of this invention, there is a "critical" grind PVC above which paint performance deteriorates markedly. With Rhoplex AC-61 latex as the dispersing latex, this appears at about 40–50% PVC. At PVCs above this level, hiding and gloss drop precipitously (60% PVC, Examples 69, 74 and 79) and grit becomes severe. The saturation level for Rhoplex AC-61 polymer latex adsorbed on Ti-Pure R-900 titanium dioxide is measured to be about 400 mg/g (Examples 21–24, Table II), which is equivalent to a grind PVC of 41%. Thus, for an irreversibly adsorbed "soft" (that is, having a low effective glass transition temperature) latex, in order to obtain optimum performance sufficient latex must be charged to the grind to fully saturate the titanium dioxide surface.

TABLE XI

| Example | % Grind PVC | Thickener | Scattering Coefficient | Gloss | Grit |
|---|---|---|---|---|---|
| 65 | 20 | Natrosol 250MR | 8.37 | 60 | none |
| 66 | 30 | " | 8.21 | 59 | none |
| 67 | 40 | " | 7.97 | 60 | moderate |
| 68 | 50 | " | 7.85 | 58 | moderate |
| 69 | 60 | " | 5.12 | 19 | severe |
| 70 | 20 | Acrysol RM-1020 | 8.12 | 65 | none |
| 71 | 30 | " | 7.80 | 65 | none |
| 72 | 40 | " | 7.93 | 65 | none |
| 73 | 50 | " | 7.88 | 65 | moderate |
| 74 | 60 | " | 5.34 | 18 | severe |
| 75 | 20 | Acrysol TT-935 | 7.72 | 65 | slight |
| 76 | 30 | " | 7.85 | 65 | slight |
| 77 | 40 | " | 7.59 | 66 | slight |
| 78 | 50 | " | 7.31 | 63 | moderate/severe |
| 79 | 60 | " | 5.25 | 21 | severe |

EXAMPLES 80–97

Latex-dispersed gloss paints were prepared by the process of Examples 65–79 in which the Ti-Pure R-900 was pre-dispersed with 0.5% Tamol 731 dispersant. Pigment grinds were prepared as in Examples 28–31 but a small, "hard" (i.e. high $T_g$) latex dispersant (66 nm, Tg=92° C., 2% methacrylic acid) was employed, and the amount of latex dispersant added to the grind was varied so as to give grind % PVCs of 60, 65, 70, 75, 80, and 85. Binder latex (Rhoplex AC-61) was added to the letdown as needed to give a final paint % PVC of 20. Paints were thickened with Natrosol 250MR, Acrysol RM-1020, and Acrysol TT-935 thickeners as in Examples 65–79. Kubelka-Munk scattering coefficients, 60° gloss, and grit were determined as above. Results are given in Table XII.

As shown by Examples 32–44 above, absent special functional groups providing strong adsorption, high $T_g$ latexes adsorb reversibly on titanium dioxide particles. The results reported in Table XII for Examples 80–97 demonstrate that, unlike the situation demonstrated by Examples 65–79 for an irreversibly adsorbed latex, when a reversibly adsorbed latex is used to disperse titanium dioxide according to the process of this invention, paint performance is independent of grind PVC. Reversibly adsorbed polymeric latex dispersants can be displaced by the binder latex in fully formulated paints. Since binder latexes are generally "soft" (i.e. low glass transition temperature) and adsorb irreversibly, the titanium dioxide particles which were originally coated with reversibly adsorbed "dispersant latex" are believed to eventually become coated with irreversibly adsorbed "binder latex". Thus, extrapolating from the the results of Examples 80–97, it appears that optimum paint performance thus requires only that sufficient binder latex be present to fully saturate the titanium dioxide surface.

TABLE XII

| Example | % Grind PVC | Thickener | Scattering Coefficient | Gloss | Grit |
|---|---|---|---|---|---|
| 80 | 60 | Natrosol 250MR | 8.67 | 54 | slight/moderate |
| 81 | 65 | " | 8.76 | 57 | slight |
| 82 | 70 | " | 8.58 | 57 | moderate |
| 83 | 75 | " | 8.32 | 58 | moderate |
| 84 | 80 | " | 7.84 | 59 | slight/moderate |
| 85 | 85 | | 7.97 | 58 | moderate |
| 86 | 60 | Acrysol RM-1020 | 8.36 | 67 | slight/moderate |
| 87 | 65 | " | 8.29 | 33 | none |
| 88 | 70 | " | 8.24 | 26 | moderate |
| 89 | 75 | " | 8.35 | 59 | moderate |
| 90 | 80 | " | 8.37 | 66 | slight/moderate |
| 91 | 85 | | 8.01 | 65 | moderate |
| 92 | 60 | Acrysol TT-935 | 7.85 | 41 | slight |
| 93 | 65 | " | 8.15 | 54 | none |
| 94 | 70 | " | 8.34 | 60 | slight/moderate |
| 95 | 75 | " | 8.18 | 60 | slight |
| 96 | 80 | " | 8.29 | 61 | slight |
| 97 | 85 | " | 7.88 | 59 | slight |

EXAMPLES 98–100

A conventionally dispersed 20% PVC gloss paint (Comparative Example 20) was prepared according to the following formulation.

Pigment grind:

| Component | Weight (g) |
|---|---|
| water | 30 |
| propylene glycol | 20 |
| Colloid 643 defoamer | 1 |
| Tamol 731 dispersant | 8.19 |
| Ti-Pure R-900 titanium dioxide | 204.72 |

These components were milled on a high speed disk disperser to form a pigment grind and were letdown at a slower speed with the following:

| Component | Weight (g) |
|---|---|
| Rhoplex AC-61 polymeric latex | 493.76 |
| Colloid 643 defoamer | 4 |
| Texanol coalescent | 22.96 |
| Triton GR-7M surfactant | 2 |
| propylene glycol | 59 |
| Nuosept 95 preservative | 6 |
| water and Natrosol 250MR cellusosic thickener | 181.08 |

The mix is thickened to a Stormer viscosity of 80 Krebs Units ("KU") by addition of an aqueous solution of the cellusosic thickener, and the pH of the mix is adjusted to 9 by addition of ammonia.

A second conventionally dispersed 20% PVC gloss paint (comparative Example 21) was also prepared according to the formulation of Comparative Example 20 except that the polymeric latex (Rhoplex AC-61), which has a particle size of about 150 nm, was replace with a polymeric latex of identical monomer composition but with a particle size of 86 nm ("Latex A", 38.7% solids).

A polymeric latex-dispersed analog (Example 98) of Comparative Example 20 was prepared using the following pigment grind formulation:

| Component | Weight (g) |
|---|---|
| water | 30.62 |
| propylene glycol | 60 |
| Colloid 643 defoamer | 1 |
| Tamol 731 dispersant | 0.41 |
| Ti-Pure R-900 titanium dioxide | 204.72 |
| Rhoplex AC-61 polymeric latex | 493.76 |

To prepare the latex-dispersed grind, all components except the polymeric latex were milled on a high speed disk disperser to from an initial pigment grind. The polymeric latex was then added and milling was continued for 15 minutes while cooling with ice to give the final latex-dispersed grind. This was letdown at a slower speed to yield a paint (Example 98) with the same compostion as Comparative Example 20 except for a slightly lower level of Tamol 731 dispersant.

A latex-dispersed analog (Example 99) of Comparative Example 21 was prepared in the same manner except that the Rhoplex AC-61 polymeric latex was replaced with Latex A.

A latex-dispersed 20% PVC gloss paint (Example 100) was prepared according to the following formulation using polymeric latex having a glass transition temperature of 49° C., a particle size of 65 nm, and having 2% methacrylic acid (Latex B, 37.9% solids:

Pigment grind:

| Component | Weight (g) |
|---|---|
| water | 36.62 |
| propylene glycol | 54 |
| Colloid 643 defoamer | 1 |
| Tamol 731 dispersant | 0.41 |
| Ti-Pure R-900 titanium dioxide | 204.72 |
| Latex B | 85.57 |
| Texanol coalescent | 3.24 |

To prepare the latex-dispersed grind, all components, except the Latex B and the Texanol coalescent, were milled on a high speed disk disperser to from an initial pigment grind. Then the Latex B and the coalescent were combined and added, and milling continued for 15 minutes while cooling with ice to give the final latex-dispersed grind. This was conditioned (to reduce desorption of the adsorbed Latex B) by being allowed to equilibrate for two days, and letdown at a slower speed with the following:

| Component | Weight (g) |
|---|---|
| Latex B | 509.52 |
| Colloid 643 defoamer | 4 |
| Texanol coalescent | 19.72 |
| Triton GR-7M surfactant | 2 |
| propylene glycol | 25 |
| Nuosept 95 preservative | 6 |
| water and Natrosol 250MR cellusosic thickener | 81.8 |

The mix is thickened to a Stormer viscosity of 80 KU by addition of an aqueous solution of the cellusosic thickener, and the pH of the mix adjusted to 9 by addition of ammonia.

Kubelka-Munk scattering coefficients were determined for all paints as above. The results are given in Table XIII.

These results confirm the substantial increase in scattering coefficient, which is a measure of the hiding power of the paint, obtained when titanium dioxide is dispersed with polymeric latex according to the process of the present invention. These results also show that the extent of this hiding increase decreases with decreasing particle size of the absorbed polymeric latex. This is illustated by the fact that the 150 nm polymeric latex of Example 98 shows an increase of 0.92 units in scattering coefficient relative to Comparative Example 20, while the 86 nm polymeric latex of Example 99 shows an increase of only 0.27 units over Comparative Example 21. These results also demonstrate that hiding increases with increasing glass transition temperature of the adsorped polymeric latex. Thus, dispersing the titanium dioxide with the 65 nm, $T_g$=49° C., latex (Example 100) provides a scattering coefficient of 8.50, which is substantially higher thant the coefficient of 7.67 obtained for the 86° C., $T_g$=10° C., polymeric latex (Example 99), and even slightly higher than the scattering coeficient of 8.23 obtained for the much larger 150 nm, $T_g$=10° C., polymeric latex (Example 98).

TABLE XIII

| Example | Binder | Dispersant | Scattering Coefficient | Comment |
|---|---|---|---|---|
| C. 20[1] | AC-61 | 1% Tamol 731 | 7.31 | control |
| C. 21[1] | Latex A | 1% Tamol 731 | 7.40 | control |
| 98 | AC-61 | 0.05% Tamol 731 + AC-61 | 8.23 | 150 nm, $T_g$ = 10° C. latex-dispresed |

TABLE XIII-continued

| Example | Binder | Dispersant | Scattering Coefficient | Comment |
|---|---|---|---|---|
| 99 | Latex A | 0.05% Tamol 731 + Latex A | 7.67 | 86 nm, $T_g$ = 10° C. latex-dispresed |
| 100 | Latex B | 0.05% Tamol 731 + Latex B | 8.50 | 65 nm, $T_g$ = 49° C. latex dispersed |

[1] Comparative example.

EXAMPLE 101

A typical conventionally dispersed exterior flat paint (Comparative Example 22) was prepared according to the following formulation:

Pigment grind:

| Component | Weight (g) |
|---|---|
| water | 58 |
| methyl carbitol | 59 |
| Colloid 643 defoamer | 1 |
| Tamol 681 dispersant | 8 |
| Triton N-57 dispersant | 4 |
| Ti-Pure R-902 titanium dioxide | 225 |
| Minex 4 alumino-silicate | 160 |
| Icecap ® K clay (Icecap is a tradmark of Burgess Pigment Co.) | 50 |

The pigment grind was milled on a high speed disk disperser and letdown at a slower with the following:

| Component | Weight (g) |
|---|---|
| Rhoplex AC-829 polymeric latex | 370.3 |
| Colloid 643 defoamer | 3 |
| Texanol coalescent | 9.3 |
| Polyphase AF-1 fungicide, (Troy Chemical Corp.) | 4 |
| Acrysol TT-935 thickener | 13.4 |
| water and Natrosol 250MR | 190.4 |

The pH is adjusted to 9 with ammonia.

A latex-dispersed analog of the above was prepared by omitting the Tamol 681 dispersant and including a polymeric latex dispersant (Rhoplex AC-829) in the grind. To prepare the latex dispersed grind, all wet ingredients were placed in the grind bucket and the Ti-Pure R-902 added while stirring slowly. Mixing speed was then increased to give a good vortex. Early blister resistance was measured over a chalky substrate after drying overnight. Samples were rated according to ASTM blister standards (Pictorial Standards of Coating Defects published by the Federation of Societies of Coating Technology) after one hour in a fog box. Results are given in Table XIV, and show that the process of the present invention provides improved early blister resistance in comparison with a paint made using pigment dispersed with a conventional water-soluble dispersant.

TABLE XIV

| | | Blister Rating | |
|---|---|---|---|
| Example | Paint | Size | Density |
| Comp. 22 | control | 8 | Medium Dense |
| 101 | latex-dispersed | none | — |

EXAMPLES 102–105

A one perecent Tamol 731-dispersed grind (Comparative Example 23) was prepared by mixing 9 g of water, 40 g of propylene glycol, 2 g of Colloid 643 defoamer, 8 g of Tamol 731 dispersant, and 200 g of Ti-Pure R-900 titanium dioxide using a high speed disk disperser, and the pH was adjusted to about 9 by addition of ammonia.

Additional grinds were prepared in a similar manner except that the 1% Tamol 731 dispersant was replaced with 0.05% Tamol 731 dispersant (Example 102) or with 0.05% Tamol 731 dispersant and either 0.2% citric acid (Example 103), 0.21% L-tartaric acid (Example 104), or 0.375% sodium succinate (Example 105). The amount of water added was adjusted to give the weight percent titanium dioxide values listed in Table XV. The grind viscosities as measured using a Brookfield LVT viscometer at either 12 or 60 rpm are also given in Table XV.

Mixtures of these grinds with Rhoplex AC-61 polymeric latex were prepared by adding the grind to the polymeric latex (1.132 g of polymeric latex per g of titanium dioxide) while stirring. Adsorption was then measured after two hours and after one, seven, and twenty-three days by diluting 8 g of the grind/polymeric latex mixture with 27 g of water, centrifuging, and determining the concentration of the unadsorbed polymeric latex in the supernatant gravimetrically. The results are given in Table XV as milligrams of polymeric latex adsorbed per gram of titanium dioxide.

20% PVC paints were prepared from each of the pigment grind/polymeric latex mixtures by letting down with 4 g of Colloid 643 defoamer, 22.64 g of Texanol coalescent, 2 g of Triton GR-7M surfactant, 59 g of propylene glycol, 6 g of Nuosept 95 perservative, 100.4 g of a 5% aqueous Natrosol 250 MR cellulosic thickener solution, and sufficient water to give a final volume solids of 30%. pH was adjusted to about 9 by addition of ammonia.

Kubelka-Munk scattering coefficents were determined for all paints. 60° gloss was measured using a Pacific Scientific Glossguard II glossmeter. Grit was rated on a qualitative scale. The results of these measurements are also given in Table XV.

The results in Table XV demonstrate that low levels of small molecule co-dispersants can have a beneficial effect in the process of the present invention. Thus, tartaric acid (Example 104) and citric acid (Example 103) co-dispersants substantially reduce the grind viscosity compared to that observed in their absence (Example 102) without serious reducing polymeric latex adsorption. Tartaric acid and citric acid also appear to have a favorable effect on grit formation. The citric acid-containing paint (Example 103) shows even less grit than does the conventionally dispersed 1% Tamol 731-dispersed control (Comparative Example 23). Gloss is also significantly enhanced by the presence of the citric acid co-dispersant.

TABLE XV

| Example | Comp. 23[1] | 102 | 103 | 104 | 105 |
|---|---|---|---|---|---|
| % Tamol 731 | 1.0 | 0.05 | 0.05 | 0.05 | 0.05 |
| Co-dispersant | none | none | citric acid | tartaric acid | sodium succinate |
| Weight percent $TiO_2$ in grind | 77.2 | 59.6 | 76.0 | 69.3 | 60.9 |
| Grind viscosity (centipoise) | 2,340 | 22,750 | 4,080 | 7,990 | 20,400 |
| Adsorption (mg/g) | | | | | |
| 2 hours | 130 | 430 | 160 | 370 | 440 |
| 1 day | 180 | 450 | 260 | 460 | 420 |
| 7 days | 110 | 470 | 330 | 460 | 420 |
| 23 days | 100 | 470 | 370 | 450 | 460 |
| Scattering Coefficient | 6.8 | 7.9 | 7.7 | 7.9 | 7.4 |
| Gloss | 52 | 57 | 62 | 58 | 41 |
| Grit | slight | slight-moderate | none | slight | slight-moderate |

[1]Comparative example.

EXAMPLES 106–107

A multi-stage gradual addition process was employed to prepare an acrylate copolymer emulsion from monomer including 1.9 percent by weight methacrylic acid. The polymeric latex, Latex C, contained 44.7% solids with an average particle diameter of 166 nm. Latex C is believed to have a substantial proportion of acid functionality at the surface of the latex particle as determined by potentiometric titration. A modification of the process was employed to prepare an acrylate copolymer emulsion, Latex D, from monomer having the same composition but which is believed to result in an emulsion polymer having a substantially lower proportion of acid functionality at the polymer surface. Latex D contained 44.6% solids with an average particle diameter of 158 nm.

A tinted titanium dioxide pre-dispersion in which the dispersant (Tamol SC-1 dispersant) level was 1% (on titanium dioxide) was prepared according to the following formulation.

| Component | Weight (g) |
|---|---|
| water | 169.9 |
| Nopco NXZ defoamer | 3.0 |
| Tamol SG-1 (35%) dispersant | 17.1 |
| Ti-Pure R-900 titanium dioxide | 600 |

The pigment grind components were milled on a high speed disk disperser (Laboratory Dispersator, Model 84, Premier Mill Corp.) at 3000 rpm for 20 minutes. At a lower speed 30.0 g of Colortrend® (trademark of Tenneco Inc.) 888–9907 B-Lamp Black was mixed in.

To 62.9 g of the tinted pre-dispersion was added with stirring 169.4 g of Latex C binder (preadjusted to pH 6.0 with 28% aqueous ammonia) and 9.3 g of water. To 120.8 g of the resulting mixture was added 5.2 g Texanol coalescent, 7.2 g propylene glycol, and 24.0 g of a 2.5% aqueous solution of Natrosol 250 MR. The final pH of this mixture was adjusted to 7.5 with 28% aqueous ammonia to yield a paint (Example 106) with 14% volume concentration of titanium dioxide in the dry paint and a volume solids content of ca. 30% in the wet paint.

The above procedure was repeated using 169.7 g of Latex D binder (preadjusted to pH 6.0) instead of Latex C and 9.0 g of water to form an analogous paint (Example 107).

A tinted pigment dispersion was prepared as in Example 106 except that 17.3 g of Tamol 963 dispersant (35%) (sodium salt of polyacrylic acid) instead of Tamol SG-1 dispersant was used to give a one percent Tamol 963 dispersion.

The paint formulation process of Example 106 was repeated substituting the Tamol 963 pigment dispersion for the Tamol SG-1 pigment dispersion using Latex C to provide Comparative Example 24 and Latex D to provide Comparative Example 25.

After four days the paints were evaluated for latex adsorption and for differences in titanium dioxide scattering efficiency. Adsorption was measured by diluting one part of the paint with seven parts by weight of water, centrifuging, and determining the concentration of the unadsorbed latex in the supernatant gravimetrically.

The relative scattering was determined by measuring the Y-reflectance of the tinted paints with a 45°/0° reflectometer (Colorguard, Gardner Instruments). From light scattering theory, the ratio of the scattering coefficient, S, and the adsorption coefficient, K, is given by:

$$S/K = 2R/(1-R)^2$$

where R is the reflectance from an infinitely thick layer of dry paint film. At a given titanium dioxide PVC, differences in Y-reflectance of equally tinted paint films arise solely from differences in titanium dioxide scattering efficiency. Titanium dioxide dominates the scattering while the tinting agent dominates the adsorption which can then be considered constant. The percentage difference in scattering coefficient exhibited by two equally tinted paints is then given by:

$$((S_2-S_1)/S_1) \times 100 = ((R_2(1-R_1)^2/R_1(1-R_2)^2)-1) \times 100$$

Results are given in Table III. The results in Table III show that the Latex C polymeric binder (Example 11) provides substantially higher adsorption on titanium dioxide than does the Latex D polymeric binder (Example 12). The difference in Y-reflectance represents 48% higher scatter from the titanium dioxide. This result demonstrates the advantage of a high acid functionality at the latex particle surface on the adsorption process of this invention. High surface acid functionality is believed to promote adsorption to titanium dioxide thereby enhancing the ability of the latex binder to compete with the polyelectrolyte dispersant for the titanium dioxide surface. The results for Comparative Examples 4 and 5 show no difference between the two in adsorption and essentially no difference in Y-reflectance.

Comparison of the results for Example 11 and Comparative Example 4 show that the dispersant employed to prepare the titanium dioxide pre-dispersion has a significant effect on the adsorption of the polymeric latex dispersant Latex C with high surface acid functionality. When the polyelectrolyte Tamol 963 dispersant was employed, it was not displaced from the surface of the titanium dioxide particles to permit adsorption of the polymeric Latex C. However, this same polymeric latex was effective to displace the Tamol SG-1 dispersant, which has a lower proportion of acid functionality on a weight basis than the Tamol 963 dispersant and is believed to be more weakly bound to the titanium dioxide surface.

TABLE III

| Example | Latex | Dispersant | Adsorption (mg/g) | Y-Reflectance |
|---|---|---|---|---|
| 11 | C | 1% Tamol SG-1 | 720 | 0.557 |
| 12 | D | 1% Tamol SG-1 | 110 | 0.492 |
| C. 4[1] | C | 1% Tamol 963 | 50 | 0.544 |
| C. 5[1] | D | 1% Tamol 963 | 50 | 0.541 |

[1]Comparative example.

EXAMPLE 108

A multi-stage gradual addition process was employed to prepare an acrylate copolymer emulsion from monomer including about 2.5 percent by weight methacrylic acid. The polymeric latex, Latex E, contained 44.5% solids with an average particle diameter of 150 nm, and was prepared by a process believed to provide a substantial proportion of acid functionality at the surface of the latex particle as determined by potentiometric titration. A modification of the process was employed to prepare an acrylate copoymer emulsion, Latex F, from monomer having the same composition, but which is believed to result in an emulsion polymer having a substantially lower proportion of acid functionality at the polymer surface. The latex, Latex F, contained 44.8% solids with an average particle diameter of 159 nm.

To 86.1 of Latex E (preadjusted to pH 9.0 with aqueous ammonia) was added 31.5 g of a titanium dioxide-Tamol SG-1 dispersion prepared as in Examples 106–107, 3.3 g of deionized water, 1.9 g of Texanol coalescent, 7.2 g of propylene glycol, and 24.0 g of a 2.5% aqueous solution of Natrosol 250 MR. These ingredients were well mixed to yield a paint (Example 108) with 14% PVC of titanium dioxide and volume solids of ca. 30%.

To 85.2 g of Latex F (preadjusted to pH 9.0 with aqueous ammonia) was added 31.5 g of the same titanium dioxide-Tamol SG-1 dispersion, 6.2 g of deionized water, 1.9 g of Texanol coalescent, 7.2 g of propylene glycol, and 24.0 g of a 2.5% aqueous solution of Natrosol 250 MR. These ingredients were well mixed to yield a paint (Comparative Example 26) with 14% PVC of titanium dioxide and volume solids of ca. 30%.

Example 108 and Comparative Example 26 were evaluated for polymeric latex adsorption after one hour, one day, and five days of equilibration. Both paints were also evaluated for Y-Reflectance after one day and nine days of equilibration in the same manner as Examples 106–107. The results are given in Table XVII.

TABLE XVII

| | | Adsorption (g/g TiO$_2$) | | | Y-Reflectance | |
|---|---|---|---|---|---|---|
| Example | Latex | 1 hour | 1 day | 5 days | 1 day | 9 days |
| 108 | E | 0.01 | 0.17 | 0.23 | 0.530 | 0.536 |
| Comp. 26[1] | F | −0.05 | −0.09 | −0.03 | 0.502 | 0.498 |

[1]Comparative example.

These results demonstrate that a polymeric latex with high acid functionality at the latex particle surface, such as Latex E, the adsorption process is not instantaneous but occurs over the time scale of days. After one day a paint prepared with a high surface acid functionality polymeric latex binder, Latex E, had 18.5% higher light scatter than a paint prepared with a low surface acid functionality polymeric latex, Latex F. After nine days this difference increased to 26%.

EXAMPLE 109

To 1300 g of deionized water stirred under a nitrogen atmosphere at 85° C. was added 4 g of ammonium persulfate in 24 g of deionized water and 60 g of a seed latex. A monomer emulsion prepared from 600 g of deionized water, 28 g of Siponate DS-4, 900 g of butyl acrylate, 876.6 g of methyl methacrylate and 23.4 g of methacrylic acid was added over a 200-min period along with 2 g of ammonium persulfate in 100 g of deionized water maintaining 85° C. When the reaction was complete, the dispersion was cooled and filtered. The product (Latex G) had 45.6% solids and pH 3 with an average diameter of 196 nm.

The process used to prepare Latex G was repeated, except that 18 g of the methyl methacrylate was replaced with an equal weight of Kayamer® (trademark of Nihon Kayaku Co. Ltd.) PM-1 (monomer mixture containing around 52% of the monoester of hydroxyethyl methacrylate and phosphoric acid and 33% of the diester). The product (Latex H) had 46.1% solids and pH 2.6 with an average particle size of 185 nm.

A tinted titanium dioxide dispersion was prepared as in Examples 106–107 from 180 g of deionized water, 7.2 g of Tamol 731 dispersant (25% solids), 3.0 g of Nopco NXZ defoamer, 600 g of Ti-Pure R-902 and 30 g of Colortrend lamp black dispersion. Samples of Latex G and Latex H were adjusted to pH 9 with 28% aqueous ammonia and used to formulate paints with 14% volume concentration of Ti-Pure R-902 pigment in the dry paint: To 29.5 g of R-902 dispersion was added 7.8 g of water, 83.9 g of the pH 9 Latex G, 2.6 g of Texanol coalescent, 7.2 g of propylene glycol and 24.0 g of 2.5% aqueous Natrosol 250 MR hydroxyethyl cellulose thickener. Latex H was formulated similarly only 82.8 g were required and 8.9 g of water. The two paints were allowed to equilibrate for seven days and then the adsorption of polymeric latex on titanium dioxide in the paints and their Y-reflectance was measured as above. The results are given in Table XVIII.

TABLE XVIII

| Example | Latex | Adsorption (g/g TiO$_2$) | Y-Reflectance |
|---|---|---|---|
| Comp. 27[1] | G | 0.01 | 0.504 |
| 109 | H | 0.26 | 0.540 |

[1]Comparative example

These results show that the standard binder (Latex G) is essentially non-adsorbing under these conditions. The phosphate-containing binder (Latex H) adsorbs substantially and the increased Y-reflectance that accompanies the adsorption corresponds to an increase in scattering efficiency of the titanium dioxide in the dry paint film of 25%.

EXAMPLE 110

Polyelectrolyte is typically used as pigment dispersant in latex paint formulation. The elimination of this water sensitive dispersant in polymeric latex-adsorbed pigment dispersions is expected to improve coating water and corrosive resistances. Moreover, the process of the present invention provides films with more homogeneous pigment distribution than prior art processes. The improved pigment distribution is believed to block channels for transporting ion and water to the coating-steel interface.

Maincoat® HG-54 polymeric latex (Maincoat is a trademark of Rohm and Haas company), a commericially available latex intended for industrial coatings applications, was ground with titanium dioxide in the absence of polyelectrolyte dispersant to prepare a latex-dispersed paint (Example 110) according to the following formulation:

The following ingredients were ground at 3000 rpm for 15 minutes using a Cowles Dissolver: (All ingredients are parts by weight)

|  | Example 110 | Comparative Example 28 |
|---|---|---|
| methyl Carbitol wet edge agent | 17 | 17 |
| Tamol 165 (21%) dispersant | 0 | 4 |
| Triton CF-10 wetting agent | 0 | 1 |
| Foamaster DS antifoamer | 1 | 1 |
| Ti-Pure R-900 titanium dioxide | 85 | 85 |
| Maincote HG-54 polymer latex (41.5%, preadjust to pH = 9) | 275.2 | 0 |
| The pigment grind is let down with: |  |  |
| deionized water (preadjust to pH = 9) | 65.6 | 61.2 |
| mixture of (30 part Propasol P, 60 part butyl Carbitol, and 12 parts Acrysol RM-825 thickener (25%) | 34 | 34 |
| Maincote HG-54 polymer latex (41.5%, preadjust to pH = 9) | 0 | 275.2 |
| NH$_4$OH (28%) | 1.75 | 1.75 |
| Texanol coalescent | 17.15 | 17.15 |
| sodium nitrite (15%) flash rust inhibitor | 4.5 | 4.5 |

Samples of the paints of Example 110 and comparative Example 28 were drawdown on Bonderite® B-1000-treated (trademark of Parker Chemical Co.) steel panels, and dried at 77° F. 50% humidity for 3 weeks. The dry film thickness was 1 mil. The dry panels were then put in salt spray chamber (100° F, 5% NaCl) for 1 week. Performance results are given in Table XIX. Latex-dispersed titanium dioxide paint ((Example 110) had less rust spread out from scribed marks than conventionally dispersed titanium dioxide paint (Comparative Example 28).

TABLE XVIII

| Example | Inches rust spread from scribe |
|---|---|
| 110 | 3/8 |
| Comp. Ex. 28[1] | 5/8 |

[1]Comparative example.

EXAMPLE 111

An acid-free acrylic polymer latex having a calculated Tg of about 0° C. and a particle size of 141 nm was prepared via a conventional gradual-addition, batch polymerization process using a nonionic peroside/reducing agent initiator system and a nonionic ethoxylated nonylphenol surfactant. Included in the monomer mixture used in the copolymerization was 6% of a methacrylate monomer having a CH$_3$O(CH$_2$CH$_2$O)$_{45}$ pendant group. This provides a surface layer of water-soluble polymer around each latex particle which acts as a steric barrier to stabilize the latex against aggregation.

The process of Example 1 was repeated using this latex. Grinding conditions were: pH=9, PVC=30%, volume solids=38% and mg Latex added per g TiO$_2$=654. Adsorption was measured as in Example 1 and was found to be 93 mg/g after 1 day and 123 mg/g after 1 week. This example illustrates the adsorption process of the present invention employing latex particles which are sterically stabilized.

Various modifications can be made in the details of the various embodiments of the compositions and processes of the present invention, all within the spirit and scope of the invention as defined by the appended claims.

What is claimed is:

1. A process for preparing an aqueous dispersion of composite particles, the composite particles each comprising a plurality of polymeric latex particles adsorbed onto a titanium dioxide particle, the process comprising:

a) suspending polymeric latex particles in an aqueous medium, the polymeric latex particles having been polymerized in the absence of titanium dioxide particles;

b) suspending titanium dioxide particles in the aqueous medium, the sign of the surface charge of the polymeric latex particles being the same as the sign of the surface charge of the titanium dioxide particles, the surface potential of one of either of the polymeric latex particles or the titanium dioxide particles in the aqueous medium being greater in absolute value than the surface potential of the other of the polymeric latex particles and the titanium dioxide particles; and c) mixing the aqueous medium containing the titanium dioxide particles and the polymeric latex particles in the absence of conditions providing gross heterocoagulation, the polymeric latex particles adsorbing onto the titanium dioxide particles in a controlled manner to provide the composite particles.

2. A process for preparing an aqueous dispersion of composite particles, the composite particles each comprising a plurality of polymeric latex particles adsorbed onto a titanium dioxide particle, the process comprising:

a) suspending polymeric latex particles in a first aqueous medium, the polymeric latex particles having been polymerized in the absence of the titanium dioxide particles;

b) suspending inorganic material particles in a second aqueous medium; and c) mixing the first and second aqueous media containing the polymeric latex particles and the titanium dioxide particles respectively in the absence of conditions providing gross heterocoagulation, the sign of the surface charge of the polymeric latex particles being the same as the sign of the surface charge of the titanium dioxide particles, the surface potential of one of either of the polymeric latex particles or the titanium dioxide particles in the aqueous medium being greater in absolute value than the surface potential of the other of the polymeric latex particles and the titanium dioxide particles, the polymeric latex particles adsorbing onto the titanium dioxide particles in a controlled manner to provide the composite particles.

3. A process for preparing an aqueous dispersion of composite particles, the composite particles each comprising a plurality of polymeric latex particles adsorbed to a titanium dioxide particle, the process comprising:

a) suspending polymeric latex particles in a first aqueous medium, the polymeric latex particles having been polymerized in the absence of titanium dioxide particles;

b) suspending titanium dioxide particles in a second aqueous medium; and c) mixing the first and second aqueous media containing the polymeric latex particles and the titanium dioxide particles respectively, the sign of the surface charge of the polymeric latex particles being the same as the sign of the surface charge of the titanium dioxide particles, the zeta potential of the polymeric latex particles in the aqueous medium being greater in absolute value than the zeta potential of the titanium dioxide particles in the aqueous medium, the absolute value of the difference in the zeta potential of the titanium dioxide particles and the zeta potential of the polymeric latex particles being at least about 30 mv; the polymeric latex particles adsorbing onto the titanium dioxide particles in a controlled manner to provide the composite particles.

4. A process for preparing an aqueous dispersion of composite particles, the composite particles each comprising a plurality of polymeric latex particles adsorbed to a titanium dioxide particle, the process comprising:
   a) suspending polymeric latex particles in an aqueous medium, the polymeric latex particles having been polymerized in the absence of titanium dioxide particles;
   b) suspending titanium dioxide particles in the aqueous medium, the sign of the surface charge of the polymeric latex particles being the same as the sign of the surface charge of the titanium dioxide particles, the zeta potential of the polymeric latex particles in the aqueous medium being greater in absolute value than the zeta potential of the titanium dioxide particles in the aqueous medium, the absolute value of the difference in the zeta potential of the titanium dioxide particles and the zeta potential of the polymeric latex particles being at least about 30 mv; and
   c) mixing the aqueous medium containing the titanium dioxide particles and the polymeric latex particles in the absence of conditions providing gross heterocoagulation, the polymeric latex particles adsorbing onto the titanium dioxide particles in a controlled manner to provide the composite particles.

5. A process according to claim 4 or claim 3 wherein the zeta potential of the titanium dioxide particles is negative.

6. A process according to claim 5 wherein the zeta potential of the titanium dioxide particles is more negative than about –5 mv.

7. A process according to claim 6 wherein the zeta potential of the polymeric latex particles is more negative than about –20 mv.

8. A process according to claim 4 or claim 3 wherein the zeta potential of the titanium dioxide particles is from about –5 mv to about –70 mv, the zeta potential of the polymeric latex particles being from about –20 mv to –120 mv.

9. A process according to claim 8 wherein the zeta potential of the titanium dioxide particles is from about –20 mv to –60 mv, the zeta potential of the polymeric latex particles being from about –40 mv to about –110 mv.

10. A process according to claim 4 or claim 3 wherein the product of the zeta potential of the titanium dioxide particles and the zeta potential of the polymeric latex particles is from about 100 $mv^2$ to 8400 $mv^2$.

11. A process according to claim 2 wherein the titanium dioxide particle has a saturation level for adsorption of the polymeric latex particles and the proportion of polymeric latex particles in the aqueous medium is at least great enough to provide composite particles having polymeric latex particles at the saturation level.

12. A process according to claim 4 or claim 3 wherein the average size of the polymeric latex particles is from about 20 nm to about four times the average particle size of the titanium dioxide particles.

13. A process according to claim 12 wherein the average size of the polymeric latex particles is from about one-quarter the average size of the titanium dioxide particles to about equal to the average size of the titanium dioxide particles.

14. A process according to claim 4 or claim 3 wherein the average particle size of the titanium dioxide particles is from about 200 nm to 250 nm, and the average size of the polymeric latex particles is from about 20 nm to 1000 nm.

15. A process according to claim 4 or claim 3 wherein the aqueous medium containing the titanium dioxide particles and the polymeric latex particles is substantially free of polyelectrolyte dispersants.

16. A process according to claim 4 or claim 3 wherein the aqueous medium containing the titanium dioxide and the polymeric latex particles includes no more than about 0.2 percent by weight polyelectrolyte dispersant based on the weight of titanium dioxide.

17. A process according to claim 4 or claim 3 further comprising preparing polymeric latex particles by an emulsion polymerization process from monomer mixture including at least one polymerizable ethylenically unsaturated acid-functional monomer.

18. A process according to claim 17 wherein the zeta potential of the polymeric latex particles is attributable to ionized acid functionality at the surface of the polymeric latex particles.

19. A process according to claim 18 wherein the polymeric latex particles are prepared by an emulsion polymerization process which preferentially provides acid functionality at the surface of the polymeric latex particles.

20. A process according to claim 17 wherein the at least one polymerizable ethylenically unsaturated acid-functional monomer is a dihydrogen phosphate ester of an alcohol, the alcohol containing a polymerizable vinyl or olefinic group.

21. A process according to claim 20 wherein the dihydrogen phosphate ester is selected from the phosphoric acid monoester of 2-hydroxyethyl methacrylate, the phosphoric acid diester of 2-hydroxyethyl methacrylate, the phosphoric acid monoester of 3-hydroxypropyl methacrylate, and the phosphoric acid diester of 3-hydroyxypropyl methacrylate.

22. A process according to claim 4 or claim 3 wherein the total solids of the aqueous medium containing the titanium dioxide particles and polymeric latex particles is greater than about five percent by weight.

23. A process according to claim 4 or claim 3 wherein the effective glass transition temperature of the polymeric latex particles is less than about 60° C.

24. A process according to claim 4 or claim 3 wherein the effective glass transition temperature of the polymeric latex particles is greater than about 50° C.

25. A process according to claim 4 or claim 3 further comprising adjusting the zeta potential of the titanium dioxide particle surface prior to mixing the aqueous medium containing the titanium dioxide particles and the polymeric latex particles.

26. A process according to claim 4 or claim 3 wherein the titanium dioxide particles have a saturation level for the polymeric latex particles, and the ratio of polymeric latex particles to titanium dioxide particles is selected to provide composite particles having adsorbed polymeric latex particles at the saturation level.

27. A process according to claim 4 or claim 3, the adsorption conditions being selected to provide composite particles in the absence of visually observable grit.

28. A coatings composition produced according to the process of claim 4 or claim 3.

29. A process for preparing an aqueous composition, the composition including dispersed composite particles, the composite particles each comprising a plurality of polymeric latex dispersant particles adsorbed to a titanium dioxide particle, the process comprising:
   a) suspending polymeric latex particles in a first aqueous medium, the polymeric latex particles having been polymerized in the absence of the titanium dioxide particles;
   b) suspending titanium dioxide particles in a second aqueous medium; and
   c) mixing the first and second aqueous media containing the polymeric latex particles and the titanium dioxide particles respectively; the mixture including the titanium dioxide particles and the polymeric latex particles being unstable with respect to heterocoagulation, the energy barrier with respect to heterocoagulation of the polymeric latex particles and the inorganic particles being sufficiently great so that rapid heterocoagulation forming a substantial proportion by weight of aggregates including multiple titanium dioxide particles is avoided, the polymeric latex particles adsorbing onto the inorganic material particles in a controlled manner to provide the composite particles.

30. A process for preparing an aqueous coating composition, the coating composition providing a coating having improved opacity, the coating composition including dispersed composite particles, the composite particles each comprising a plurality of polymeric latex dispersant particles adsorbed to a titanium dioxide particle, the process comprising:
   a) suspending polymeric latex particles in an aqueous medium, the polymeric latex particles having been polymerized in the absence of titanium dioxide particles;
   b) suspending titanium dioxide particles in the aqueous medium; the sign of the surface charge of the polymeric latex particles being the same as the sign of the surface charge of the titanium dioxide particles, the surface potential of one of either of the polymeric latex particles or the titanium dioxide particles in the aqueous medium being greater in absolute value than the surface potential of the other of the polymeric latex particles and the titanium dioxide particles; and
   c) mixing the aqueous medium containing the titanium dioxide particles and the polymeric latex particles in the absence of conditions providing gross heterocoagulation, the polymeric latex particles adsorbing onto the titanium dioxide particles in a controlled manner to provide the composite particles.

31. A process according to claim 30 or claim 3 further comprising mixing an aqueous dispersion of polymeric latex binder particles with the aqueous medium containing the dispersed composite particles.

32. A process according to claim 31 wherein the polymeric latex binder particles and the polymeric latex dispersant particles are the same.

33. A process for preparing an aqueous composition, the composition including dispersed composite particles, the composite particles each comprising a plurality of polymeric latex dispersant particles adsorbed to a titanium dioxide particle, the process comprising:
   a) suspending polymeric latex particles in an aqueous medium, the polymeric latex particles having been polymerized in the absence of titanium dioxide particles;
   b) suspending titanium dioxide particles in the aqueous medium; the polymeric latex particles being stable with respect to homocoagulation; and
   c) mixing the aqueous medium containing the titanium dioxide particles and the polymeric latex particles, the mixture including the titanium dioxide particles and the polymeric latex particles being unstable with respect to heterocoagulation, the energy barrier with respect to heterocoagulation of the polymeric latex particles and the inorganic particles being sufficiently great so that rapid heterocoagulation forming a substantial proportion by weight of aggregates including multiple titanium dioxide particles is avoided, the polymeric latex particles adsorbing onto the titanium dioxide particles to provide the composite particles.

34. A process according to claim 34 or claim 29 wherein the energy barrier with respect to heterocoagulation is less than about 10 kT.

35. A process according to claim 34 or claim 29 wherein the energy barrier with respect to heterocoagulation is at least about 3 kT.

36. A process for preparing an aqueous dispersion of composite particles, the composite particles each comprising a plurality of polymeric latex particles adsorbed onto a titanium dioxide particle, the process comprising:
   a) suspending polymeric latex particles in an aqueous medium, the polymeric latex particles having been polymerized in the absence of titanium dioxide particles;
   b) suspending titanium dioxide particles in the aqueous medium; the polymeric latex particles being stabilized against homocoagulation by polymeric steric stabilization, the surface potential of one of either of the polymeric latex particles or the titanium dioxide particles in the aqueous medium being greater in absolute value than the surface potential of the other of the polymeric latex particles and the titanium dioxide particles, and,
   c) mixing the aqueous medium containing the titanium dioxide particles and the polymeric latex particles in the absence of conditions providing gross heterocoagulation, the polymeric latex particles adsorbing onto the titanium dioxide particles in a controlled manner to provide the composite particles.

37. A process according to claim 1 or claim 2, wherein the surface potential of the polymeric latex particles in the aqueous medium is greater in absolute value than the surface potential of the titanium dioxide particles in the aqueous medium.

38. An aqueous dispersion of composite particles prepared by the process of claim 4 or claim 3, the composite particles each comprising a plurality of polymeric latex particles adsorbed to a titanium dioxide particle, the polymeric latex particles including dihydrogen phosphate ester functional groups.

39. An aqueous dispersion according to claim 38, the polymeric latex particles being polymerized from monomer including at least one polymerizable dihydrogen phosphate-functional monomer.

40. An aqueous dispersion according to claim 39, the at least one polymerizable dihydrogen phosphate-functional monomer being selected from the dihydrogen phosphate esters of an alcohol, the alcohol including a polymerizable group selected from polymerizable vinyl groups and polymerizable non-vinyl olefinic groups.

41. An aqueous dispersion according to claim 40 wherein the at least one polymerizable dihydrogen phosphate-functional monomer is selected from the dihydrogen phosphate monoester of 2-hydroxyethyl methacrylate, and mixtures of the dihydrogen phosphate monoester of 2-hydroxyethyl methacrylate and the phosphoric acid diester of 2-hydroxyethyl methacrylate.

42. An aqueous dispersion according to claim 40 wherein the at least one polymerizable dihydrogen phosphate-functional monomer is selected from the dihydrogen vinylbenzylphosphates, and $CH_2=CCH_3CO_2CH_2CH_2OPO(OH)_2$, $CH_2=CCH_3CO_2CH_2CH[OPO(OH)_2]CH_3$, $CH_2=CCH_3CO_2CH_2CH_2CH_2OPO(OH)_2$, and $CH_2=CCH_3CO_2CH_2CHOHCH_2OPO(OH)_2$.

43. A coating composition comprising an aqueous dispersion of composite particles prepared by the process of claim 4 or claim 3, the composite particles each comprising a plurality of polymeric latex particles adsorbed to a titanium dioxide particle, the polymeric latex particles including dihydrogen phosphate ester functional groups.

44. A coating composition according to claim 43, the polymeric latex particles being polymerized from monomer including at least one polymerizable dihydrogen phosphate-functional monomer.

45. A coating composition according to claim 44, the at least one polymerizable dihydrogen phosphate-functional monomer being selected from the dihydrogen phosphate esters of an alcohol, the alcohol including a polymerizable group selected from polymerizable vinyl groups and polymerizable non-vinyl olefinic groups.

46. A coating composition according to claim 44 wherein the at least one polymerizable dihydrogen phosphate-functional monomer is selected from the dihydrogen phosphate monoester of 2-hydroxyethyl methacrylate, and mixtures of the dihydrogen phosphate monoester of 2-hydroxyethyl methacrylate and the phosphoric acid diester of 2-hydroxyethyl methacrylate.

47. A coating composition according to claim 45 wherein the at least one polymerizable dihydrogen phosphate-functional monomer is selected from the dihydrogen vinylbenzylphosphates, and $CH_2=CCH_3CO_2CH_2CH_2OPO(OH)_2$, $CH_2=CCH_3CO_2CH_2CH[OPO(OH)_2]CH_3$, $CH_2=CCH_3CO_2CH_2CH_2CH_2OPO(OH)_2$, and $CH_2=CCH_3CO_2CH_2CHOHCH_2OPO(OH)_2$.

48. A pigment slurry comprising an aqueous dispersion of composite particles prepared by the process of claim 4 or claim 3, the composite particles each comprising a plurality of polymeric latex particles adsorbed to a titanium dioxide particle, the polymeric latex particles including dihydrogen phosphate ester functional groups.

49. A pigment slurry according to claim 48, the polymeric latex particles being polymerized from monomer including at least one polymerizable dihydrogen phosphate-functional monomer.

50. A pigment slurry according to claim 49, the at least one polymerizable dihydrogen phosphate-functional monomer being selected from the dihydrogen phosphate esters of an alcohol, the alcohol including a polymerizable group selected from polymerizable vinyl groups and polymerizable non-vinyl olefinic groups.

51. A pigment slurry according to claim 50 wherein the at least one polymerizable dihydrogen phosphate-functional monomer is selected from the dihydrogen phosphate monoester of 2-hydroxyethyl methacrylate, and mixtures of the dihydrogen phosphate monoester of 2-hydroxyethyl methacrylate and the phosphoric acid diester of 2-hydroxyethyl methacrylate.

52. A pigment slurry according to claim 50 wherein the at least one polymerizable dihydrogen phosphate-functional monomer is selected from the dihydrogen vinylbenzylphosphates, and $CH_2=CCH_3CO_2CH_2CH_2OPO(OH)_2$, $CH_2=CCH_3CO_2CH_2CH[OPO(OH)_2]CH_3$, $CH_2=CCH_3CO_2CH_2CH_2CH_2OPO(OH)_2$, and $CH_2=CCH_3CO_2CH_2CHOHCH_2OPO(OH)_2$.

53. An aqueous dispersion of composite particles prepared by the process of claim 4 or claim 3, the composite particles each comprising a plurality of polymeric latex particles adsorbed to a titanium dioxide particle, the polymeric latex particles including polymerized residues of itaconic acid.

54. An aqueous dispersion according to claim 53, the polymeric latex particles being polymerized from monomer including itaconic acid.

55. A coating composition comprising an aqueous dispersion of composite particles prepared by the process of claim 4 or claim 3, the composite particles each comprising a plurality of polymeric latex particles adsorbed to a titanium dioxide particle, the polymeric latex particles including polymerized residues of itaconic acid.

56. A pigment slurry comprising an aqueous dispersion of composite particles prepared by the process of claim 4 or claim 3, the composite particles each comprising a plurality of polymeric latex particles adsorbed to a titanium dioxide particle, the polymeric latex particles including polymerized residues of itaconic acid.

57. A process for preparing an aqueous coating composition, the coating composition providing a coating having improved opacity, the coating composition including dispersed composite particles, the composite particles each comprising a plurality of polymeric latex dispersant particles adsorbed to a titanium dioxide particle, the process comprising:
   a) suspending polymeric latex particles in a first aqueous medium, the polymeric latex particles having been polymerized in the absence of the titanium dioxide particles;
   b) suspending inorganic material particles in a second aqueous medium; and
   c) mixing the first and second aqueous media containing the polymeric latex particles and the titanium dioxide particles respectively in the absence of conditions providing gross heterocoagulation, the sign of the surface charge of the polymeric latex particles being the same as the sign of the surface charge of the titanium dioxide particles, the surface potential of one of either of the polymeric latex particles or the titanium dioxide particles in the aqueous medium being greater in absolute value than the surface potential of the other of the polymeric latex particles and the titanium dioxide particles, the polymeric latex particles adsorbing onto the titanium dioxide particles in a controlled manner to provide the composite particles.

58. A process for preparing an aqueous dispersion of composite particles, the composite particles each comprising a plurality of polymeric latex particles adsorbed onto a titanium dioxide particle, the process comprising:
   a) suspending polymeric latex particles in a first aqueous medium, the polymeric latex particles having been polymerized in the absence of the titanium dioxide particles;
   b) suspending titanium dioxide particles in a second aqueous medium; and
   c) mixing the first and second aqueous media containing the polymeric latex particles and the titanium dioxide particles respectively in the absence of conditions providing gross heterocoagulation, the polymeric latex particles being stabilized against homocoagulation by polymeric steric stabilization, the surface potential of one of either of the polymeric latex particles or the titanium dioxide particles in the aqueous medium being greater in absolute value than the surface potential of the other of the polymeric latex particles and the titanium dioxide particles; the polymeric latex particles adsorbing onto titanium dioxide material particles in a controlled manner to provide the composite particles.

59. A titanium dioxide pigment slurry produced according to the process of claim 1 or claim 2.

* * * * *